United States Patent
Camelio et al.

(10) Patent No.: US 11,028,190 B2
(45) Date of Patent: Jun. 8, 2021

(54) BIS-PHOSPHAGUANIDINE AND POLY-PHOSPHAGUANIDINE LIGANDS WITH GROUP IV METAL CATALYSTS PRODUCED THEREFROM

(71) Applicant: Dow Global Technologies LLC, Midland, MI (US)

(72) Inventors: Andrew M. Camelio, Midland, MI (US); Arkady L. Krasovskiy, Lake Jackson, TX (US); Matthew D. Christianson, Midland, MI (US); Robert D J Froese, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 139 days.

(21) Appl. No.: 16/337,602

(22) PCT Filed: Sep. 28, 2017

(86) PCT No.: PCT/US2017/054023
§ 371 (c)(1),
(2) Date: Mar. 28, 2019

(87) PCT Pub. No.: WO2018/064339
PCT Pub. Date: Apr. 5, 2018

(65) Prior Publication Data
US 2019/0345271 A1  Nov. 14, 2019

Related U.S. Application Data

(60) Provisional application No. 62/402,525, filed on Sep. 30, 2016.

(51) Int. Cl.
C07F 9/02      (2006.01)
C07F 9/28      (2006.01)
C08F 4/64      (2006.01)
C08F 210/16    (2006.01)

(52) U.S. Cl.
CPC ........ *C08F 4/64013* (2013.01); *C08F 210/16* (2013.01)

(58) Field of Classification Search
CPC .................................... C07F 9/02; C07F 9/28
See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,543,399 | A | 9/1985 | Jenkins, III et al. |
| 4,613,484 | A | 9/1986 | Ayres et al. |

(Continued)

FOREIGN PATENT DOCUMENTS

| | | |
|---|---|---|
| EP | 802202 A1 | 10/1997 |
| WO | 2012027448 A1 | 3/2012 |

(Continued)

OTHER PUBLICATIONS

Mansfield et al., "Coordination Chemistry of Isomeric Mixtures of Linked Di(phosphaguanidine) Compounds: A Spectroscopic and Crystallographic Study," Organometallics, 2006, 25, 2470-2474. (Year: 2006).*
Barrett et al., "Carbodiimide insertion reactions of homoleptic heavier alkaline earth amides and phosphides." Dalton Transactions 2010, 39, 7393-7400.
Crimmin et al., "Heavier Group 2 Element Catalyzed Hydrophosphination of Carbodiimides." Organometallics 2008, 2, 497.

(Continued)

*Primary Examiner* — Catherine S Branch
(74) *Attorney, Agent, or Firm* — Dinsmore & Shohl LLP

(57) ABSTRACT

Embodiments are directed to bis- and poly-phosphaguanidine compounds, and the metal-ligand complexes formed therefrom, wherein the metal complexes can be used as procatalysts in polyolefin polymerization. Formulas (I) (II) and (III).

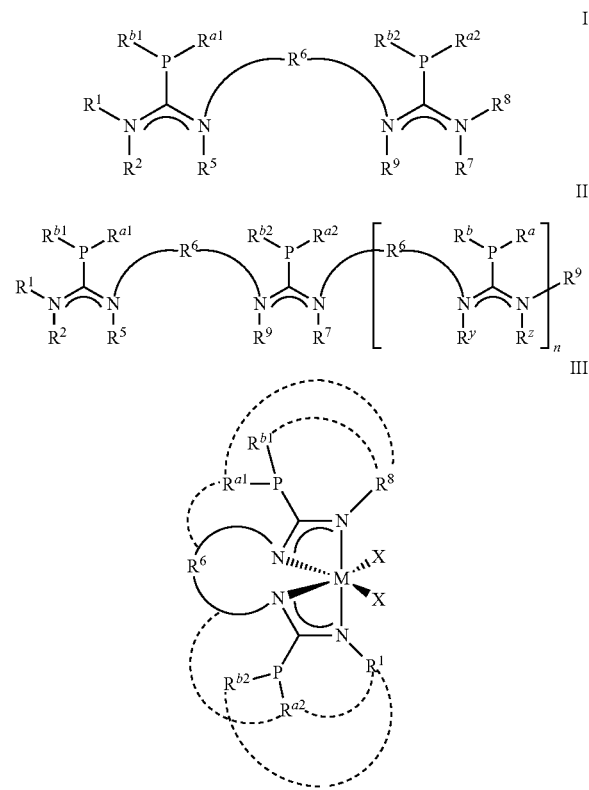

20 Claims, No Drawings

(56) References Cited

U.S. PATENT DOCUMENTS

| | | | |
|---|---|---|---|
| 4,882,400 | A | 11/1989 | Dumain et al. |
| 5,064,802 | A | 11/1991 | Stevens et al. |
| 5,153,157 | A | 10/1992 | Hlatky et al. |
| 5,296,433 | A | 3/1994 | Siedle et al. |
| 5,321,106 | A | 6/1994 | LaPointe |
| 5,350,723 | A | 9/1994 | Neithamer et al. |
| 5,352,749 | A | 10/1994 | DeChellis et al. |
| 5,425,872 | A | 6/1995 | Devore et al. |
| 5,541,270 | A | 7/1996 | Chinh et al. |
| 5,625,087 | A | 4/1997 | Neithamer et al. |
| 5,721,185 | A | 2/1998 | LaPointe et al. |
| 5,783,512 | A | 7/1998 | Jacobsen et al. |
| 5,883,204 | A | 3/1999 | Spencer et al. |
| 5,919,983 | A | 7/1999 | Rosen et al. |
| 6,103,657 | A | 8/2000 | Murray |
| 6,515,155 | B1 | 2/2003 | Klosin et al. |
| 6,696,379 | B1 | 2/2004 | Carnahan et al. |
| 7,163,907 | B1 | 1/2007 | Canich et al. |
| 2003/0225228 | A1 | 12/2003 | Moody et al. |
| 2006/0173144 | A1 | 8/2006 | Baugh et al. |

FOREIGN PATENT DOCUMENTS

| | | |
|---|---|---|
| WO | 2016028187 A1 | 2/2016 |
| WO | 2017172313 A1 | 10/2017 |
| WO | 2018064461 A1 | 4/2018 |
| WO | 2018064493 A1 | 4/2018 |

OTHER PUBLICATIONS

Mansfield et al., "A conformational Study of Phospha(III)- and Phospha(V)-guanidine Compounds." Journal of the American Chemical Society 2006, 128, 13879.

Fahey Metallocene-Based Polyolefins vol. 2 pp. 322-332 (2000).

Busacca et al., "Synthesis of Phosphaguanidines by Hydrophosphination of Carbodiimides with Phosphine Boranes." The Journal of Organic Chemistry 2014, 79, 9878-9887.

Zhang et al., "Alkali-metal-catalyzed addition of primary and secondary phosphines to carbodiimides. A general and efficient route to substituted phosphaguanidines." Chemical Communications 2006, 381.

Grundy et al., "Self-organization in P-substituted guanidines leading to solution-state isomerization." Chemical Communications 2004, 2410.

Issleib et al., "Phosphaguanidines. I. A new class of compounds with doubly coordinated trivalent, phosphorus." Journal of Organometallic Chemistry 1980, 192, 33.

Jin et al., "Synthesis and characterization of bulky guanidines and phosphaguanidines: precursors for low oxidation state metallacycles." New Journal of Chemistry 2009, 33, 64.

Mansfield et al., "Phospha(III)guanidinate complexes of titanium(IV) and zirconium(IV) amides." Polyhedron 2010, 29, 2481.

Coles et al., "Variable coordination chemistry of the phospha(III)guanidinate anion; application as a metal functionalized phosphine ligand." Chemical Communications 2002, 2794.

Mansfield et al., "The effect of P-cyclohexyl groups on the coordination chemistry of phosphaguanidinates." Dalton Transactions 2006, 2052.

Coles, M. P., "Applications of neutral amidines and guanidines in coordination chemistry." Dalton Transactions 2006, 985.

Mansfield et al., "Lithium and aluminum complexes supported by chelating phosphaguanidinates." Dalton Transactions 2005, 2833.

Grundy et al., "Synthesis and coordination chemistry of neutralphospha(III)guanidines. Formation of 1-aza-3-phospha-4-metallacyclobut-1-ene rings at group 6 metals." Dalton Transactions 2003, 2573.

Thewissen et al., "The chemistry of heteroallene and -allylic derivatives with rhodium and iridium. II. Rhodium(I) and iridium(I) phosphine complexes of heteroallylic ligands of the type [Ph2PC(X)NR]-(X=S, NR, O) and [Ph2P(Q)C(S)NR]-(Q=S, O). Synthesis and phosphorus-31 NMR." Journal of Organometallic Chemistry 1980, 192, 101.

International Search Report and Written Opinion pertaining to PCT/US2017/054023, dated Feb. 7, 2018.

Ma et al., "Half-Sandwich Rare-Earth Metal Tris(alkyl) Ate Complexes Catalyzed Phosphaguanylation Reaction of Phosphines with Carbodiimides: an Efficient Synthesis of Phosphaguanidines", New J. Chem., 2015, 39, 7649.

Marchenko et al., "C-Silyl-N,N-dialkyl-N'-arylformamidines: Synthesis and Reactions with Phosphorus(III) Chlorides", Eur. J. Inorg. Chem., 2016, 4842-4849.

Marchenko et al., "Facile Synthesis of C-Phosphanylformamidines via a Carbene Pathway", Tetrahedron letters, 2013, 5671-5376.

Roering et al., "Insertion Reactions and Catalytic Hydrophosphination by Triamidoamine-Supported Zirconium Complexes", Organometallics, 2010, 2557-2565.

\* cited by examiner

BIS-PHOSPHAGUANIDINE AND POLY-PHOSPHAGUANIDINE LIGANDS WITH GROUP IV METAL CATALYSTS PRODUCED THEREFROM

CROSS-REFERENCE TO RELATED APPLICATIONS

This application claims priority to U.S. Provisional Application Ser. No. 62/402,525 filed Sep. 30, 2016, the entire disclosure of which is hereby incorporated by reference.

TECHNICAL FIELD

Embodiments of the present disclosure generally relate to bis- and polyphosphaguanidine compounds and metal-ligand complexes formed therefrom, wherein the metal complexes can be used as procatalysts in polyolefin polymerization.

BACKGROUND

Olefin based polymers are utilized in the manufacture of a variety of articles and products, and thus, there is a high industrial demand for such polymers. Olefin based polymers, such as polyethylene and/or polypropylene, are produced via various catalyst systems. Selection of such catalyst systems used in the polymerization process is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in solution phase polymerization process, gas phase polymerization process, and/or slurry phase polymerization process in one or more reactors, for example, connected in series or parallel, in the presence of one or more olefin polymerization catalyst systems.

Despite the research efforts in developing catalyst systems suitable for polyolefin polymerization, such as polyethylene, there is still a need for improved olefin polymerization catalysts to meet industrial demand for olefin based polymers.

SUMMARY

Accordingly, the present embodiments are directed to olefin polymerization catalyst systems, which provide alternative synthetic schemes for meeting industrial demand of olefin based polymers. Embodiments of the present disclosure are directed to new procatalysts and the corresponding ligand frameworks that incorporate the following embodiments:

One embodiment of this disclosure includes formula I, a phosphaguanidine compound of the following structure:

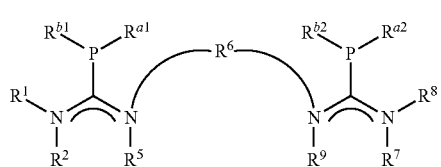

I wherein $R^2$, $R^5$, $R^7$, and $R^9$ include the same or different moieties selected from hydride moieties, aliphatic moieties, heteroaliphatic moieties, aromatic moieties, or heteroaromatic moieties, and may include a lone pair of electrons; and $R^6$ is an aliphatic, heteroaliphatic, aryl, or heteroaryl moiety. $R^1$ and $R^8$ include the same or different moieties selected from aliphatic moieties, heteroaliphatic moieties, aromatic moieties, or heteroaromatic moieties. $R^{a1}$, $R^{a2}$, $R^{b1}$, and $R^{b2}$ include the same or different moieties selected from aliphatic moieties, aromatic moieties, or heteroaromatic moieties.

Another embodiment of this disclosure includes formula I used to create phosphaguanidine metal-ligand complexes or procatalysts such as that in formula III:

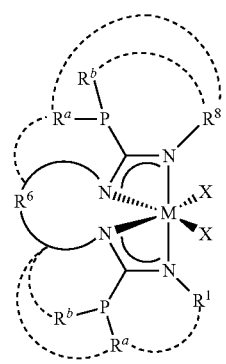

III wherein, $R^1$ and $R^8$ include the same or different moieties selected from hydride, aliphatic, heteroaliphatic, aromatic, and heteroaromatic moieties. $R^b$ and $R^a$ include the same or different moieties selected from aliphatic moieties, aromatic moieties, or heteroaromatic moieties; M is selected from titanium, zirconium, or hafnium; X is selected from aliphatic moieties, aromatic moieties, $NR^N_2$ moieties or halide moieties, wherein $R^N$ is selected from alkyl, aryl, or heteroaryl moieties; $R^6$ is selected from an aliphatic moiety, heteroaliphatic moiety, or aromatic moiety; and each dotted line optionally defines a bridging connection.

Some embodiments include aromatic rings, such as phenyl, biphenyl, and naphtyl groups, as the backbone for phosphaguanidine moieties of formula V:

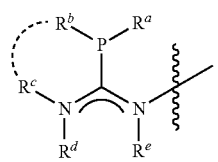

V wherein $R^d$ and $R^e$ are independently selected from hydrides, aliphatic moieties, heteroaliphatic moieties, aromatic moieties, heteroaromatic moieties, or may include lone pair of electrons. $R^c$ is selected from hydrides, aliphatic moieties, heteroaliphatic moieties, aromatic moieties, heteroaromatic moieties and/or lone pairs of electrons. $R^a$ and $R^b$ include the same or different moieties selected from aliphatic moieties, heteroaliphatic moieties, aromatic moieties, or heteroaromatic moieties. Each curved dotted line optionally defines a bridging connection as defined within this disclosure. In cases in which there are a plurality of guanidine moieties, $R^a$, $R^b$, $R^c$, $R^d$, and $R^e$ may be the same or different within the plurality of guanidine moieties.

A further embodiment includes the copolymers and homopolymer produced when the described ligands coordinate with transition metels to form a metal-ligand catalyst or procatalyst.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The compounds, ligands, complexes, metal-ligand compounds or complexes are called "phosphaguanidine compounds." However, the term "phosphoryl guanidine" is considered interchangeable, and therefore using "phosphoryl guanidine" does not exclude compounds called "phosphaguanidine" and vice versa.

Linear Biphosphaguanidine Ligand

One embodiment of this disclosure includes formula I, a phosphaguanidine compound of the following structure:

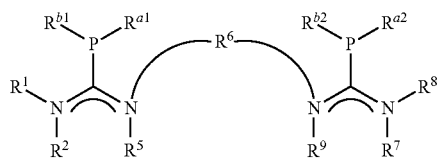

I

In formula I, $R^2$, $R^5$, $R^7$, and $R^9$ include the same or different moieties selected from hydride moieties, aliphatic moieties, heteroaliphatic moieties, aromatic moieties, or heteroaromatic moieties, and may include a lone pair of electrons; and $R^6$ is an aliphatic, heteroaliphatic, aryl, or heteroaryl moiety. $R^1$ and $R^8$ include the same or different moieties selected from aliphatic moieties, heteroaliphatic moieties, aromatic moieties, or heteroaromatic moieties. $R^{a1}$, $R^{a2}$, $R^{b1}$, and $R^{b2}$ include the same or different moieties selected from aliphatic moieties, aromatic moieties, or heteroaromatic moieties.

Synthesis of Linear Biphosphaguanidine Ligand

Various embodiments are contemplated for producing the phosphaguanidine compound of formula I. In one embodiment, the method may comprise reacting biscarbodiimide with a phosphine, for example, dialkylphosphines or diarylphosphines. In specific embodiments, the phosphine is diphenylphosphine, dicyclohexylphosphine, dicyclohexylphosphine-borane complex, or combinations thereof. Various carbodiimides, biscarbodiimides, and/or polycarbodiimides are contemplated as suitable. For example and not by way of limitation, specific carbodiimide examples are provided as follows. For additional details, U.S. Application No. 62/315,897 (Dow Docket Number 78538) is incorporated by reference herein in its entirety.

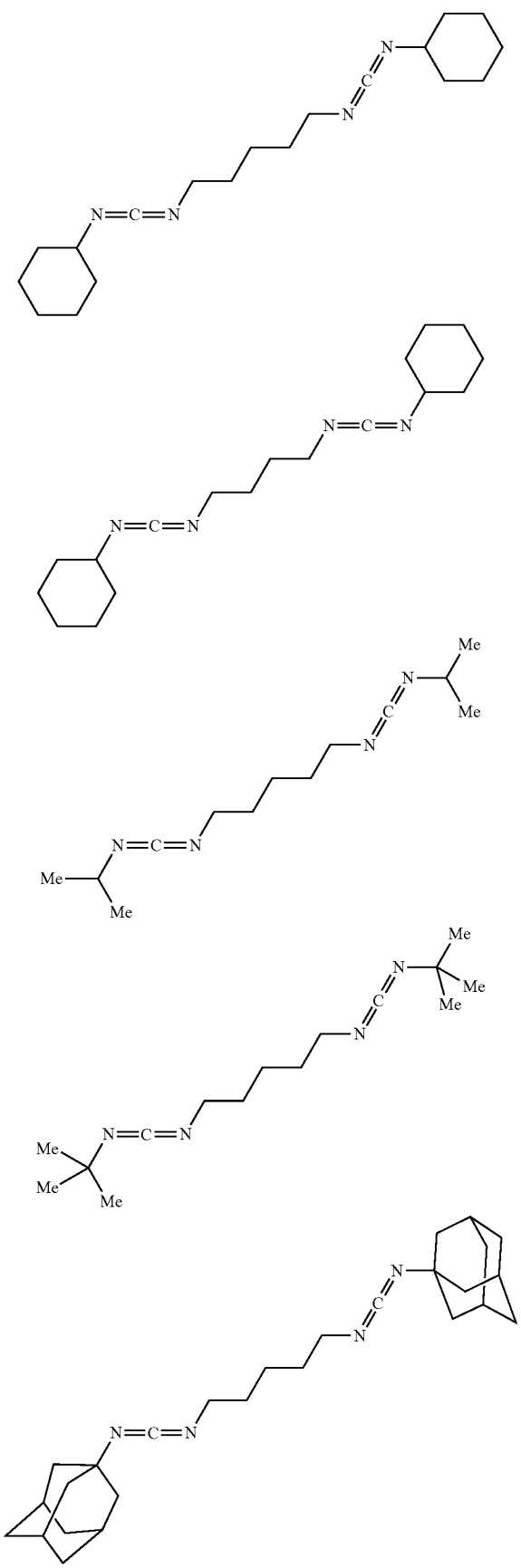 [SMILES: C(=NCCCCCN=C=NC1CCCCC1)=NC1CCCCC1 ; C(=NCCCCN=C=NC1CCCCC1)=NC1CCCCC1 ; CC(C)N=C=NCCCCCN=C=NC(C)C ; CC(C)(C)N=C=NCCCCCN=C=NC(C)(C)C ; C(=NCCCCCN=C=NC12CC3CC(CC(C3)C1)C2)=NC12CC3CC(CC(C3)C1)C2]

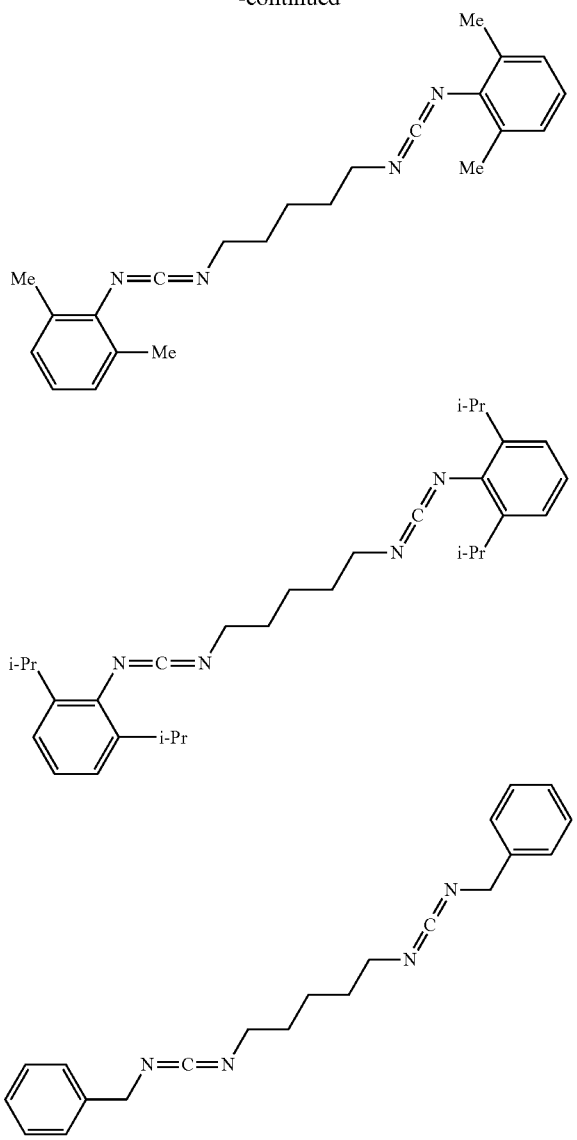

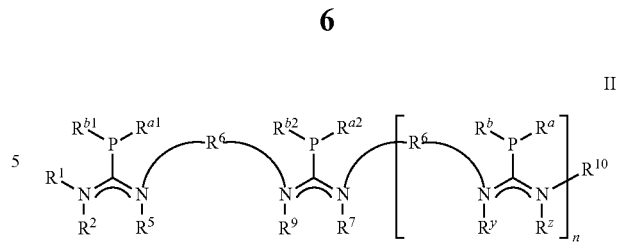

II

In formula II, n is an integer from two to six, and $R^{10}$ is selected from a hydride, an aliphatic moiety, heteroaliphatic moiety, aromatic moiety, or heteroaromatic moiety. $R^y$ and $R^z$ include the same or different moieties selected from hydrides, aliphatic moieties, heteroaliphatic moieties, aromatic moieties, heteroaromatic moieties, or a lone pair of electrons, and in cases in which n is greater than 1, there are a plurality of repeating units, and $R^a$, $R^b$, $R^y$, and $R^z$ may each be the same or different moiety within the plurality of repeating units.

Polymer Catalyst Produced from Formula III

In further embodiments, formula I may be used to create phosphaguanidine metal-ligand complexes or procatalysts such as that in formula III.

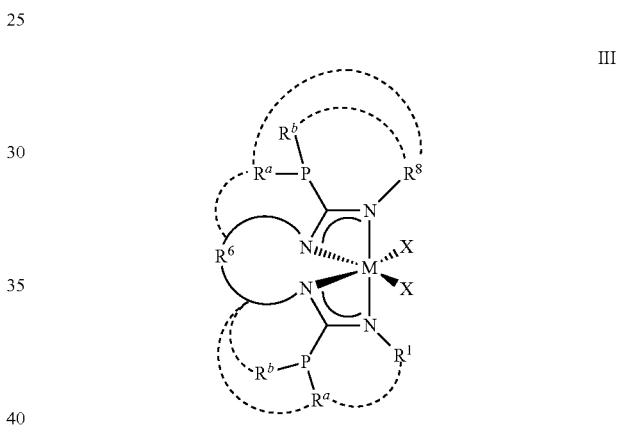

III

In formula III, $R^1$ and $R^8$ include the same or different moieties selected from hydride, aliphatic, heteroaliphatic, aromatic, and heteroaromatic moieties. $R^b$ and $R^a$ include the same or different moieties selected from aliphatic moieties, aromatic moieties, or heteroaromatic moieties; M is selected from titanium, zirconium, or hafnium; X is selected from aliphatic moieties, aromatic moieties, $NR^N_2$ moieties or halide moieties, wherein $R^N$ is selected from alkyl, aryl, or heteroaryl moieties; $R^6$ is selected from an aliphatic moiety, heteroaliphatic moiety, or aromatic moiety; and each dotted line optionally defines a bridging connection. The term "bridging connection" means that at least two of the R groups, to which the dotted line connects, are part of the same group or moiety, are linked through a chain of atoms that is not depicted in formula III, or may form non-covalent interactions, such as hydrogen bonding or other van der Waals interactions.

The disclosure further provides the olefin polymerization catalyst system according to any embodiment described herein except that $R^6$ is an optionally substituted 5 atom bridge and in further embodiments, $R^6$ is a 5 atom bridge.

In one or more embodiments, $R^6$ may be a $(C_3\text{-}C_{40})$ hydrocarbylene. The term "$(C_3\text{-}C_{40})$hydrocarbylene," is defined by having the two radical bearing atoms of the diradical unit spaced apart by one or more intervening carbon atoms such that a three or more carbon linkage is In one or more embodiments, the bisphosphaguanidine ligand may be obtained in a 4 step sequence beginning with the corresponding isothiocyanate. Condensation with a diamine generates the bisthiourea which is then dimethylated with iodomethane to provide the bismethylisothioureas in high yields. Activation with stoichiometric silver nitrate in the presence of triethylamine generates the biscarbodiimides which are competent electrophiles for the insertion of disubstituted phosphines and phosphine-boranes under catalytic basic conditions. The first two reactions require no purification, and the only purification required for the last two reactions is a filtration through a Celite® or a polytetrafluoroethylene (PTFE) filter using hexanes to remove solid byproducts. Further illustration of various synthetic routes is provided below in the Examples.

Linear Polyphosphaguanidine Ligand

In further embodiments of formula I, the structure can be expanded to include a polymer polyphosphaguanidine, and the $R^8$ of formula I includes the repeating unit within the brackets in the following structure, formula II:

created between the bridged N atoms of formulas I, II, and III. The disclosure further provides the olefin polymerization catalyst system according to any embodiment described herein except that $R^6$ is selected from the group consisting of 1,4-, 1,5-, or 1,6-diradicals. In a specific embodiment, $R^6$ is selected from the group consisting of 1,5-diradicals. In yet another embodiment, $R^6$ is selected from the group consisting of 1,4-diradicals, 1,5-diradicals, and 1,6-diradicals of $(C_6$-$C_{18})$arylene; 1,4-diradicals, 1,5-diradicals, and 1,6-diradicals of $(C_4$-$C_{20})$cycloalkylene; 1,4-diradicals, 1,5-diradicals, and 1,6-diradicals of $(C_3$-$C_{20})$alkylene; 2,6-heptylene (e.g.,

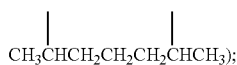

2,6-(2,6-dimethyl)heptylene; 3,3-dimethylpentylene; and ortho-xylylene. In yet another embodiment, $R^6$ is selected from the group consisting of (—CH$_2$CH$_2$Si(Me)$_2$CH$_2$CH$_2$—); (—CH$_2$CH$_2$Si($^i$Pr)$_2$CH$_2$CH$_2$—); (—CH$_2$CH$_2$Si(Oct)$_2$CH$_2$CH$_2$—); (—CH$_2$CH$_2$Ge(Me)$_2$CH$_2$CH$_2$—); (—CH$_2$CH$_2$Ge($^i$Pr)$_2$CH$_2$CH$_2$—); and (—CH$_2$CH$_2$Ge(Oct)$_2$CH$_2$CH$_2$—), wherein "Me" means methyl, "Oct" mean octyl, "$^i$Pr" or "i-Pr" means iso-propyl, and "$^t$Bu" or "t-Bu" means tert-butyl.

In one or more embodiments, $R^1$ and $R^8$ are independently chosen from substituted or unsubstituted $(C_1$-$C_{20})$alkyl, substituted or unsubstituted $(C_3$-$C_{20})$cycloalkyl, or $(C_6$-$C_{40})$aryl.

In one or more embodiments, $R^1$ and $R^8$ are independently chosen from cyclohexyl, 2-propyl, 2,6-diisopropylphenyl, 2,6-dimethylphenyl, tert-butyl, phenyl, or adamantyl. In some embodiments, each X is benzyl. In one or more embodiments, each $R^a$ and $R^b$ is independently phenyl or cyclohexyl.

Biphenyl Phosphaguanidine Ligand

According to another embodiment of this disclosure, a phosphaguanidine compound includes the structure of formula IV:

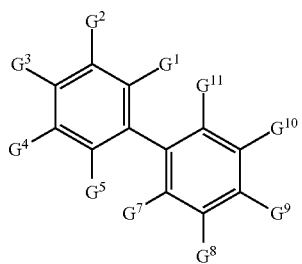

IV

Each of $G^1$, $G^2$, $G^3$, $G^4$, $G^5$, $G^7$, $G^8$, $G^9$, $G^{10}$, and $G^{11}$ are independently selected from hydrides, alkyl groups, aryl or heteroaryl groups, or a guanidine moiety; each phenyl ring includes at least one guanidine moiety. The guanidine moiety comprising the structure of formula V:

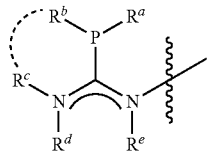

V

The guanidine moiety has five different R groups: $R^a$, $R^b$, $R^c$, $R^d$, and $R^e$. $R^d$ and $R^e$ include the same or different moieties selected from hydrides, aliphatic moieties, heteroaliphatic moieties, aromatic moieties, heteroaromatic moieties, or may include lone pair of electrons. $R^c$ is selected from hydrides, aliphatic moieties, heteroaliphatic moieties, aromatic moieties, heteroaromatic moieties and/or lone pairs of electrons. $R^a$ and $R^b$ include the same or different moieties selected from aliphatic moieties, heteroaliphatic moieties, aromatic moieties, or heteroaromatic moieties. Each curved dotted line optionally defines a bridging connection as defined within this disclosure. In cases in which there are a plurality of guanidine moieties, $R^a$, $R^b$, $R^c$, $R^d$, and $R^e$ may be the same or different within the plurality of guanidine moieties.

In one embodiment of formula IV has a guanidine moiety in place of at least one G group on each of the phenyl rings, thus creating one embodiment wherein formula IV has two guanidine moieties. Each R group (i.e. $R^a$, $R^b$, $R^c$, $R^d$ and $R^e$) on the guanidine moiety can have a different substituent on each guanidine moiety. For example, having two guanidine moieties on formula IV, one moiety might have a methyl group in the $R^c$ position and the other guanidine moiety may have an ethyl group. In further embodiments, formula IV may include four guanidine moieties such that $G^1$, $G^5$, $G^7$, and $G^{11}$ include the guanidine moiety of formula V, and $G^2$, $G^3$, $G^4$, $G^8$, $G^9$, and $G^{10}$ are hydrogen atoms in which every $R^c$ group includes a different substituent. However, some embodiments may include the same substituent throughout the plurality of guanidine moieties. Additional embodiments of formula IV include other moieties in addition to the guanidine moiety such that $G^1$, $G^3$, $G^5$, $G^7$, $G^9$, and $G^{11}$ are hydrides, alkyl, aryl, or heteroaryl moieties, and $G^2$, $G^4$, $G^8$, and $G^{10}$ include the guanidine moiety of formula IV.

Various ligands may also include the guanidine moiety of formula IV. In the guanidine moiety of formula IV, one of $R^d$ and $R^e$ is a hydrogen atom, an aliphatic moiety, a heteroaliphatic moiety, an aromatic moiety, a heteroaromatic moiety and the other of $R^b$ and $R^c$ is a lone pair of electrons. In some embodiments of the guanidine moiety, $R^a$ is selected from phenyl, substituted phenyl, or alkyl moieties including, but not limited to cyclohexyl or cyclopentyl moieties. In other embodiments, $R^b$ is selected from phenyl, substituted phenyl, or alkyl moieties including, but not limited to cyclohexyl or cyclopentyl moieties; and in further embodiments, $R^d$ is selected from hydride, methyl, ethyl, iso-propyl, cyclohexyl, iso-butyl, benzyl, adamantyl, tert-butyl, phenyl, 2,6-dimethylphenyl, 2,6-diiso-propylphenyl, and/or a lone pair of electrons; and $R^e$ is selected from hydride, methyl, ethyl, iso-propyl, cyclohexyl, iso-butyl, benzyl, adamantyl, tert-butyl, phenyl, 2,6-dimethylphenyl, 2,6-diiso-propylphenyl, and/or lone pair of electrons.

As described above, the dotted line linking $R^c$ to $R^b$ is optionally a bridging connection. In some embodiments, $R^c$ and $R^b$ are part of a single aromatic or aliphatic moiety.

Naphthyl Phosphaguanidine Compound

Accordingly, another embodiment of this disclosure, a phosphaguanidine compound includes the structure of formula VI, which is a phosphaguanidine naphthalene compound:

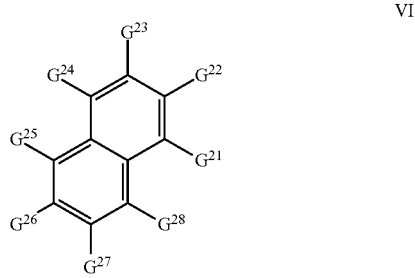

VI

In formula VI, $G^{21}$, $G^{22}$, $G^{23}$, $G^{24}$, $G^{25}$, $G^{27}$, and $G^{28}$ are independently selected from hydrides, alkyl groups, heteroalkyl groups, aryl or heteroaryl groups, or alkylguanidine moiety; each phenyl ring comprises at least one guanidine moiety, the guanidine moiety of formula V.

Phenylphosphaguanidine Ligand

In a further embodiment, a phosphaguanidine compound also includes the structure of formula VII:

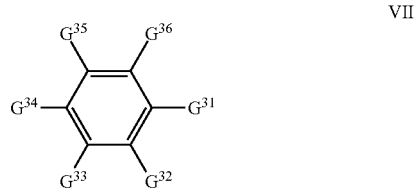

VII

In formula VII, $G^{31}$, $G^{32}$, $G^{33}$, $G^{34}$, and $G^{35}$ are independently selected from hydrides, alkyl groups, heteroalkyl groups, aryl groups, heteroaryl groups, alkylguanidine moieties or guanidine moieties; the phenyl ring comprises at least one guanidine moiety, wherein the guanidine moiety comprises the structure of formula V as described in preceding paragraphs.

Both the naphthyl phosphaguanidine compound of formula IV, the bis-phenyl phosphaguanidine compound of formula VI, and phenylphosphaguanidine compound of formula VII can be individually combined with a transition metal to form a catalyst, a pro-catalyst, or a metal-ligand complex. The transition metal includes, but is not limited to, hafnium, zirconium, titanium, palladium, rhodium, copper, zinc, cobalt, vandadium, chromium, molybdenum, tungsten, manganese, iron, ruthenium, iridium, nickel, platinum, silver, or gold.

The term "independently selected" is used herein to indicate that the R groups, such as, $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The terms "moiety," "functional group," "group," or "substituent" may be used interchangeably in this specification, but those of skill in the art may recognize certain parts of a complex or compound as being a moiety rather than a functional group and vice versa. Additionally, the term "moiety" includes functional groups and/or discrete bonded residues that are present in the phosphaguanidine compounds or metal-ligand complexes of this disclosure. The term "moiety" as used in the present application is inclusive of individual units in the copolymers or the individual units within the polymeric ligand, as described in formula II.

The term "complex" means a metal and ligand coordinated together to form a molecular compound. The coordination may be formed through dative or covalent bonds. For the purposes of illustration, certain representative groups are defined within this disclosure. These definitions are intended to supplement and illustrate, not preclude, the definitions known to those of skill in the art.

The term "aliphatic" encompasses the terms "alkyl," "branching alkyl," "$(C_1-C_{40})$hydrocarbyls," "substituted $(C_1-C_{40})$hydrocarbyls," "$(C_3-C_{40})$hydrocarbylene," and "substituted $(C_3-C_{40})$hydrocarbylene."

The term "heteroaliphatic" includes "$(C_1-C_{40})$heterohydrocarbyls," and "substituted $(C_1-C_{40})$heterohydrocarbyls," "[$(C+Si)_3$—$(C+Si)_{40}$] organosilylene," "substituted [$(C+Si)_3$-$(C+Si)_{40}$] organosilylene," "[$(C+Ge)_3$—$(C+Ge)_{40}$] organogermylene," and substituted [$(C+Ge)_3$-$(C+Ge)_{40}$] organogermylene."

The term "aromatic" or "aryl" encompasses the terms: "$(C_6-C_{40})$aryl" and "substituted $(C_6-C_{40})$aryl group." The term "heteroaromatic" includes "$(C_1-C_{40})$heteroaryl," and "$(C_2-C_{40})$heteroaryl."

In an alternative embodiment, each of the $(C_1-C_{40})$hydrocarbyl and $(C_1-C_{40})$heterohydrocarbyl of any one or more of $R^1$, $R^2$, $R^4$ and $R^5$ independently is unsubstituted or substituted with one or more $R^S$ substituents, and wherein each $R^S$ independently is a halogen atom, polyfluoro substitution, perfluoro substitution, unsubstituted $(C_1-C_{18})$alkyl, $(C_6-C_{18})$aryl, $(C_3-C_{18})$heteroaryl, $F_3C$, $FCH_2O$, $F_2HCO$, $F_3CO$, $(R^C)_3$Si, $(R^C)_3$Ge, $(R^C)O$, $(R^C)S$, $(R^C)S(O)$, $(R^C)S(O)_2$, $(R^C)_2P$, $(R^C)_2N$, $(R^C)_2C{=}N$, NC, $NO_2$, $(R^C)C(O)O$, $(R^C)OC(O)$, $(R^C)C(O)N(R^C)$, or $(R^C)_2NC(O)$, or two of the $R^S$ are taken together to form an unsubstituted $(C_1-C_{18})$alkylene, wherein each $R^S$ independently is an unsubstituted $(C_1-C_{18})$alkyl.

When used to describe certain carbon atom-containing chemical groups (e.g., $(C_1-C_{40})$alkyl), the parenthetical expression $(C_1-C_{40})$ can be represented by the form "$(C_x-C_y)$," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted $(C_1-C_{40})$alkyl contains from 1 to 40 carbon atoms (x=1 and y=40). When the chemical group is substituted by one or more carbon atom-containing $R^S$ substituents, the substituted $(C_x-C_y)$ chemical group may comprise more than y total carbon atoms; i.e., the total number of carbon atoms of the carbon atom-containing substituent(s)-substituted $(C_x-C_y)$ chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g. $R^1$, $R^2$, $R^3$, $R^4$, $R^5$, and $R^6$) of the phosphaguanidine compounds I, II, IV, V, VI, and VII and metal complex of formula III may be unsubstituted, that is, can be defined without use of a substituent $R^S$, provided the above-mentioned conditions are satisfied. In other embodiments, at least one of the chemical groups of the phosphaguanidine compounds I, II, IV, V, VI, and VII, and metal-ligand complexes of formula III independently contain one or more of the substituents $R^S$. When the phosphaguanidine compound or metal-ligand complex contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$). The $(C_1-C_{18})$alkylene and $(C_1-C_8)$alkylene substituents are especially useful for forming substituted chemical groups that are bicyclic or tricyclic analogs, as the case may be, of corresponding monocyclic or bicyclic unsubstituted chemical groups.

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene, organosilylene, organogermylene are intended to include every possible stereoisomer.

Heteroalkyl and heteroalkylene groups are saturated straight or branched chain radicals or diradicals, respectively, containing $(C_1-C_{40})$carbon atoms, and one or more of the heteroatoms or heteroatomic groups O; S; N; S(O); $S(O)_2$; $S(O)_2N$; $Si(R^C)_2$; $Ge(R^C)_2$; $P(R^C)$; $P(O)(R^C)$; and $N(R^C)$, as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In some embodiments, $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In further embodiments, each of the aforementioned $(C_1-C_{40})$hydrocarbyl groups independently has a maximum of 20 carbon atoms (i.e., $(C_1-C_{20})$hydrocarbyl), and in other embodiments, a maximum of 15 carbon atoms.

The term "$(C_1-C_{40})$alkyl" means a saturated straight or branched hydrocarbon radical of from 1 to 40 carbon atoms that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; 1-decyl; 2,2,4-trimethylpentyl; examples of substituted $(C_1-C_{40})$alkyl are substituted $(C_1-C_{20})$alkyl; substituted $(C_1-C_{10})$alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl)silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl are unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl are substituted $(C_6-C_{20})$aryl; substituted $(C_6-C_{18})$aryl; 2,6-bis[$(C_1-C_{20})$alkyl]-phenyl; 2-$(C_1-C_5)$alkyl-phenyl; 2,6-bis$(C_1-C_5)$alkyl-phenyl; 2,4,6-tris$(C_1-C_5)$alkyl-phenyl; polyfluorophenyl; pentafluorophenyl; 2,6-dimethylphenyl, 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "$(C_3-C_{40})$cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl; cyclopropyl; cyclobutyl; cyclopentyl; cyclohexyl; cycloheptyl; cyclooctyl; cyclononyl; cyclodecyl; octahydroindenyl; bicyclo[4.4.0]decyl; bicyclo[2.2.1]heptyl; and tricyclo[3.3.1.1]decyl. Examples of substituted $(C_3-C_{40})$cycloalkyl are substituted $(C_3-C_{20})$cycloalkyl; substituted $(C_3-C_{10})$cycloalkyl; 2-methylcyclohexyl; and perfluorocyclohexyl.

Examples of $(C_1-C_{40})$hydrocarbylene are unsubstituted or substituted $(C_3-C_{40})$hydrocarbylene; $(C_6-C_{40})$arylene, $(C_3-C_{40})$cycloalkylene, and $(C_3-C_{40})$alkylene (e.g., $(C_3-C_{20})$alkylene). In some embodiments, the diradicals are on the terminal atoms of the hydrocarbylene as in a 1,3-alpha, omega diradical (e.g., —$CH_2CH_2CH_2$—) or a 1,5-alpha, omega diradical with internal substitution (e.g., —$CH_2CH_2CH(CH_3)CH_2CH_2$—). In other embodiments, the diradicals are on the non-terminal atoms of the hydrocarbylene as in a $C_7$ 2,6-diradical (e.g.,

$CH_3\overset{|}{C}HCH_2CH_2CH_2\overset{|}{C}HCH_3)$ or a $C_7$ 2,6-diradical with internal substitution (e.g.,

$CH_3CHCH_2CH(CH_3)CH_2CHCH_3$).

The terms $[(C+Si)_3—(C+Si)_{40}]$ organosilylene and $[(C+Ge)_3—(C+Ge)_{40}]$ organogermylene are defined as diradicals in which the two radical bearing atoms of the diradical unit are spaced apart by one or more intervening carbon, silicon and/or germanium atoms such that there are at least three atoms in the shortest chain connecting the bridged N atoms of formulas I, II, and III. Such $[(C+Si)_3—(C+Si)_{40}]$ organosilylene and $[(C+Ge)_3—(C+Ge)_{40}]$ organogermylene groups can be substituted or unsubstituted. In some embodiments the diradicals are on the terminal atoms of the organosilylene or organogermylene as in a 1,5 alpha, omega diradical (e.g. $—CH_2CH_2Si(C_2H_5)_2CH_2CH_2—$ and $—CH_2CH_2Ge(C_2H_5)_2CH_2CH_2—$). In other embodiments, the diradicals are on the non-terminal atoms of the organosilylene or organogermylene as in a substituted $(C+Si)_7$ 2,6-diradical

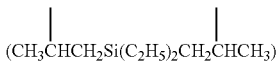
$(CH_3CHCH_2Si(C_2H_5)_2CH_2CHCH_3)$ and a substituted $(C+Ge)_7$ 2,6-diradical

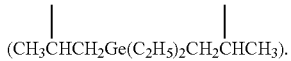
$(CH_3CHCH_2Ge(C_2H_5)_2CH_2CHCH_3)$.

The term "$(C_1-C_{40})$alkylene" means a saturated or unsaturated straight chain or branched chain diradical of from 1 to 40 carbon atoms that is unsubstituted or substituted by one or more $R^S$. Examples of unsubstituted $(C_1-C_{40})$alkylene are unsubstituted $(C_3-C_{20})$alkylene, including unsubstituted 1,3-$(C_3-C_{10})$alkylene; 1,4-$(C_4-C_{10})$alkylene; $—(CH_2)_3—$; $—(CH_2)_4—$; $—(CH_2)_5—$; $—(CH_2)_6—$; $—(CH_2)_7—$; $—(CH_2)_8—$; and $—(CH_2)_4CH(CH_3)—$. Examples of substituted $(C_1-C_{40})$alkylene are substituted $(C_1-C_{20})$alkylene; $—CF_2CF_2CF_2—$; and $—(CH_2)_{14}C(CH_3)_2(CH_2)_5—$ (i.e., a 6,6-dimethyl substituted normal-1,20-eicosylene). Since as mentioned previously two $R^S$ may be taken together to form a $(C_1-C_{40})$alkylene, examples of substituted $(C_1-C_{40})$alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Connection of the chelating substituents to a cycloalkylene $R^6$ group of formulas I and II must also satisfy the requirement that there be at least three atoms in the shortest chain connecting the bridged N atoms of formulas I, II, and III. Examples of unsubstituted $(C_3-C_{40})$cycloalkylene are 1,3-cyclobutylene, 1,3-cyclopentylene, and 1,4-cyclohexylene. Examples of substituted $(C_3-C_{40})$cycloalkylene are 2-trimethylsilyl-1,4-cyclohexylene and 1,2-dimethyl-1,3-cyclohexylene.

The terms "$(C_1-C_{40})$heterohydrocarbyl" and "$(C_1-C_{40})$heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^C$)$_2$; Ge(R$^C$)$_2$; P(R$^C$); P(O)(R$^C$); and N(R$^C$), wherein independently each R$^C$ is hydrogen, unsubstituted $(C_1-C_{18})$hydrocarbyl or an unsubstituted $(C_1-C_{18})$heterohydrocarbyl, or absent (e.g., absent when N comprises —N=). Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^C$)$_2$—, $(C_1-C_{40})$hydrocarbyl-Ge(R$^C$)$_2$—, $(C_1-C_{40})$hydrocarbyl-N(R$^C$)—, $(C_1-C_{40})$hydrocarbyl-P(R$^C$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. The term "$(C_1-C_{40})$heteroaryl" means an unsubstituted or substituted (by one or more $R^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., $(C_1-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical is a fused 5,6,5-; 5,6,6-; 6,5,6-; or 6,6,6-ring system. An example of the fused 5,6,5-ring system is 1,7-dihydropyrrolo[3,2-ƒ]indol-1-yl. An example of the fused 5,6,6-ring system is 1H-benzo[ƒ]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments, the $(C_2-C_{40})$heteroaryl is 2,7-disubstituted carbazolyl or 3,6-disubstituted carbazolyl, wherein each $R^S$ independently is phenyl, methyl, ethyl, isopropyl, or tertiary-butyl, 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Each halogen atom independently is the Br radical, F radical, or Cl radical. The term "halide" means fluoride (F$^-$), chloride (Cl$^-$), bromide (Br$^-$), or iodide (I$^-$) anion.

There are no O—O, S—S, or O—S bonds, other than O—S bonds in an S(O) or S(O)$_2$ diradical functional group, in the polymerization catalysts of formulas III. Additionally, there are no O—O, P—P, S—S, or O—S bonds, other than O—S bonds in an S(O) or S(O)$_2$ diradical functional group, in the polymerization catalysts of formula III.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, carbon-silicon double bonds, and carbon-nitrogen triple bonds, not including any such double bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each X independently is a monodentate or polydentate ligand that is neutral, monoanionic, or dianionic. X and n are chosen in such a way that the polymerization catalysts of formulas III, VIII, and IX are, overall, neutral. In some embodiments, each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, HC(O)O$^-$, alkoxide or aryloxide (RO$^-$), $(C_1-C_{40})$hydrocarbylC(O)O$^-$, HC(O)N(H)$^-$, $(C_1-C_{40})$hydrocarbylC(O)N(H)$^-$, $(C_1-C_{40})$hydrocarbylC(O)N((C_1-C_{20})$hydrocarbyl)$^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined previously.

In some embodiments, at least one monodentate ligand of X independently is the neutral ligand. In one embodiment, the neutral ligand is a neutral Lewis base group that is $R^XNR^KR^L$, $R^KOR^L$, $R^KSR^L$, or $R^XPR^KR^L$, wherein each $R^X$ independently is hydrogen, $(C_1-C_{40})$hydrocarbyl, [$(C_1-C_{10})$hydrocarbyl]$_3$Si, [$(C_1-C_{10})$hydrocarbyl]$_3$Si$(C_1-C_{10})$hydrocarbyl, or $(C_1-C_{40})$heterohydrocarbyl and each $R^K$ and $R^L$ independently is as defined previously.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^KR^LN$— wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$— wherein each of $R^K$ and $R^L$ independently is an unsubstituted $(C_1-C_{10})$hydrocarbyl.

In some embodiments, there are at least two X groups, and the two X groups are taken together to form the bidentate ligand. In some embodiments the bidentate ligand is a neutral bidentate ligand. In one embodiment, the neutral bidentate ligand is a diene of formula $(R^D)_2C\!=\!C(R^D)\!-\!C(R^D)\!=\!C(R^D)_2$, wherein each $R^D$ independently is H, unsubstituted $(C_1-C_6)$alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E\!-\!C(O^-)\!=\!CH\!-\!C(\!=\!O)\!-\!R^E$ (D), wherein each $R^D$ independently is H, unsubstituted $(C_1-C_6)$alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$ heterohydrocarbylene dicarbanion, phosphate, or sulfate.

As previously mentioned, number and charge (neutral, monoanionic, dianionic) of X are selected depending on the formal oxidation state of M such that the polymerization catalysts of formula III are, overall, neutral.

In some embodiments, each X is the same, wherein each X is independently selected from a methyl, isobutyl, neopentyl, neophyl, trimethylsilylmethyl, phenyl, benzyl, dimethylamido, or chloro moiety. In other embodiments, at least two X groups are different; and in further embodiments, each X is a different one of methyl, isobutyl, neopentyl, neophyl, trimethylsilylmethyl, phenyl, benzyl, and chloro.

The "bridging connection," which is optional in formulas I, II, III, IV, V, VI and VII connects one R group to a different R group. For example, in formula III, $R^2$ can optionally be connected to $R^1$ via a bridging connection that is separate from the formula III, as depicted. The bridging connection can be an aliphatic moiety, a heteroaliphatic moiety, an aryl moiety or a heteroaryl moiety. The optional bridging connections are at least three atoms. In formulas III and V, the R groups that could form a bridging connection are bonded to heteroatoms, therefore the atoms in the "bridging connection" are the fewest number of atoms from one heteroatom to the other heteroatom. While the dotted lines depicting the bridging connections are not drawn in formulas I and II, the bridging connections may be present, since formula III is produced by combining formula I with a transition metal as previously discussed.

There is one type of polymerization catalysts within this disclosure. The polymerization catalyst results from formula III. While all of these compounds are categorized as "polymerization catalysts," which include a phosphaguanidine compound, it should be noted that these polymerization catalysts are "metal-ligand complexes" and may be referred to as such.

In one embodiment, the polymerization catalyst of formula III is a mononuclear metal complex. In another embodiment, the polymerization catalyst of formula III comprises a tetradentate bis-amidine ligand. In another embodiment, with bridging units attached to the central nitrogen donors, the tethered structures enforce metal complex geometries most amenable to catalysis.

In one embodiment, the olefin polymerization catalyst system comprises a a metal-ligand complex according to formula III, which facilitaes the production of high molecular weight ($M_w$) polyolefins with narrow polydispersity and especially low octene incorporation.

The following structures with the name, MCI-#, are a specific embodiment of formula III.

Embodiments of Metal-ligand Complexes of Formula III

MCI-1

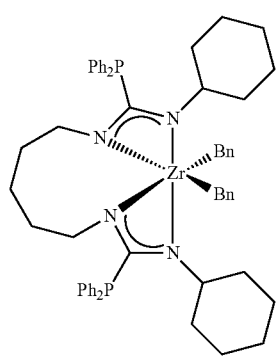

MCI-2

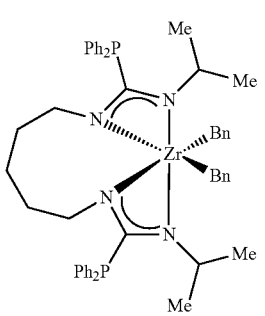

MCI-3

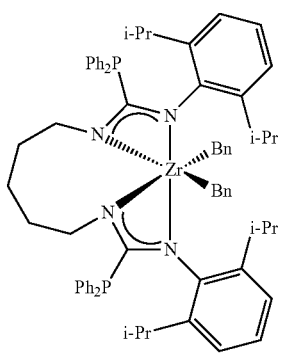

MCI-4

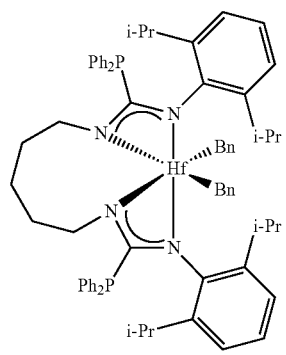

MCI-5

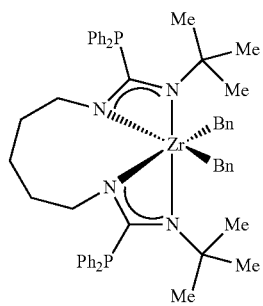

MCI-6

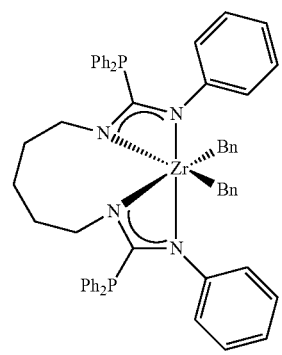

MCI-7

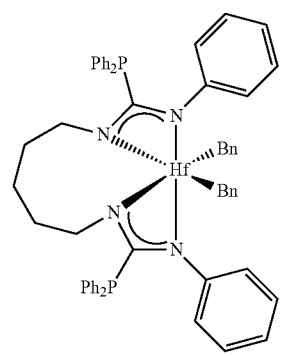

-continued
MCI-8
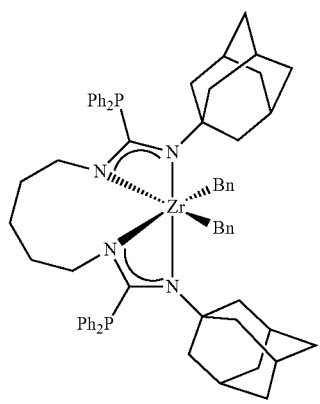
MCI-9
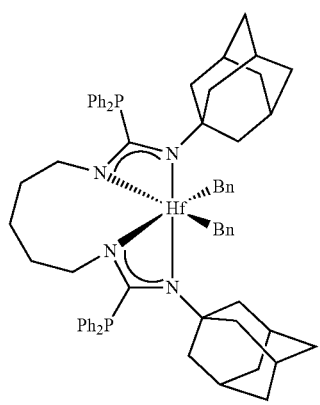
MCI-10
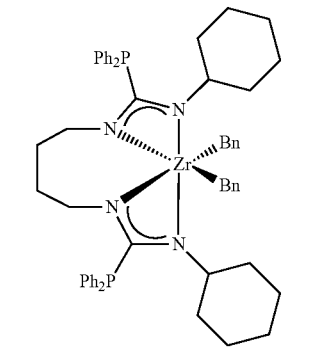
MCI-11
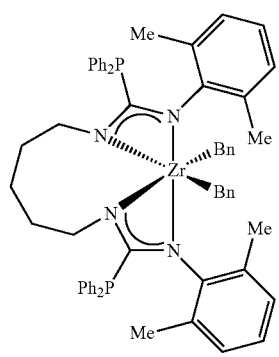
-continued
MCI-12
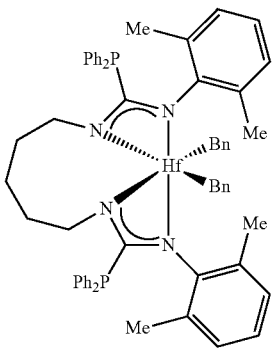
MCI-13
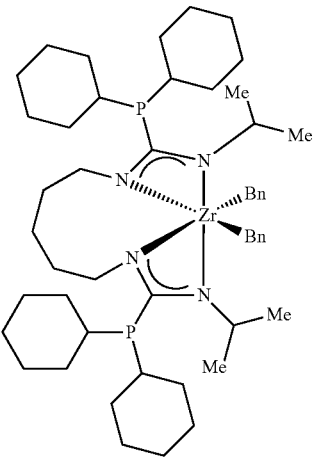
MCI-14
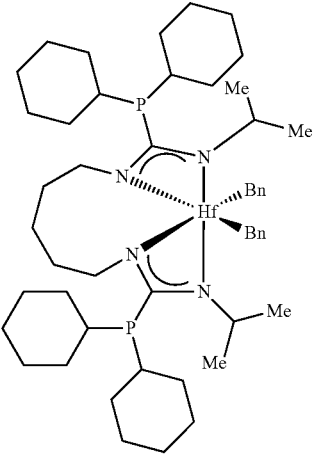

MCI-15
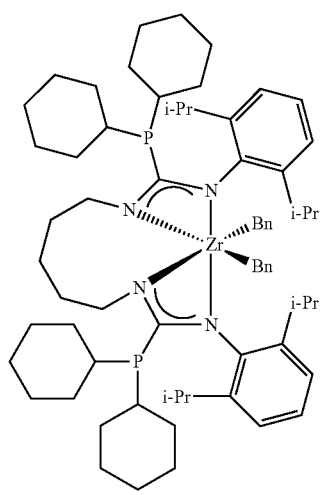
MCI-16
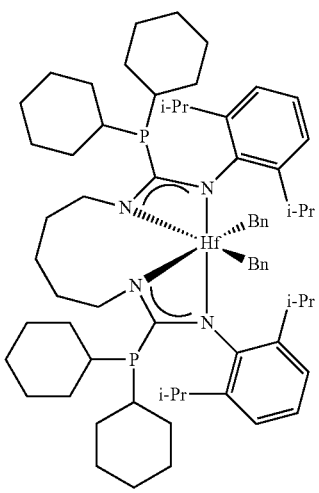
MCI-17
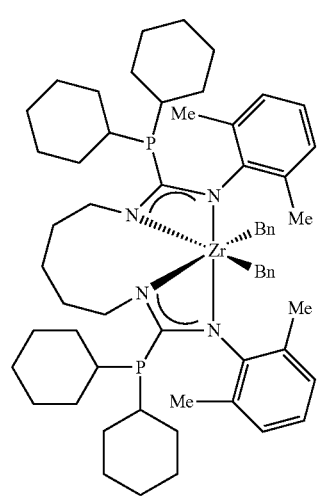
MCI-18
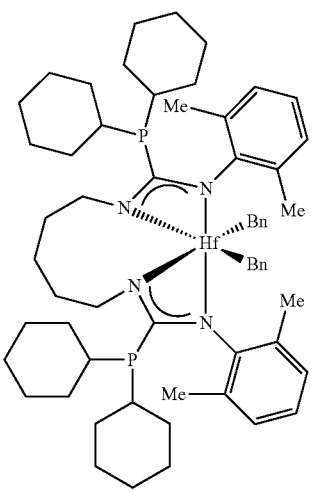
There are various phosphaguanidine ligands contemplated within this disclosure that with the addition of a metal form the metal-ligand complexes previously listed.
L1
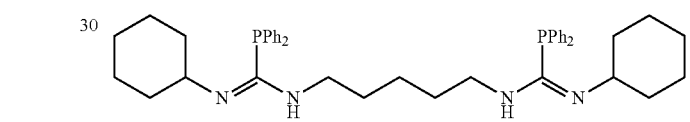
L2
L3
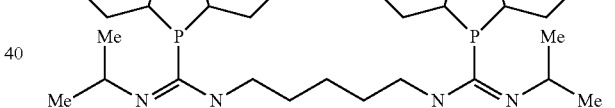
L4
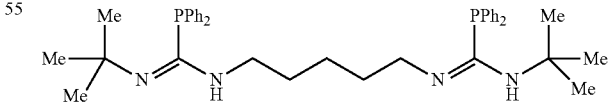
L5
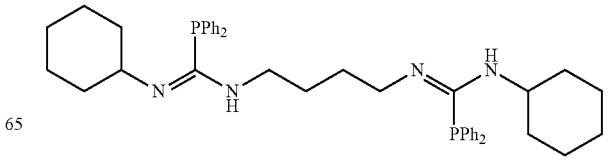

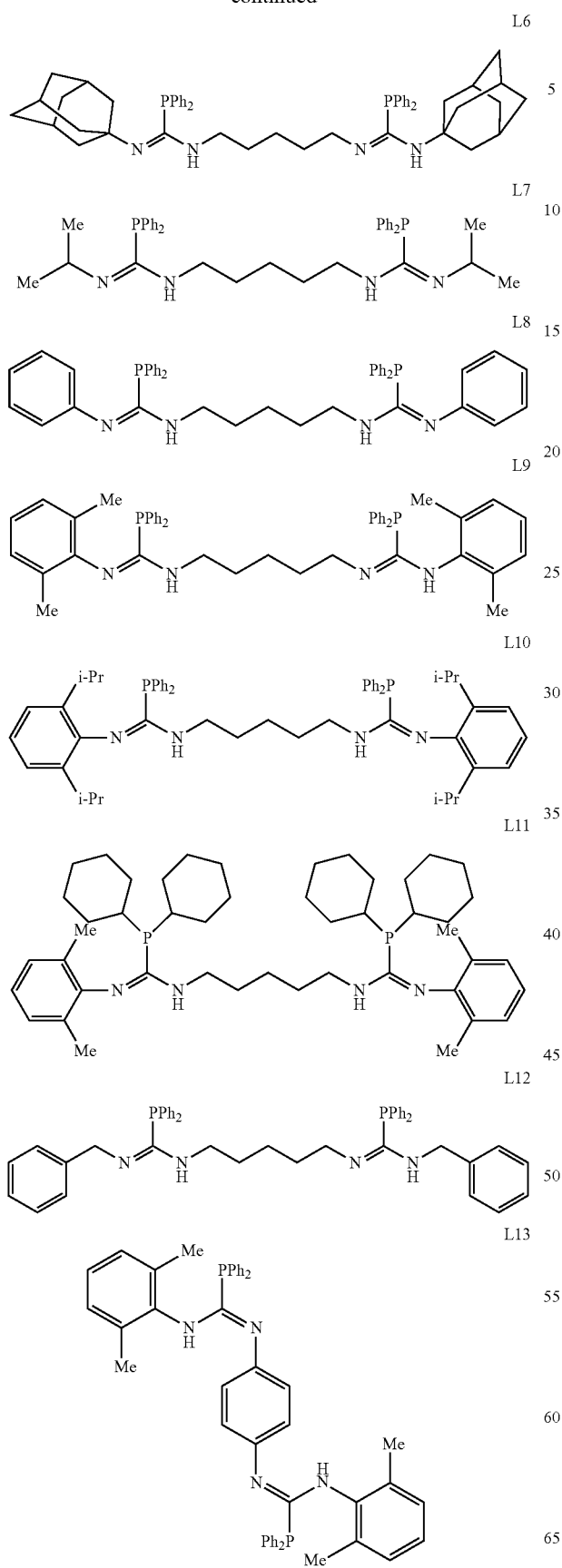
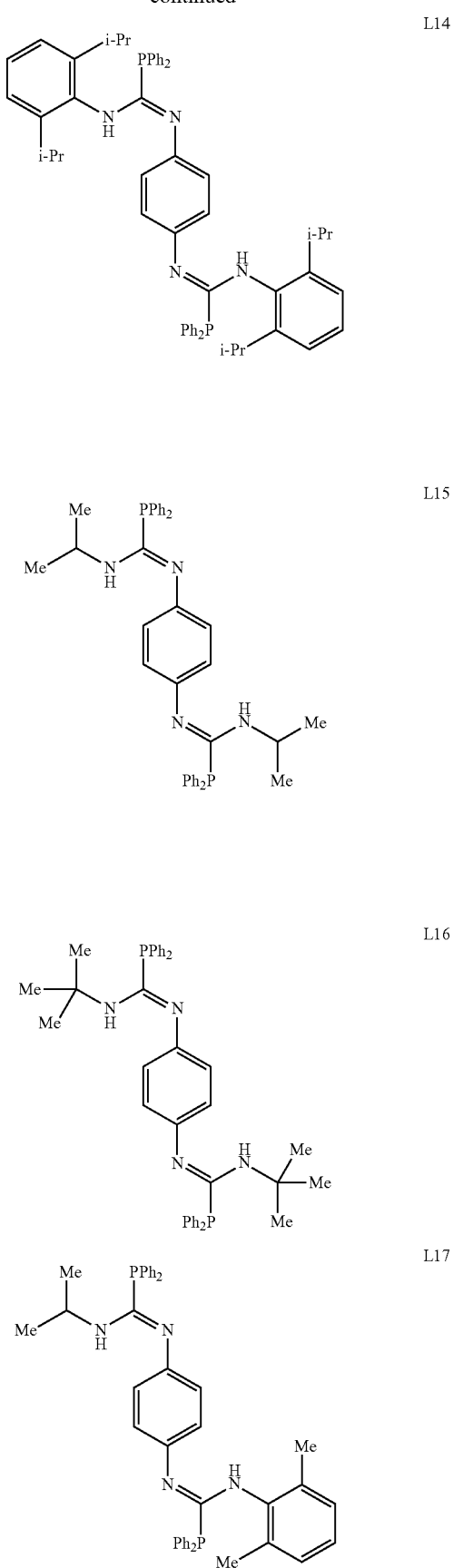

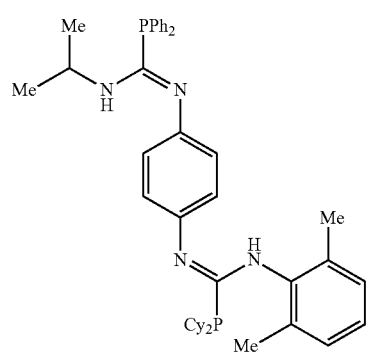
L18
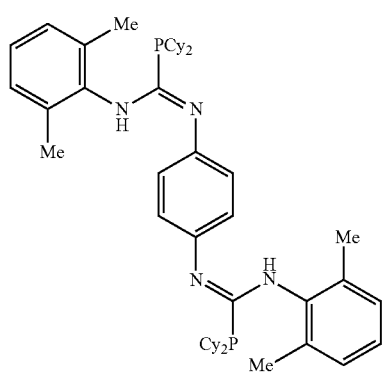
L19
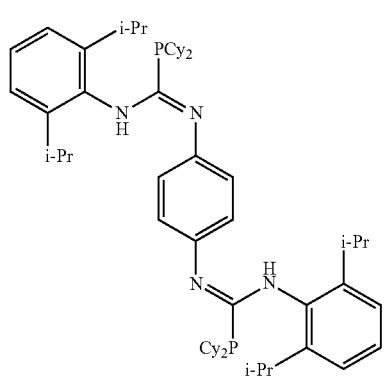
L20
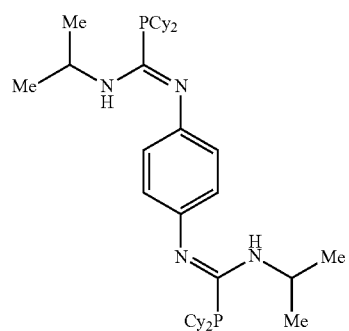
L21
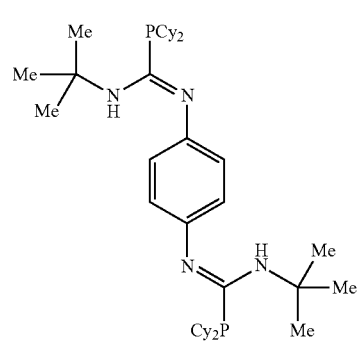
L22
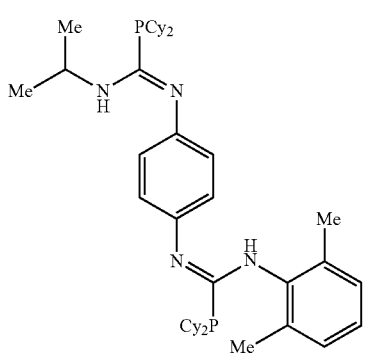
L23
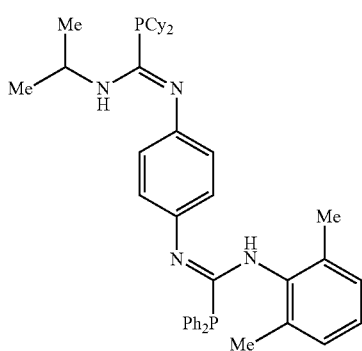
L24
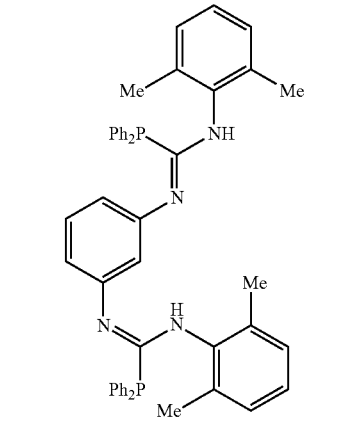
L25

L26 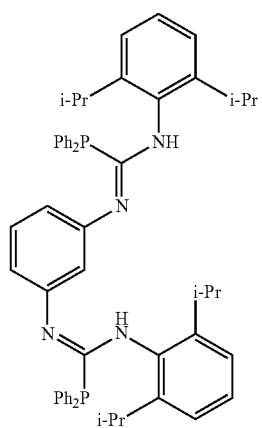
L27 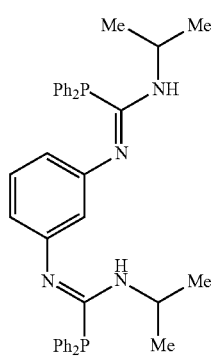
L28 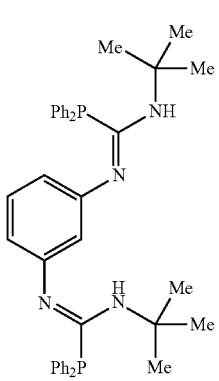
L29 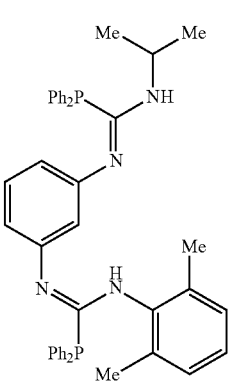
L30 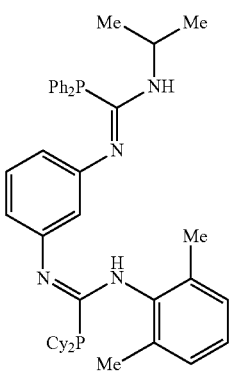
L31 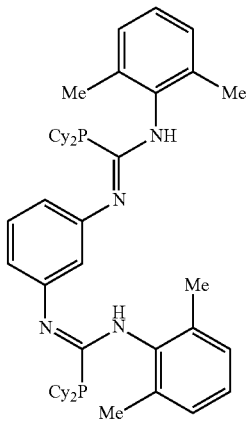
L32 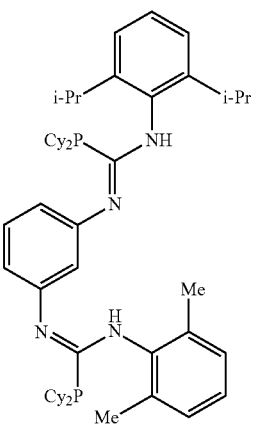
L33 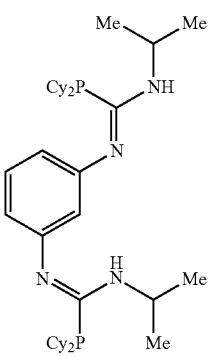

L34 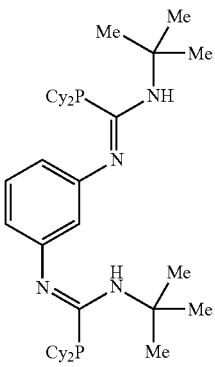
L35 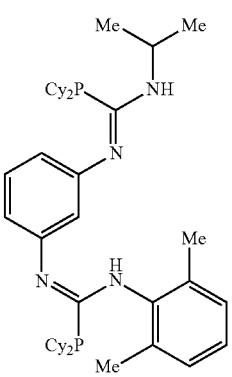
L36 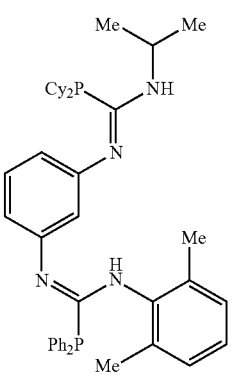
L37 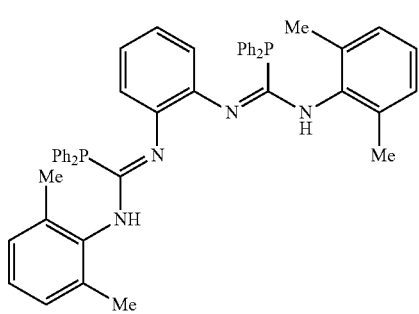
L38 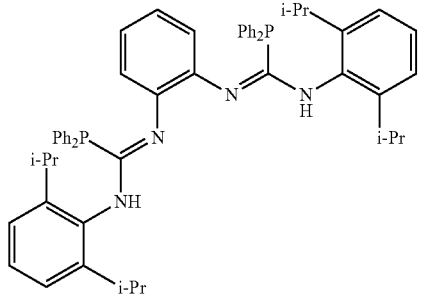
L39 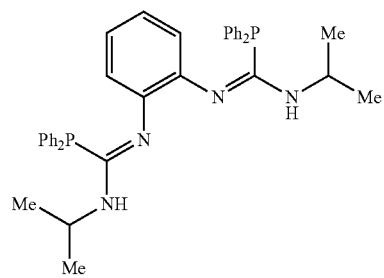
L40 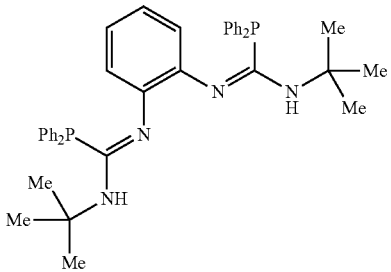
L41 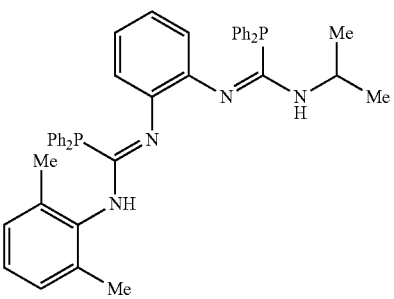
L42 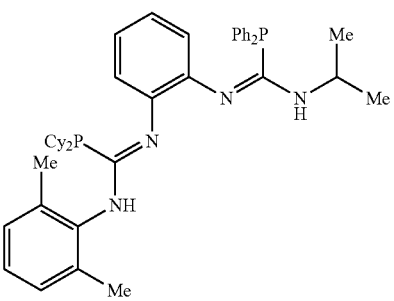

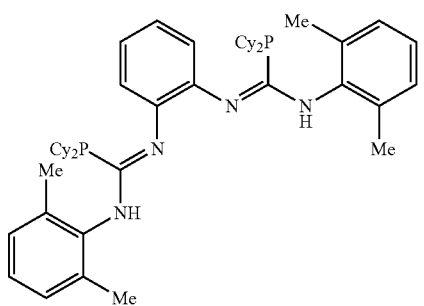
L43
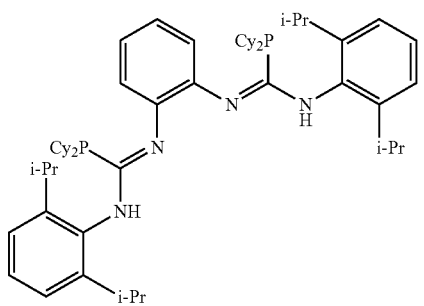
L44
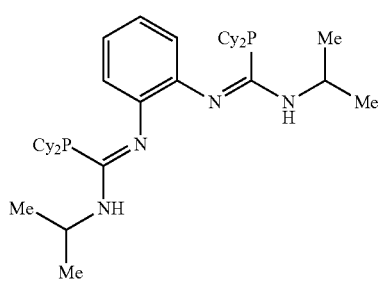
L45
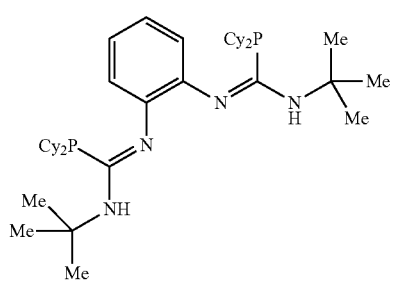
L46
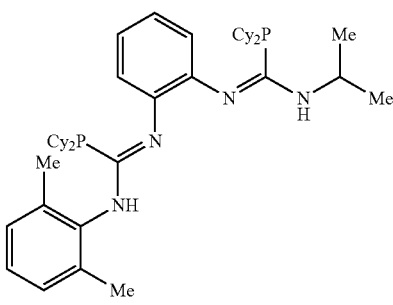
L47
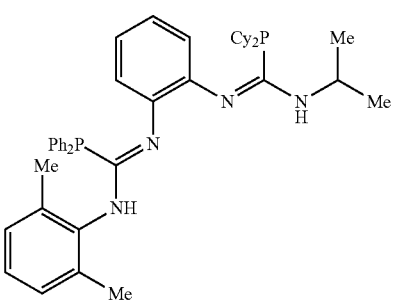
L48
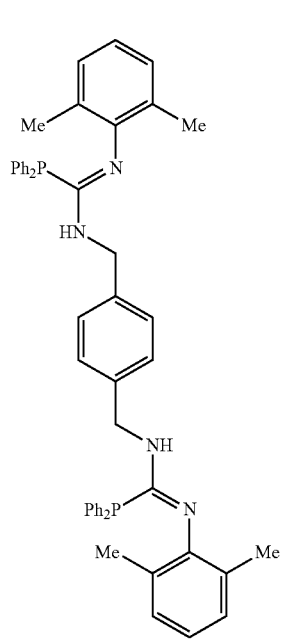
L49
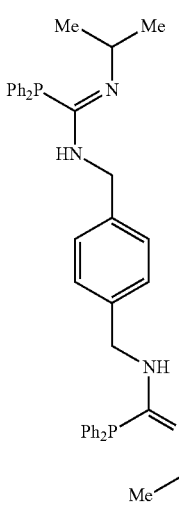
L50

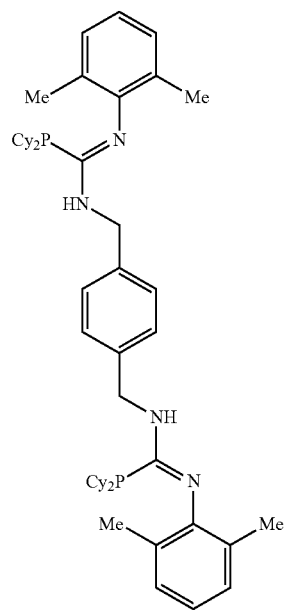
L51
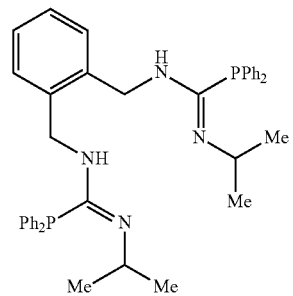
L54
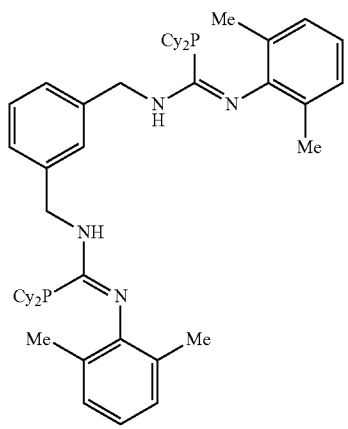
L55
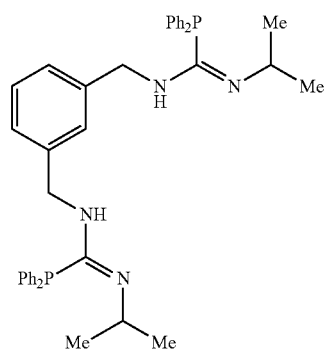
L52
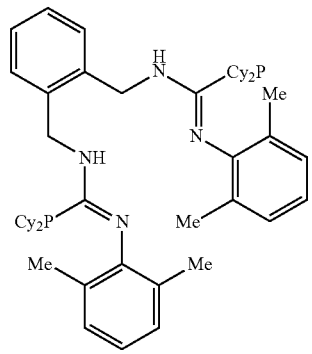
L56
L53
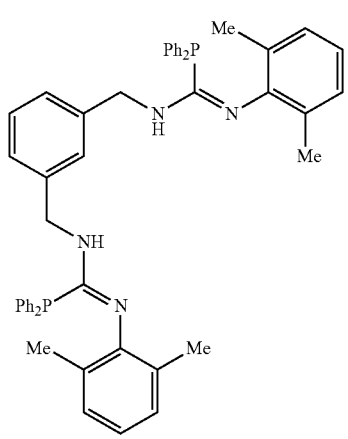
L57

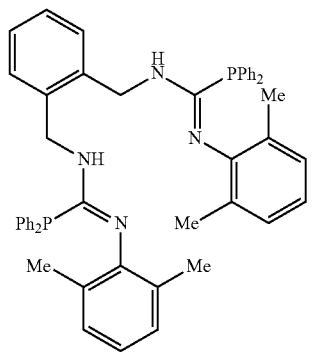 L58
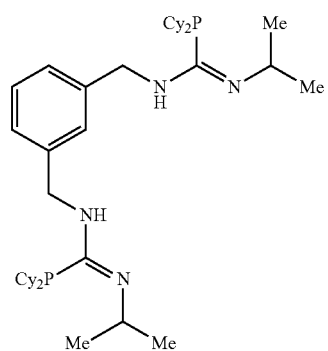 L59
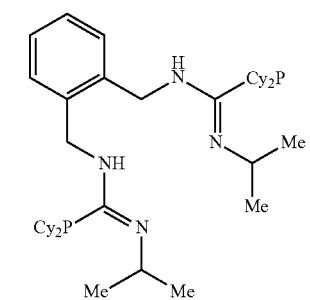 L60
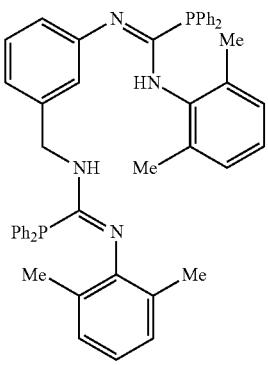 L61
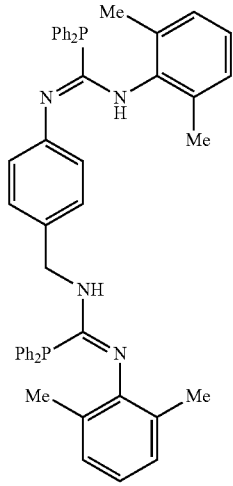 L62
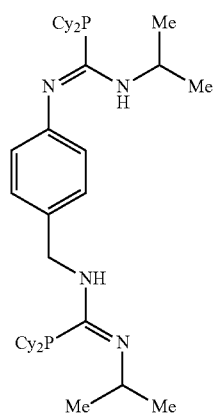 L63
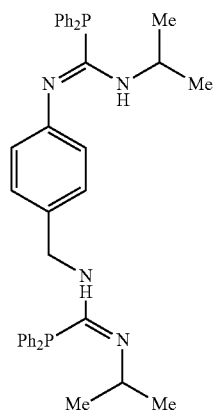 L64

-continued
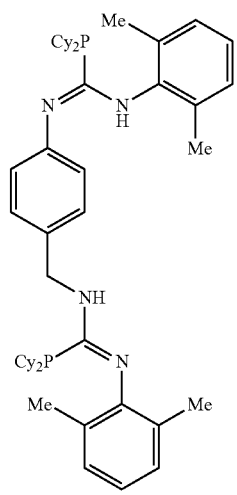
L65
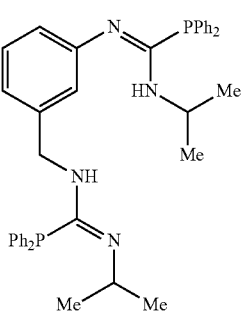
L66
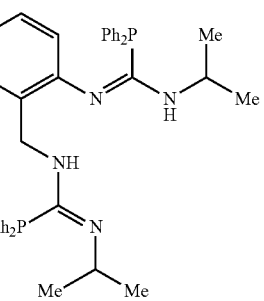
L67
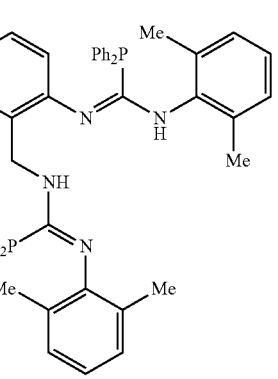
L68
-continued
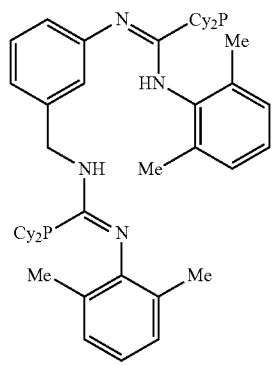
L69
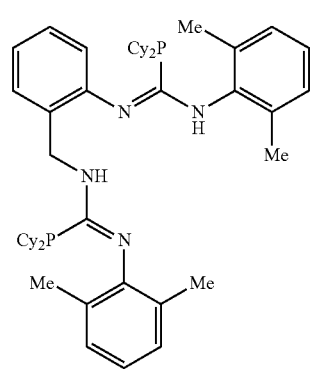
L70
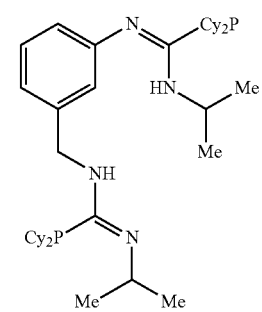
L71
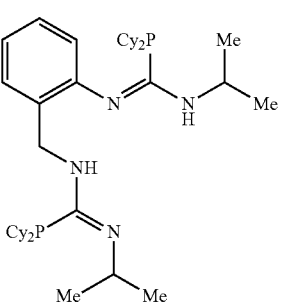
L72

L73
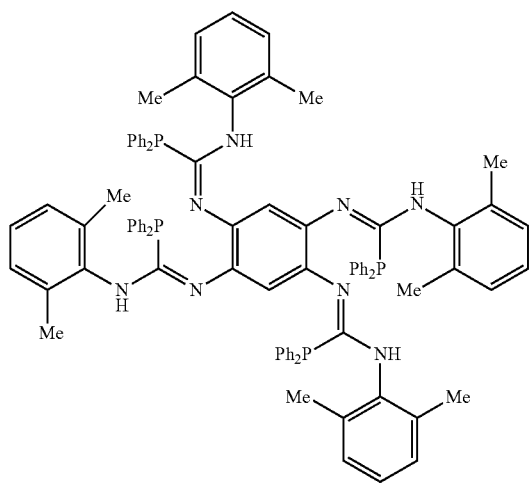
L74
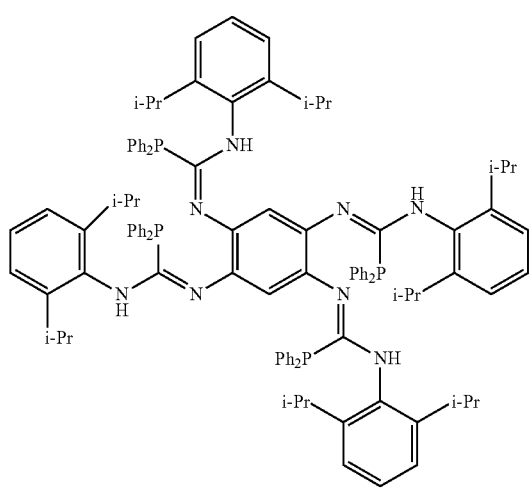
L75
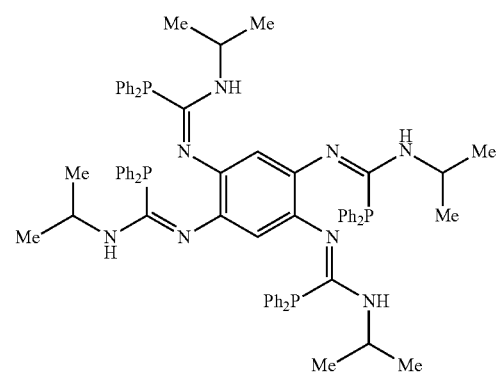
L76
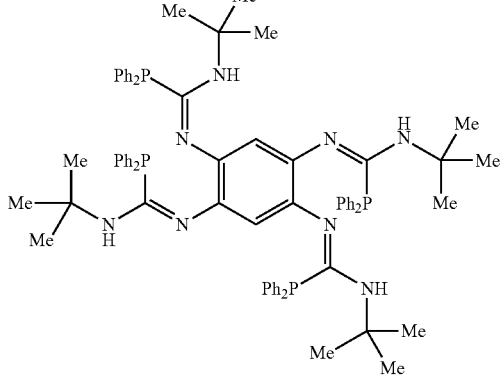
L77
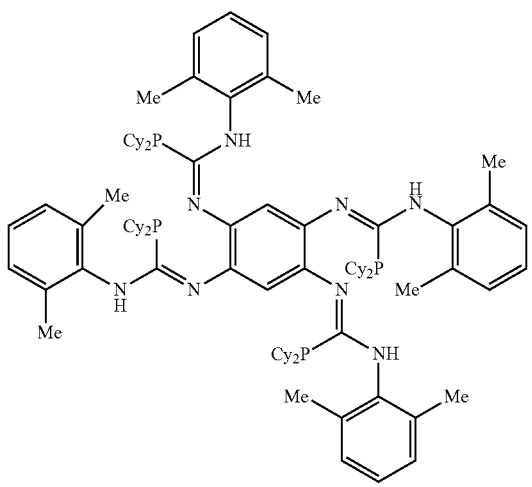
L78
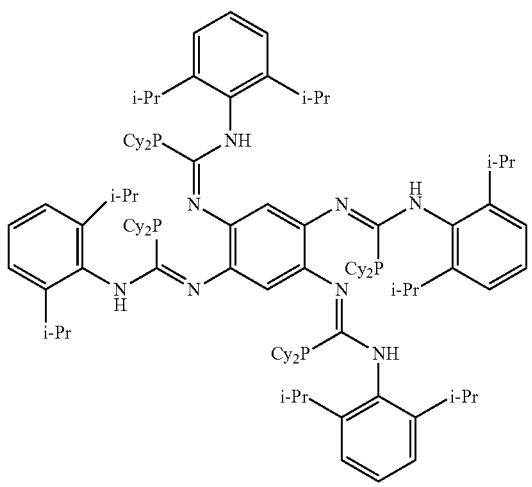

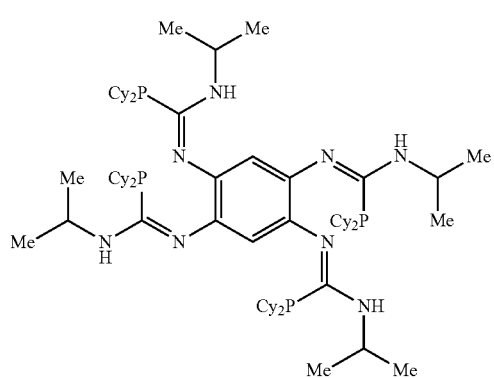
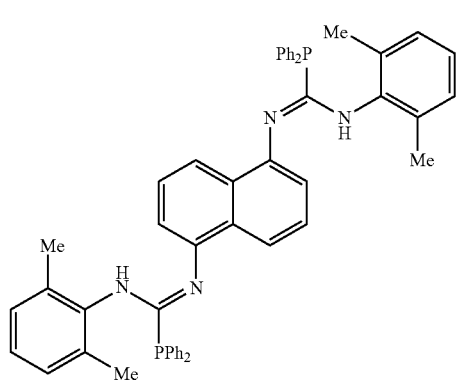
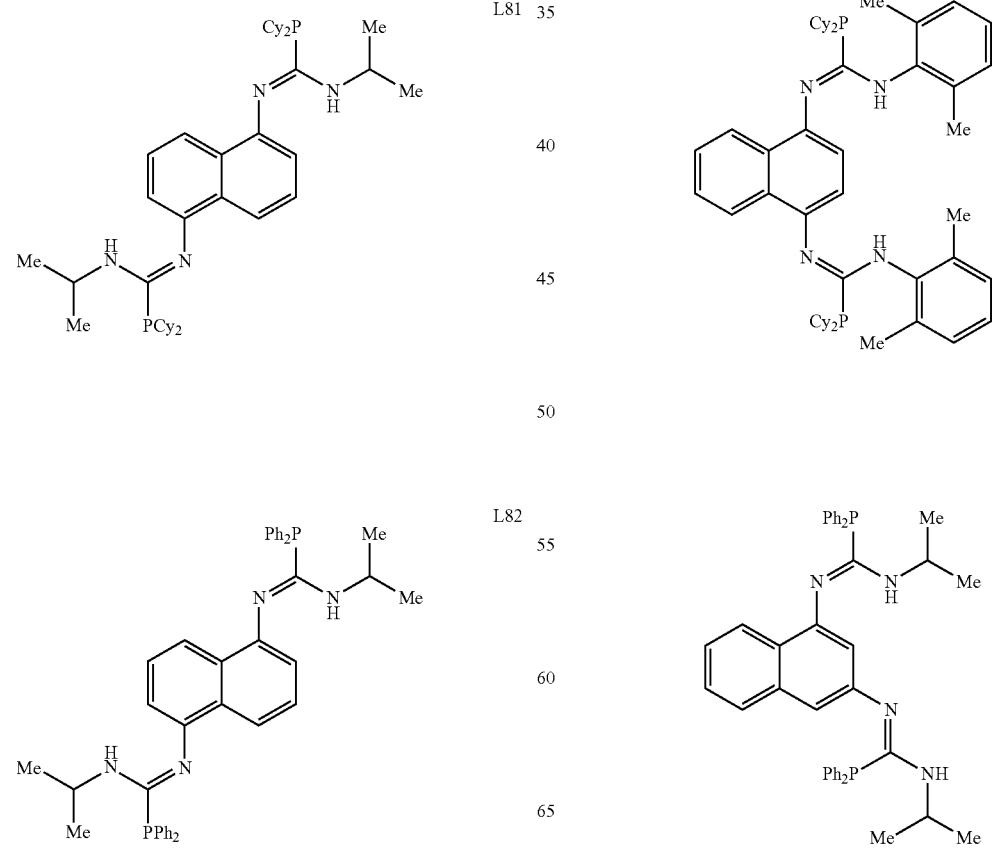

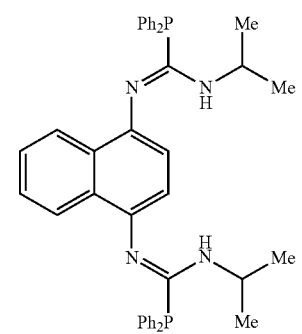
L87
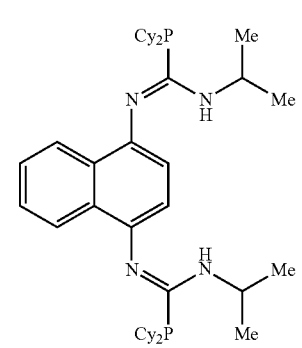
L88
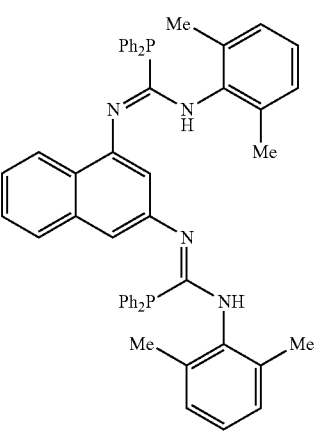
L89
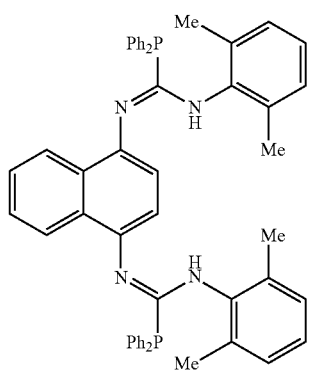
L90
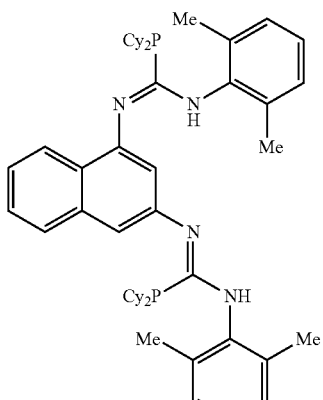
L91
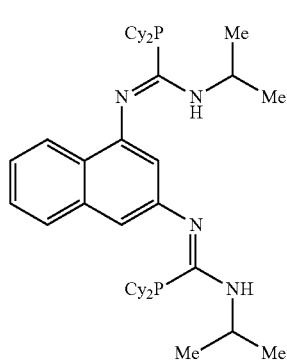
L92
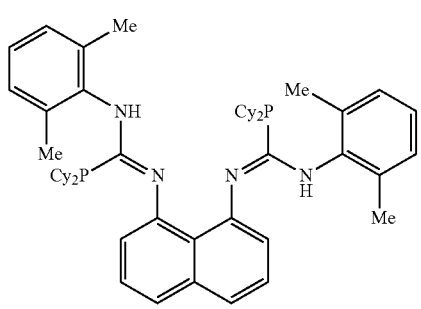
L93
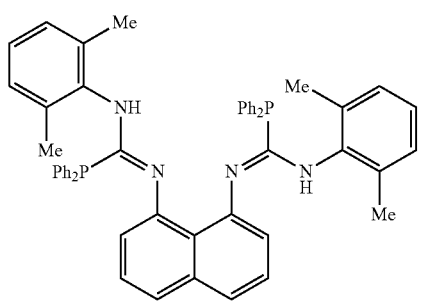
L94
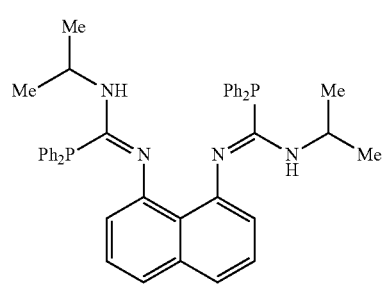
L95

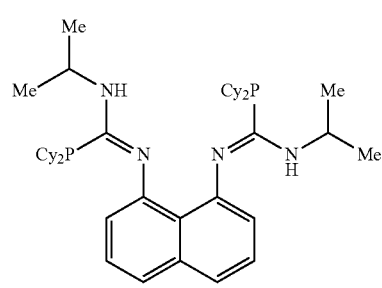
L96
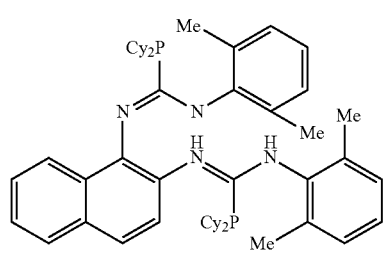
L97
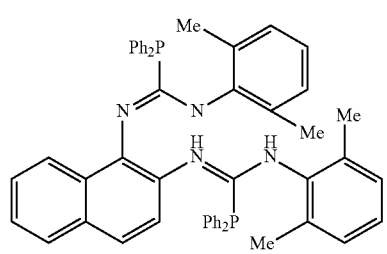
L98
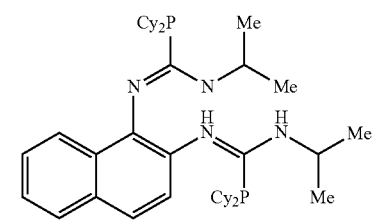
L99
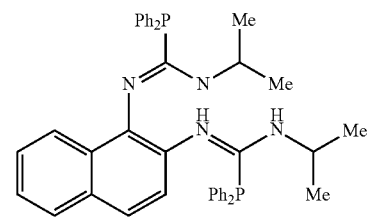
L100
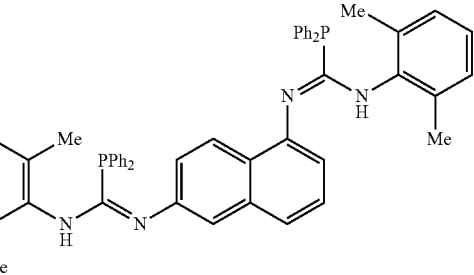
L101
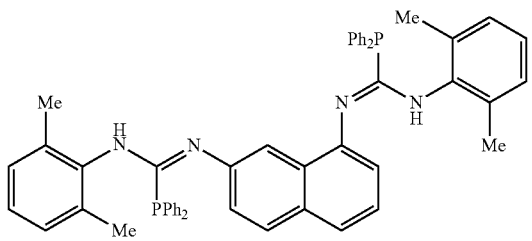
L102
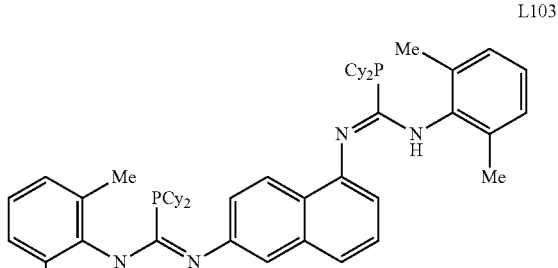
L103
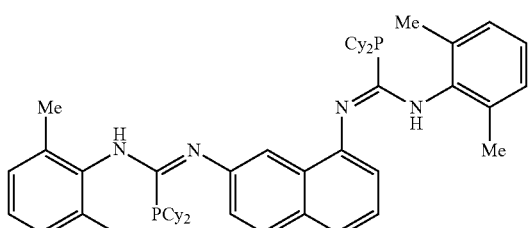
104
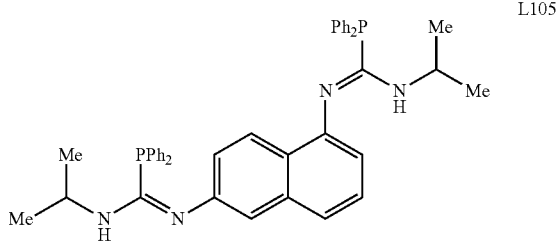
L105
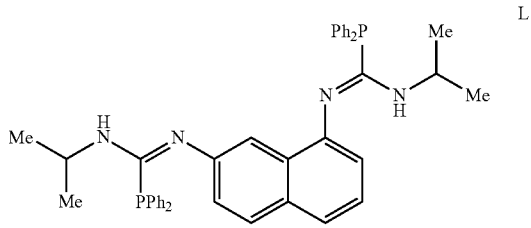
L106
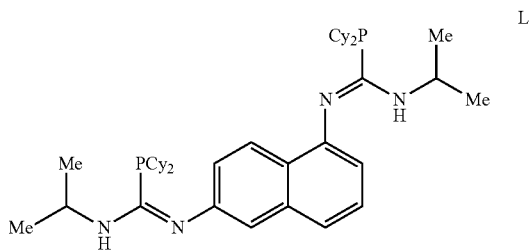
L107

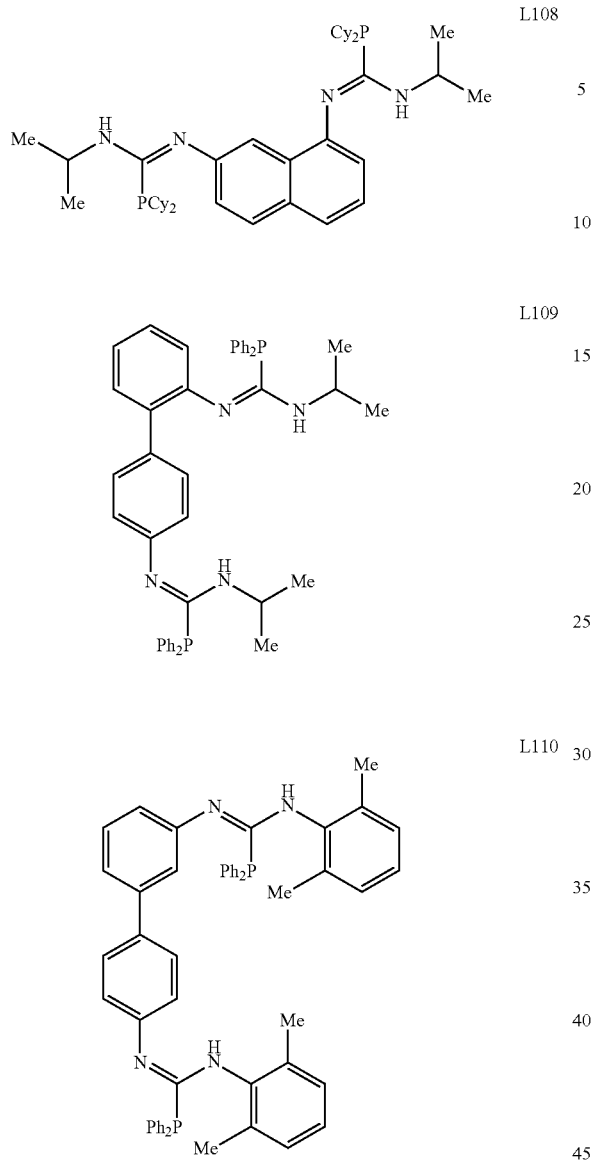
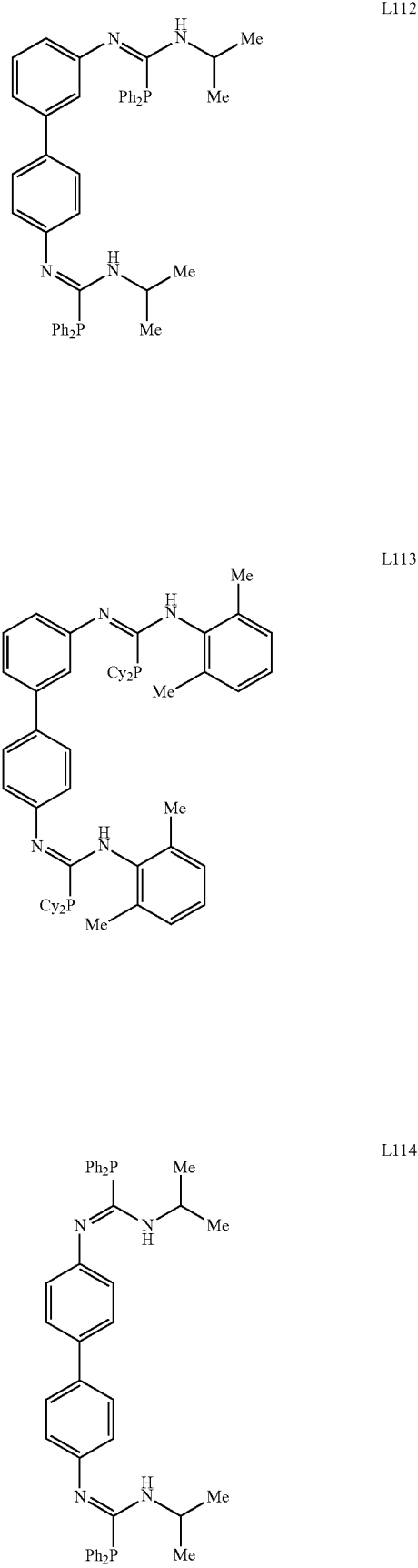

L115
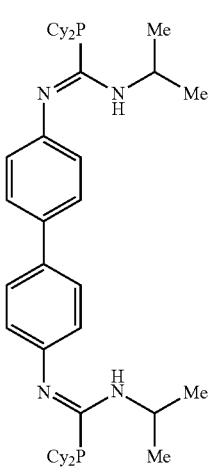
L116
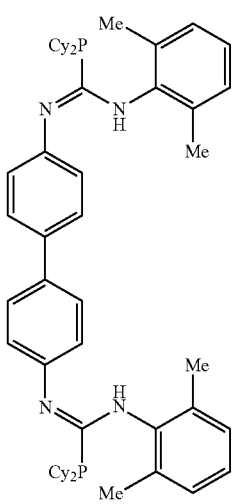
L117
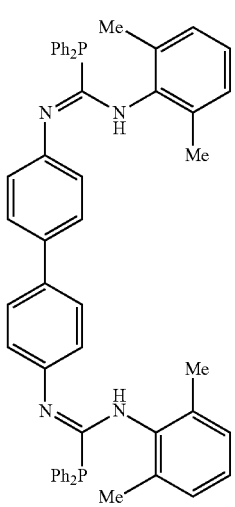
L118
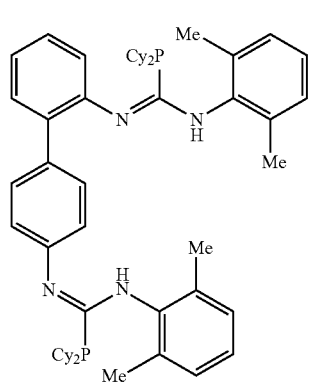
L119
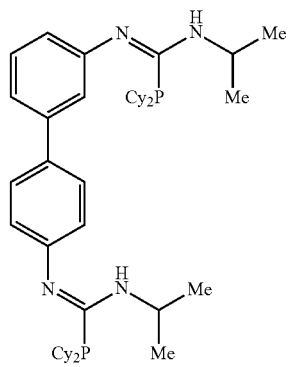
L120
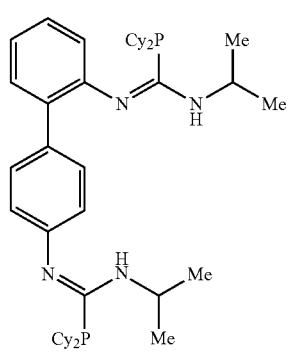
L121
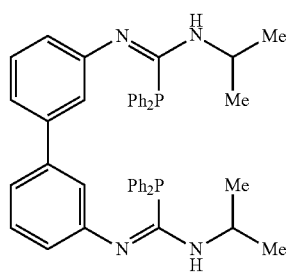

L122
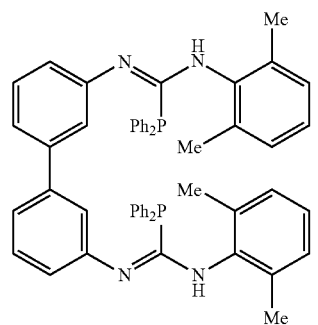
L123
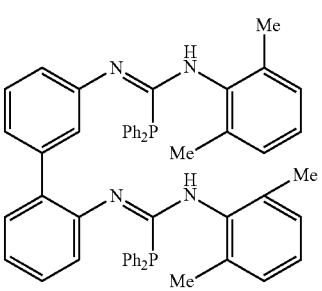
L124
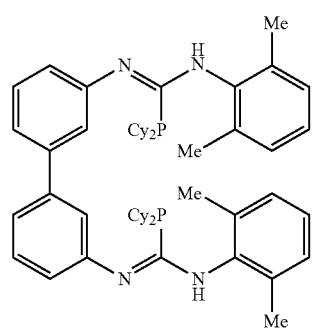
L125
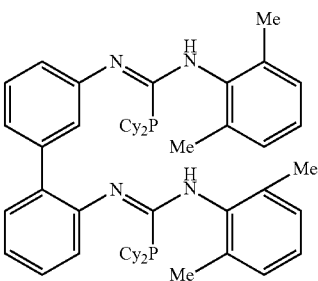
L126
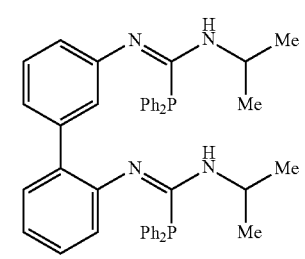
L127
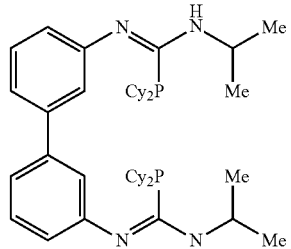
L128
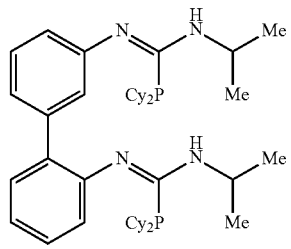
L129
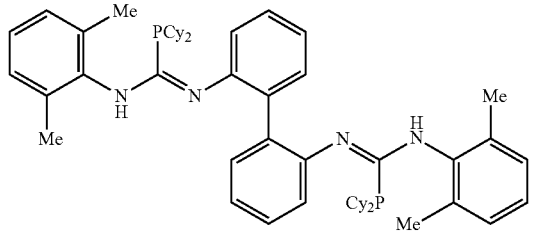
L130
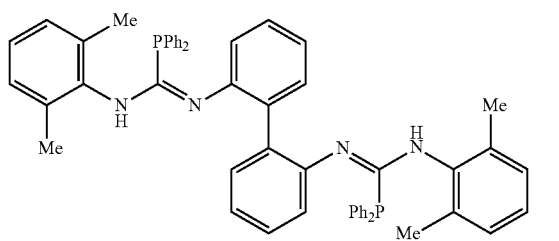
L131
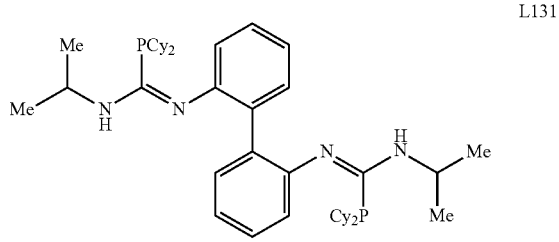
L132
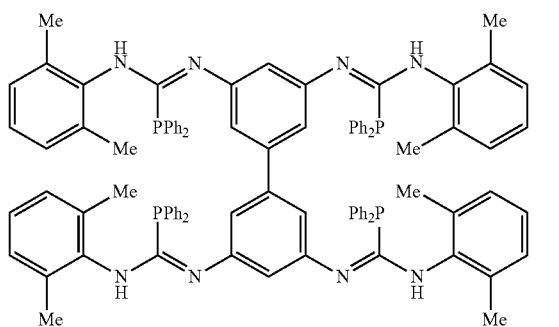

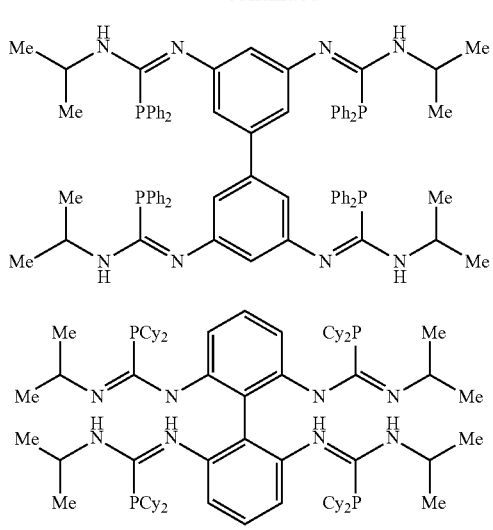

The terms "metal-ligand complex(es)," "catalyst(s)," "procatalysts" or "polymerization catalyst" may be used interchangeably. Additional metal-ligand complexes can be formed from any of ligands L1 to L134. The metal-ligand complexes formed from the ligands may be catalysts or procatalysts. The metal-ligand complexes disclosed herein can have multiple reaction sites, while some have single site reaction.

Cocatalysts

The procatalyst according to the metal-ligand complex of formula III is rendered catalytically active by contacting it to, or combining it with, the activating cocatalyst or by using an activating technique such as those that are known in the art for use with metal-based olefin polymerization reactions. Suitable activating cocatalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating cocatalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, United States Patent Number (USPN) U.S. Pat. No. 6,103,657. Examples of polymeric or oligomeric alumoxanes are methylalumoxane, triisobutylaluminum-modified methylalumoxane, and isobutylalumoxane.

Exemplary Lewis acid activating cocatalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri($(C_1$-$C_{10})$alkyl)aluminum or tri($(C_6$-$C_{18})$aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating cocatalyst is a tris($(C_1$-$C_{20})$hydrocarbyl) borate (e.g., trityl tetrafluoroborate) or a tri($(C_1$-$C_{20})$ hydrocarbyl)ammonium tetra($(C_1$-$C_{20})$hydrocarbyl)borane (e.g., bis(octadecyl)methylammonium tetrakis(pentafluorophenyl)borane). As used herein, the term "ammonium" means a nitrogen cation that is a $((C_1$-$C_{20})$hydrocarbyl)$_4$N$^+$, a $((C_1$-$C_{20})$hydrocarbyl)$_3$N(H)$^+$, a $((C_1$-$C_{20})$hydrocarbyl)$_2$N(H)$_2^+$, $(C_1$-$C_{20})$hydrocarbylN(H)$_3^+$, or N(H)$_4^+$, wherein each $(C_1$-$C_{20})$hydrocarbyl may be the same or different.

Exemplary combinations of neutral Lewis acid activating cocatalysts include mixtures comprising a combination of a tri($(C_1$-$C_4)$alkyl)aluminum and a halogenated tri($(C_6$-$C_{18})$aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex):(tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating cocatalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating cocatalysts for addition polymerization catalysts are disclosed in U.S. Pat. No. 5,321,106. Examples of suitable carbenium salts as activating cocatalysts for addition polymerization catalysts are disclosed in U.S. Pat. No. 5,350,723. Examples of suitable silylium salts as activating cocatalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complexes of formula III may be activated to form an active catalyst composition by combination with one or more cocatalyst. A non-limiting list of possible cocatalysts include: strong Lewis acids; compatible, noncoordinating, ion forming compounds, such as bis(hydrogenated tallow alkyl)methyl ammonium and tetrakis(pentafluorophenyl)borate(1-) amine; a cation forming cocatalyst; polymeric or oligomeric aluminoxanes, especially methyl aluminoxane and modified methyl aluminoxane (MMAO); orgoaluminum compounds, such as triethyl aluminum (TEA); and any combinations thereof.

In some embodiments, one or more of the foregoing activating cocatalysts are used in combination with each other. Another embodiment of a combination is a mixture of a tri($(C_1$-$C_4)$hydrocarbyl)aluminum, tri($(C_1$-$C_4)$hydrocarbyl)borane, or an ammonium borate with an oligomeric or polymeric alumoxane compound.

The ratio of total number of moles of one or more metal-ligand complexes of general metal complex 1 to total number of moles of one or more of the activating cocatalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating cocatalyst, the number of moles of the alumoxane that are employed is at least 100 times the number of moles of the metal-ligand complex general metal complex 1. When tris(pentafluorophenyl)borane alone is used as the activating cocatalyst, in some other embodiments, the number of moles of the tris(pentafluorophenyl)borane that are employed to the total number of moles of one or more metal-ligand complexes of general metal complex 1 form 0.5:1 to 10:1, in some other embodiments, from 1:1 to 6:1, in some other embodiments, from 1:1 to 5:1. The remaining activating cocatalysts are generally employed in approximately mole quantities equal to the total mole quantities of one or more metal-ligand complexes of formulas III.

Polyolefin Compositions

The polyolefin composition produced from the present catalysts comprises the reaction product of one or more olefinic monomers with the olefin polymerization catalyst system according to the present disclosure under polymerization conditions and in the presence of one or more cocatalysts and/or scavengers.

The polyolefin composition according to the present disclosure can, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm$^3$. All individual values and subranges from 0.860 to 0.973 g/cm$^3$ are included herein and disclosed herein; for example, the density can be from a lower limit of 0.860, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In one embodiment, the ethylene-based polymers can have a molecular weight ($M_w$) in the range of from equal to or greater than 20,000 g/mole, for example, in the range of from 20,000 to 1,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers include a $C_3$-$C_{20}$ moiety, having no more than 20 carbon atoms. For example, the α-olefin comonomers may have 3 to 10 carbon atoms, and in other embodiments 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

While the polymerization catalyst described herein typically produce copolymer, they can be used to produce homopolymers. The homopolymer may comprise an ethylene as the base monomer or in a separate polymer chain, or the homopolymer may comprise an α-olefin, such as the α-olefins described in the preceding paragraph.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

Polymerization Process

Any conventional polymerization processes may be employed to produce the polyolefin composition according to the present disclosure. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present disclosure may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more cocatalysts and/or scavengers, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more cocatalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more cocatalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be affected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In this fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosure of which are incorporated herein to the extent permitted.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the inventive ethylene-based polymers and the one or more additives and/or fillers. The ethylene-based polymers may further be blended with one or more polymers to form a blend.

One or more features of the present disclosure are illustrated in view of the examples as follows:

EXAMPLES

Throughout the examples section, the following abbreviations are used. Me: methyl; Ph: phenyl; i-Pr: iso-propyl; t-Bu: tert-butyl; Ts: toluene sulfonate; THF: tetrahydrofuran; $Et_2O$: diethyl ether; $CH_2Cl_2$: dichloromethane; $CHCl_3$: chloroform $CCl_4$: carbon tetrachloride; EtOH: ethanol; $CH_3CN$: acetonitrile; MeCN: acetonitrile; EtOAc: ethyl acetate; $C_6D_6$: deuterated benzene; Benzene-$d_6$: deuterated benzene; $CDCl_3$: deuterated chloroform; DMSO-$d_6$: deuterated dimethylsulfoxide; $PPh_3$: triphenylphosphine; $NEt_3$: triethylamine; MeI: methyl iodide or iodomethane; NaOH: sodium hydroxide; NaOCl: sodium hypochlorite; $NaHCO_3$: sodium bicarbonate; brine: saturated aqueous sodium chloride; $Na_2SO_4$: sodium sulfate; $MgSO_4$: magnesium sulfate; $PCl_5$: phosphorous pentachloride; $Ph_3PBr_2$: triphenylphosphine dibromide; $Ph_3PCl_2$: triphenylphosphine chloride; $SOCl_2$: Thionylchloride; KHMDS: potassium hexamethyldisilazide; n-BuLi: n-butyl lithium; $AgNO_3$: silver nitrate; $N_2$: nitrogen gas; PhMe: toluene; NMR: nuclear magnetic resonance; HRMS: high resolution mass spectrometry; LRMS: low resolution mass spectrometry; ESI: electrospray ionization mmol: millimoles; mL: milliliters; M: molar; min: minutes; h: hours; d: days. NMR spectra were recorded on Varian 400-MR and VNMRS-500 spectrometers. $^1$H NMR (proton NMR) data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for 1H NMR data are reported in ppm downfield from internal tetramethylsilane (TMS, δ scale) using residual protons in the deuterated solvent as references. $^{13}$C NMR (carbon NMR) data were determined with $^1$H decoupling, and the chemical shifts are reported in ppm versus tetramethylsilane.

Synthesis of Ligand 1 (L1)

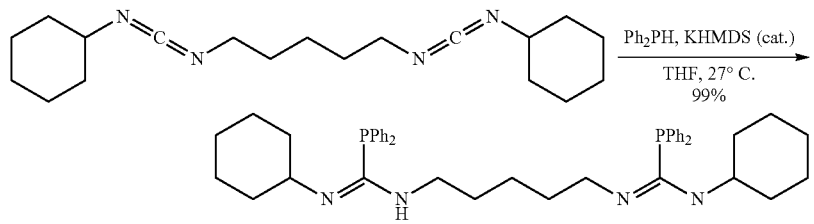

Under a purging nitrogen atmosphere in a glove box, a solution of KHMDS (234.0 μl, 0.1168 mmol, 0.20 eq, 0.5 M in toluene) at 27° C. was added to a solution of diphenylphosphine (217.4 mg, 203.0 μL, 1.1678 mmol, 2.00 eq) and 5 mL of THF. Upon the addition of KHMDS, the solution changed the color to a deep red-orange color. The biscarbodiimide (184.8 mg, 0.5839 mmol, 1.00 eq) was added as a solution in THF (4.5 mL) to the red-orange solution in quick dropwise manner. After 48 hrs the solution turned to a clear colorless solution, which was concentrated in vacuo to reveal a golden yellow residue which was diluted with 10 mL of hexanes, stirred vigorously (1000 rpm) for 5 mins, gravity filtered, and then concentrated. The pale yellow mixture was re-suspended in 10 mL of hexanes, filtered through a 0.45 μm submicron filter, and concentrated to afford 401.0 mg of bisphosphoryl guanidine as a clear pale yellow viscous oil (0.5821 mmol, 99% yield). The NMR spectra provide evidence that a mixture of the three possible isomers exists; an asterisk (*) denotes an isomer in the NMR data.

$^1$H NMR (400 MHz, Benzene-$d_6$) δ 7.48-7.39 (m, 8H), 7.00 (qd, J=8.4, 3.8 Hz, 12H), 4.10 (ddtd, J=24.1, 12.9, 8.8, 8.1, 4.0 Hz, 2H), 3.85-3.76 (m, 2H), 3.74 (dt, J=6.7, 3.7 Hz, 1H), 3.65 (td, J=6.9, 4.2 Hz, 1H), 3.28 (q, J=6.6 Hz, 1H), 3.19 (td, J=7.1, 5.2 Hz, 1H), 1.83 (dtd, J=16.0, 12.8, 11.5, 6.2 Hz, 4H), 1.68 (qq, J=17.4, 6.3, 5.3 Hz, 4H), (1.56 (q, J=7.1 Hz, 2H)*) 1.48-1.39 (m, 1H), 1.35-1.06 (m, 10H), 0.98-0.76 (m, 4H).

$^{31}$P NMR (162 MHz, Benzene-$d_6$) δ −17.35, −17.52, −18.06, −18.09.

$^{13}$C NMR (101 MHz, Benzene-$d_6$) δ 153.95 (d, J=31.3 Hz), 153.69 (d, J=31.3 Hz)*152.99 (d, J=31.4 Hz)*152.89 (d, J=31.0 Hz)*, 135.32 (d, J=12.2 Hz), 135.24, 135.07 (d, J=11.5 Hz)*, 134.87, 134.74 (d, J=13.6 Hz), (134.14*) 134.12 (134.09*) (134.05*), (133.94*) 133.93 (133.89*) 133.85*), 129.01, 128.89 (d, J=5.2 Hz)*, 128.74 (d, J=3.5 Hz)*, 128.65 (d, J=6.8 Hz), 60.07 (59.74*), (52.24*) (51.99*) (51.91*) 51.65, 48.83, 41.91 (41.77*), 35.50, (32.55*) 32.42 (32.16*), 31.55, 28.93 (28.62*), 26.06 (26.03*) (25.84*) (25.77*), 24.89 (24.84*), 24.25, 22.64, (20.49*).

Synthesis of Ligand 5 (L5)

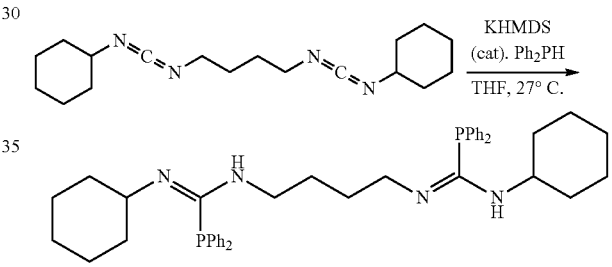

To a solution of diphenylphosphine (246.2 mg, 0.23 mL, 1.322 mmol, 2.00 eq) in THF (11.0 mL) in a nitrogen filled glovebox at 27° C. was added KHMDS (0.27 mL, 0.1322 mmol, 0.20 eq, 0.5 Min toluene) in a quick dropwise manner. Once the KHMDS was added to the diphenylphosphinesolution, the solution turned to a red-orangecolor. The red-orange solution was stirred (300 rpm) for 2 minutes, after which a solution of the biscarbodiimide (200.0 mg, 0.6612 mmol, 1.00 eq) in THF (2.0 mL) was added turning the solution a golden brown color. The golden yellow solution was stirred (300 rpm) for 24 hrs upon which an NMR of an aliquot had shown full conversion of starting phosphine to product. The golden yellow mixture was concentrated, suspended in hexanes (5 mL), concentrated, this was repeated twice more to remove residual THF, re-suspended in hexanes (10 mL), stirred vigorously (1000 rpm) for 5 mins, gravity filtered, and concentrated to afford a slight pale yellow solid. The crude pale yellow mixture was dissolved in a mixture of 5 mL toluene and 20 mL of anhydrous de-oxygenate pentane, and then concentrated to approximately 5 mL. Additional 20 mL of pentane was added, and the clear pale yellow solution was concentrated to approximately 5 mL. This procedure was repeated twice more to remove residual toluene to yield a white heterogeneous mixture in pentane. The white mixture was placed in the freezer (−35° C.) for 48 hrs; the pentane layer was decanted to yield a white solid. The residual white solid was washed three times with 5 mL of cold pentane, and dried in vacuo to afford the bisphosphoryl guanidine or phosphaguanidine compound as an isomeric mixture (398.5 mg, 0.5905 mmol, 89%). The NMR spectra provide evidence that a mixture of the three possible isomers exists; an asterisk (*) denotes an isomer in the NMR data.

$^1$H NMR (500 MHz, Benzene-d$_6$) δ 7.50-7.37 (m, 8H), 7.06-6.95 (m, 12H), 4.19-4.02 (m, 2H), (3.88 (t, J=5.2 Hz, 2H)*), (3.80 (m, 1H)*), (3.80 (m, 4H)*), (3.73 (t, J=5.3 Hz, 2H)*), (3.65 (qd, J=6.2, 5.1, 3.0 Hz, 2H)*), (3.37 (qd, J=6.4, 5.7, 3.2 Hz, 2H)*), (3.18 (qd, J=6.3, 5.6, 3.0 Hz, 1H)*), 1.98-1.89 (m, 2H), 1.83 (ddq, J=13.1, 8.3, 4.4 Hz, 6H), 1.67 (dqd, J=24.8, 12.8, 12.3, 3.6 Hz, 5H), 1.52 (p, J=3.4 Hz, 2H), 1.45 (dd, J=11.0, 4.3 Hz, 1H), 1.37-1.08 (m, 5H), 1.00-0.87 (m, 3H).

$^{31}$P NMR (202 MHz, Benzene-d$_6$) δ −17.30*, −17.50*, −18.11*, −18.14.

$^{13}$C NMR (126 MHz, Benzene-d$_6$) δ 154.05 (d, J=31.5 Hz), (153.74 (d, J=31.7 Hz)*), (152.93 (d, J=31.5 Hz)*), (152.89 (d, J=31.4 Hz)*), (135.37 (d, J=13.9 Hz)*), (135.23 (d, J=14.3 Hz)*), (135.00 (d, J=14.3 Hz)*), 134.70 (d, J=13.5 Hz), 134.11 (d, J=3.6 Hz), (134.00 (d, J=7.9 Hz)*), (133.90 (d, J=7.7 Hz)*), 128.98, 128.84 (d, J=3.7 Hz), (128.72 (d, J=3.9 Hz)*), (128.66*), (128.60*), 60.02 (d, J=7.0 Hz), 59.76 (d, J=7.3 Hz), 51.98 (d, J=34.2 Hz), 51.38 (d, J=33.7 Hz), 48.81 (d, J=6.2 Hz), (41.98*), (41.53*), 35.48, (32.44*), (32.41*), (30.52*), (29.78*), 27.09, (26.57*), (26.09*), (26.03*), (25.85*), 25.82, 24.89, 24.25.

Synthesis of Ligand 4 (L4)

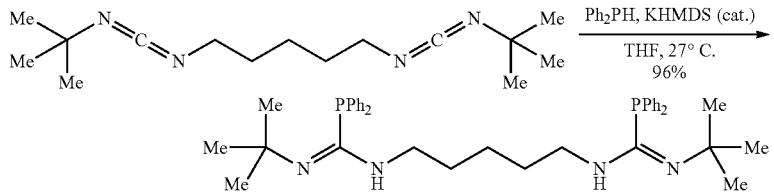

Under a purging nitrogen atmosphere in a glove box at 23° C., KHMDS (60.0 μL, 30.0 μmol 0.20 eq, 0.5 M in toluene) was added to a solution of diphenylphosphine (56.2 mg, 52.6 μL, 0.302 mmol, 2.00 eq) in THF (1.0 mL). The solution turned to a clear pale orange, and was stirred (500 rpm) for 1 min. A solution of the biscarbodiimide (40.0 mg, 0.151 mmol, 1.00 eq) in THF (2.0 mL) was added to the clear pale orange solution in a quick dropwise manner. After stirring for 24 hrs, an aliquot was removed and $^{31}$P-NMR indicated full conversion of diphenylphosphine to the product. THF was removed in vacuo and the pale golden yellow gum was suspended in hexanes (5 mL), stirred (300 rpm) for 5 mins, gravity filtered, and concentrated in vacuo to afford the bisphosphoryl guanidine as a clear colorless amorphous oil (92.6 mg, 0.145 mmol, 96%)

$^1$H NMR (400 MHz, Benzene-d$_6$) δ 7.45-7.36 (m, 8H), 7.04-6.93 (m, 12H), 3.72-3.66 (m, 6H), 1.69 (h, J=7.9, 7.5 Hz, 4H), 1.65-1.53 (m, 2H), 1.29 (s, 18H).

$^{31}$P NMR (162 MHz, Benzene-d$_6$) δ −16.30.

$^{13}$C NMR (101 MHz, Benzene-d$_6$) δ 153.34 (d, J=33.6 Hz), 135.17 (d, J=14.5 Hz), 133.98 (d, J=19.7 Hz), 128.74 (d, J=12.2 Hz), 128.61, 52.19 (d, J=35.1 Hz), 51.72, 32.50, 28.51, 25.67.

Synthesis of Ligand 6 (L6)

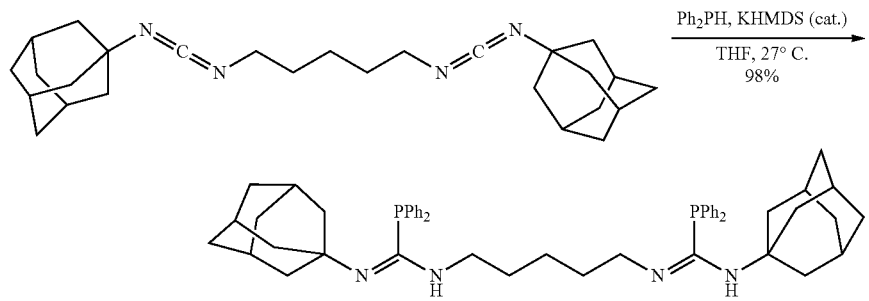

To a solution of diphenylphosphine (41.5 μl, 0.238 mmol, 2.00 eq) in THF (1.0 mL) in a nitrogen filled glovebox at 27° C. was added KHMDS (48.0 μl, 0.024 mmol, 0.20 eq, 0.5 M in toluene). The now red-orange solution was stirred (300 rpm) for 2 mins Upon which a solution of the biscarbodiimide (50.0 mg, 0.119 mmol, 1.00 eq) in THF (1.5 mL) was added in a quick dropwise manner. After 24 hrs an aliquot was removed, NMR indicated complete conversion to the product. The yellow-orange mixture was concentrated in vacuo, suspended in hexanes (5 mL), stirred vigorously (1000 rpm) for 5 mins, gravity filtered, and concentrated. The slightly opaque oily gum was suspended again in hexanes (5 mL), gravity filtered to remove residual white particulates, and concentrated in vacuo to afford the bisphosphoryl guanidine as a white amorphous foam (97.0 mg, 0.122 mmol, 98%). NMR indicated pure product.

$^{1}$H NMR (400 MHz, Benzene-$d_6$) δ 7.45 (td, J=7.8, 1.6 Hz, 8H), 7.06-6.94 (m, 12H), 3.71 (td, J=6.6, 4.4 Hz, 4H), 3.65 (s, 2H), 2.06 (d, J=2.8 Hz, 12H), 1.93-1.85 (m, 8H), 1.73 (p, J=7.0 Hz, 4H), 1.62 (dd, J=8.9, 5.5 Hz, 1H), 1.59-1.44 (m, 13H).

$^{31}$P NMR (162 MHz, Benzene-$d_6$) δ −16.59.

$^{13}$C NMR (101 MHz, Benzene-$d_6$) δ 152.87 (d, J=33.6 Hz), 135.30 (d, J=14.5 Hz), 134.04 (d, J=19.8 Hz), 128.79, 128.64 (d, J=6.9 Hz), 52.46, 52.27 (d, J=35.7 Hz), 41.63, 36.66, 32.39, 29.72, 25.65.

Synthesis of Ligand 7 (L7)

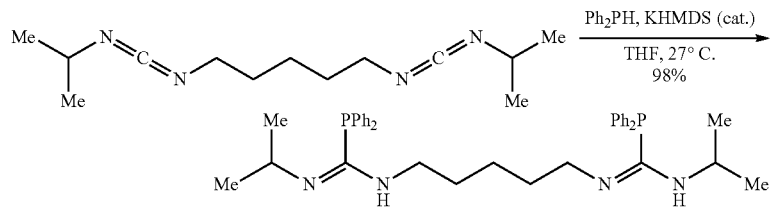

To a solution of diphenylphosphine (73.6 μl, 0.423 mmol, 2.00 eq) in THF (1.0 mL) in a nitrogen filled glovebox at 27° C. was added KHMDS (85.0 ul, 0.042 mmol, 0.20 eq, 0.5 M in toluene). The red-orange solution was stirred (300 rpm) for 2 mins upon which a solution of the of biscarbodiimide (50.0 mg, 0.212 mmol, 1.00 eq) in THF (1.50 mL was added in a quick dropwise manner. After 24 hrs an aliquot was removed and NMR indicated full conversion of diphenylphosphine. The orange heterogeneous mixture was concentrated in vacuo, diluted with hexanes (5 mL), stirred vigorously (1000 rpm) for 5 mins, and yellow mixture was gravity filtered, and concentrated in vacuo to reveal the product as a slightly white opaque mixture which was diluted with hexanes (5 mL), and the residual white particulates were removed by gravity filtration. The hexanes solution was concentrated in vacuo to afford bisphosphoryl guanidine (126.6 mg, 0.208 mmol, 98%, 98% pure by $^{1}$H-NMR and 31P-NMR) as a clear colorless amorphous oil. $^{1}$H NMR and $^{31}$P NMR indicated the product consists of an isomeric mixture of the three different possible isomers denoted by an asterisk (*).

$^{1}$H NMR (400 MHz, Benzene-$d_6$) δ 7.40 (ddqd, J=7.4, 4.4, 2.5, 1.7 Hz, 8H), 7.00 (tdt, J=6.8, 4.0, 1.5 Hz, 12H), 4.37 (dh, J=7.7, 5.8 Hz, 2H)*, 4.27 (ddd, J=13.0, 10.0, 6.5 Hz, 2H)*, 3.80-3.56 (m, 4H), 3.28 (td, J=6.8, 5.1 Hz, 2H)*, 3.17 (td, J=7.1, 5.2 Hz, 2H)*, 1.75 (dq, J=14.3, 7.2 Hz, 2H)*, 1.56 (tt, J=14.3, 6.9 Hz, 4H)*, 1.32-1.23 (m, 2H)*, 1.21 (d, J=4.4 Hz, 3H)*, 1.20 (d, J=4.5 Hz, 3H)*, 1.18-1.04 (m, 2H)*, 0.90 (d, J=4.2 Hz, 3H)*, 0.89 (d, J=4.2 Hz, 3H)*.

$^{31}$P NMR (162 MHz, Benzene-$d_6$) δ −17.68, −17.81*, −18.03*, −18.05*.

$^{13}$C NMR (101 MHz, Benzene-$d_6$) δ 154.22 (d, J=31.3 Hz), 153.98 (d, J=31.8 Hz)*, 152.95 (d, J=7.5 Hz)*, 152.63 (d, J=7.6 Hz)*, 135.16 (d, J=13.8 Hz), 134.92 (d, J=6.9 Hz)*, 134.72 (d, J=6.8 Hz)*, 134.47 (d, J=16.6 Hz)*, 134.45 (d, J=13.0 Hz)*, 134.32 (d, J=12.9 Hz)*, 134.10 (d, J=4.6 Hz), 133.91 (d, J=5.2 Hz)*, 128.99 (d, J=8.3 Hz)*, 128.98 (d, J=5.8 Hz)*, 128.91 (d, J=8.0 Hz)*, 128.72 (d, J=5.9 Hz)*, 128.71 (d, J=4.1 Hz), 128.66 (d, J=6.5 Hz)*, 128.65 (d, J=3.9 Hz), 52.03 (d, J=14.9 Hz), 51.90 (d, J=11.0 Hz)*, 51.86 (d, J=18.7 Hz)*, 51.56 (d, J=9.9 Hz)*, 42.55, 41.88*, 41.68*, 32.56, 32.13*, 28.99, 28.65*, 25.13, 25.11*, 24.83*, 24.23, 22.28*, 22.24*.

Synthesis of Ligand 9 (L9)

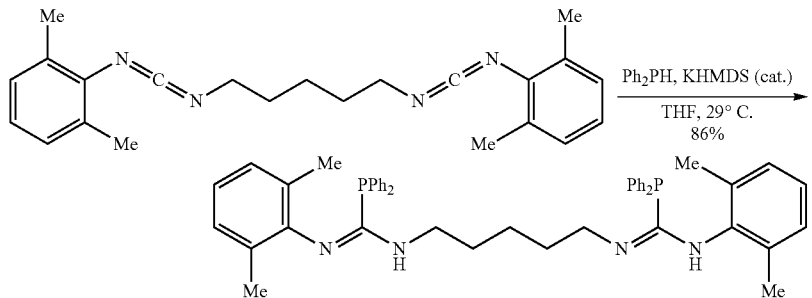

To a solution of diphenylphosphine (48.0 μl, 0.277 mmol, 2.00 eq) in THF (1.0 mL) in a nitrogen filled glovebox at 29° C. was added KHMDS (0.11 mL, 0.055 mmol, 0.40 eq, 0.5 M in toluene) in a quick dropwise manner. The clear red-orange solution was stirred (300 rpm) for 2 mins upon which a solution of the biscarbodiimide (50.0 mg, 0.139 mmol, 1.00 eq) in THF (1.5 mL) was added in a quick dropwise manner causing the solution to change to a pale yellow slightly heterogeneous mixture. After stirring for 48 hrs the now colorless slightly opaque mixture was concentrated in vacuo to reveal a white solid. The white solid was suspended in hexanes (10 mL), stirred vigorously at 1000 rpm for 5 mins, and then gravity filtered. The resulting clear colorless filtrate solution was concentrated in vacuo to afford a white solid. The solid was dissolved in in hexanes (5 mL) and concentrated to approximately 1.0 mL. Pentane (10 mL) was added and the clear solution was concentrated to approximately 0.5 mL. Pentane (10 mL) was added, and the slightly white heterogeneous mixture was concentrated to approximately 0.5 mL. This process was repeated once more to afford approximately 0.5 mL of a slightly white mixture in pentane. The mixture was placed in a freezer (−30° C.) for 2 hrs, and then the liquid was decanted cold to afford a white solid. The solid was fully dissolved in another 10 mL of pentane, concentrated to approximately 0.5 mL, and the resultant white mixture was placed in a freezer (−30° C.) for 2 hrs. The liquid was decanted cold, this process was repeated once more, and then fully concentrated in vacuo to afford the bisphosphorylguanidine as a white solid (87.5 mg, 0.119 mmol, 86%).

$^1$H NMR (400 MHz, Benzene-d$_6$) δ 7.34 (t, J=7.2 Hz, 8H), 6.98 (d, J=7.5 Hz, 16H), 6.90 (dd, J=8.2, 6.5 Hz, 2H), 4.41 (t, J=5.6 Hz, 2H), 3.34-3.10 (m, 4H), 2.09 (s, 12H), 1.30 (m, 4H), 0.95 (m, 2H).

$^{31}$P NMR (162 MHz, Benzene-d$_6$) δ −12.85.

$^{13}$C NMR (101 MHz, Benzene-d$_6$) δ 157.25 (d, J=34.3 Hz), 148.71 (d, J=12.7 Hz), 134.26 (d, J=15.6 Hz), 133.98 (d, J=20.5 Hz), 129.22, 128.83, 128.67 (d, J=6.9 Hz), 127.73, 122.21, 42.05, 28.92, 24.29, 18.86, 18.81.

Synthesis of Ligand 10 (L10)

yellow filtrate solution was concentrated to afford the bisphosphorylguanidine as a clear pale yellow foam (549.5 mg, 0.6502 mmol, 86%).

$^1$H NMR (500 MHz, Benzene-d$_6$) δ 7.37 (s, 9H), 7.13 (t, J=3.6 Hz, 2H), 7.06-6.95 (m, 15H), 4.45 (br s, 2H), 3.25 (m, 4H), 3.13 (hept, J=6.9 Hz, 4H), 1.40-1.27 (m, 4H), 1.26 (d, J=6.8 Hz, 12H), 1.11 (d, J=6.9 Hz, 12H), 1.02-0.91 (m, 2H).

$^{13}$C NMR (126 MHz, Benzene-d$_6$) δ 146.07 (d, J=10.2 Hz), 138.60, 134.47 (d, J=15.6 Hz), 133.98 (d, J=20.9 Hz), 129.16, 128.70 (d, J=5.3 Hz), 123.10, 122.51, 42.19, 29.08, 28.52, 24.30, 24.00, 21.63.

$^{31}$P NMR (162 MHz, Benzene-d$_6$) δ −17.71.

Synthesis of Ligand 8 (L8)

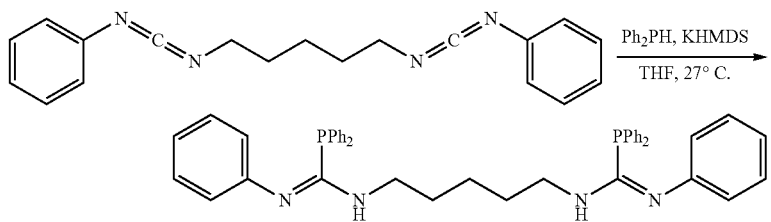

To a solution of diphenylphosphine (0.13 mL, 0.76 mmol, 2.00 eq) THF (1.0 mL) in a nitrogen filled glovebox at 27° C. was added KHMDS (15.2 µl, 7.6 µmol, 0.02 eq, 0.5 M in toluene). After stirring (300 rpm) for 2 min a solution of the biscarbodiimide (115.8 mg, 0.38 mmol, 1.00 eq) in THF (2.0 mL) was added to the red-orange solution. After 14 hours the clear pale yellow solution was concentrated in vacuo to reveal a pale yellow oil, which was diluted with hexanes (5 mL), concentrated, diluted with toluene (0.3 mL), and then while stirring hexanes (10 mL) was added. The now white mixture was placed in the freezer (−35° C.) for 2 hrs, gravity filtered using a disposable PTFE filter to afford the product as viscous white foam. The filtrate solution was concentrated

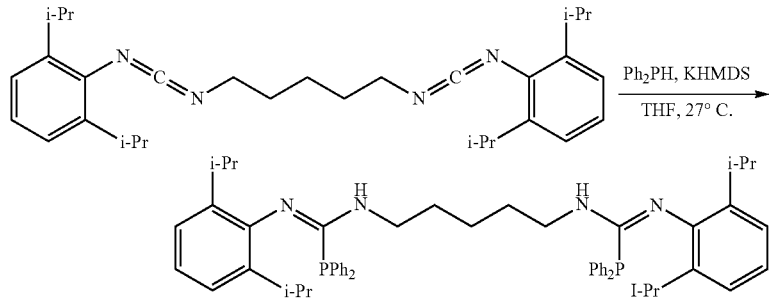

To a solution of diphenylphosphine (262.0 µL, 1.5037 mmol, 2.00 eq) in THF (3.0 mL) in a nitrogen filled glovebox at 27° C. was added KHMDS (1.20 mL, 0.6014 mmol, 0.80 eq, 0.5 M in toluene) in a quick dropwise manner. The red-orange solution was stirred for 2 minutes upon which a solution of the biscarbodiimide in THF (1.5 mL) was added in a quick dropwise manner. The red-orange solution was stirred at 300 rpm for 72 hrs, concentrated in vacuo, suspended in hexanes (3.0 mL), and concentrated. The suspension/concentration process was repeated twice more upon which the red-orange mixture was re-suspended in hexanes (10 mL), stirred vigorously (1000 rpm) for 5 minutes, the mixture was gravity filtered, and the pale to approximately 2 mL, placed in the freezer (−35° C.) for 16 hrs, and then decanted cold to afford the product as a solid white foam which was fully dried in vacuo. The filtrate solution was concentrated to approximately 5 mL, cooled in the in the freezer (−35° C.) for 16 hours, and decanted to afford the product as a white solid. The filtered and decanted white solids were combined to afford the bisphosphorylguanidine (123.4 mg, 0.191 mmol, 49%).

$^1$H NMR (400 MHz, Benzene-d$_6$) δ 7.35 (td, J=6.7, 5.7, 2.2 Hz, 8H), 7.07-6.92 (m, 20H), 6.83-6.76 (m, 2H), 4.30 (t, J=5.3 Hz, 2H), 3.23 (q, J=6.7 Hz, 4H), 1.13 (p, J=7.5 Hz, 4H), 0.82 (ddd, J=9.6, 7.6, 4.4 Hz, 2H).

$^{31}$P NMR (162 MHz, Benzene-d$_6$) δ −14.28.

$^{13}$C NMR (126 MHz, Benzene-$d_6$) δ 157.03 (d, J=36.8 Hz), 151.48 (d, J=12.2 Hz), 134.69 (d, J=15.6 Hz), 134.09 (d, J=20.7 Hz), 129.14, 128.65 (d, J=7.3 Hz), 128.22, 127.94, 127.74, 127.54, 122.87, 121.96, 41.93, 28.54, 24.21.

Synthesis of Ligand 2 (L2)

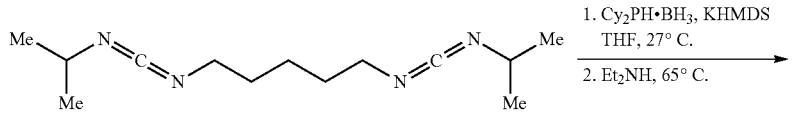

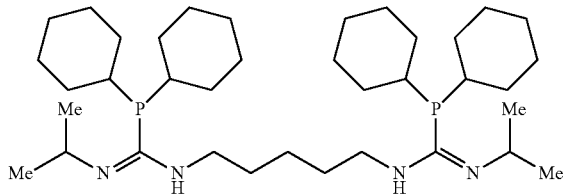

A solution of dicyclohexylphosphine (0.500 g, 0.51 mL, 2.522 mmol, 1.00 eq) in anhydrous de-oxygenated ether (5.0 mL) in a nitrogen filled glovebox, and placed in the freezer (−35° C.) for 1 hr. Then, neat borane-dimethylsulfide (0.287 g, 0.36 mL, 3.783 mmol, 1.50 eq) was added in a quick dropwise manner. After 30 minutes the solution was removed from the freezer and allowed to warm gradually to 27° C. over 2 hrs, placed in the freezer for 4 hrs. Then, the ether was decanted cold from the white crystalline solid, which was washed three times with 1.5 ml of cold ether and dried in vacuo to afford the dicyclohexylphosphine borane complex as a white crystalline solid 0.377 g, 1.769 mmol, 70%). NMR spectra indicated that the product was pure.

A solution of KHMDS (0.14 mL, 0.0669 mmol, 0.20 eq, 0.5 M in Toluene) was added to a solution of dicyclohexylphosphine borane (142.1 mg, 0.6674 mmol, 2.00 eq) and anhydrous de-oxygenated THF (2.0 mL) in a nitrogen filled glovebox at 27° C. After stirring for 2 minutes a solution of the biscarbodiimide (78.9 mg, 0.3337 mmol, 1.00 eq) in THF (2.0 mL) was added in quick dropwise manner. After stirring for 24 hrs an aliquot was removed and NMR indicated full conversion of the starting phosphine to the bisphosphoryl guanidine borane complex. The slight pale yellow mixture was concentrated, suspended in hexanes (3.0 mL), concentrated, and this process was repeated three times to remove residual THF. The mixture was re-suspended in hexanes (10 mL), stirred vigorously (1000 rpm) for 2 minutes, filtered through a 0.45 m submicron filter, rinsed with hexanes (3 mL), and concentrated. Anhydrous de-oxygenated Et$_2$NH (10 mL) was added. The slight white heterogeneous mixture was placed in a mantle, heated to 65° C., stirred for 48 hrs, removed from the heating mantle, and allowed to gradually cool to 27° C. The mixture was concentrated, suspended inhexanes (3 mL) and concentrated. This was repeated three times to remove residual Et$_2$NH and Et$_2$NH—BH$_3$, the mixture was re-suspended in hexanes (10 mL), stirred vigorously (1000 rpm) for 2 minutes, filtered through a 0.45 μm submicron PTFE filter, rinsed with hexanes (3 mL), and concentrated to afford the bisphosphoryl guanidine as a clear viscous foam 199.7 mg, 0.3155 mmol, 95%). $^1$H- and $^{31}$P-NMR indicated that the product was approximately 98% pure and exists as a complex mixture of the three possible isomers and their tautomers which are denoted by an asterisk (*).

$^1$H NMR (500 MHz, Benzene-$d_6$) δ 4.66 (h, J=6.1 Hz, 1H), 4.39 (dtt, J=13.1, 9.6, 4.4 Hz, 1H), (4.04 (t, J=6.3 Hz, 2H)*), 3.97 (q, J=6.3 Hz, 2H), (3.76 (m, 2H)*), 3.71 (d, J=6.7 Hz, 2H), 3.44 (q, J=6.6 Hz, 1H), 3.36 (q, J=6.8 Hz, 1H), (2.27-2.14 (m, 4H)*), 1.95 (d, J=11.3 Hz, 4H), 1.86-1.38 (m, 30H), 1.38-1.32 (m, 6H), 1.32-1.10 (m, 10H), 1.08 (d, J=6.4 Hz, 3H), 1.00-0.91 (m, 2H).

$^{31}$P NMR (162 MHz, Benzene-$d_6$) δ (−4.98*), (−7.78*), −21.12, (−22.19*), (−28.15*).

$^{13}$C NMR (126 MHz, Benzene-$d_6$) δ (155.57 (d, J=38.2 Hz)*) 154.70 (d, J=37.5 Hz) (154.63 (d, J=38.8 Hz)*), (52.29 (d, J=20.3 Hz)*), (52.04 (d, J=36.9 Hz)*), 51.17 (d, J=38.9 Hz), (48.40 (d, J=42.1 Hz)*), (47.07 (d, J=36.0 Hz)*), (46.24*), (45.00 (d, J=22.4 Hz)*), 41.80, (41.63*), (41.56*), (41.34*), 34.19 (d, J=14.0 Hz), (34.06 (d, J=10.0 Hz)*), (32.93 (d, J=41.1 Hz)*), (32.22 (d, J=18.9 Hz)*), (31.27 (d, J=18.2 Hz)*), 30.07 (d, J=9.6 Hz), (29.94 (d, J=9.0 Hz)*), (29.79 (d, J=9.6 Hz)*), (29.38 (d, J=30.6 Hz)*), (27.31 (d, J=6.1 Hz)*), (27.25*), 27.00 (d, J=7.9 Hz), (26.85 (d, J=11.7 Hz)*), 26.30, (25.61*), (25.44*), (25.36*), 25.01, 24.36, (23.62*), 22.62.

Synthesis of Ligand 3 (L3)

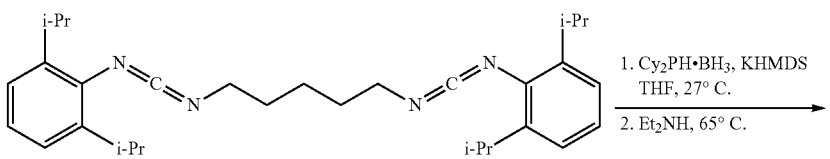

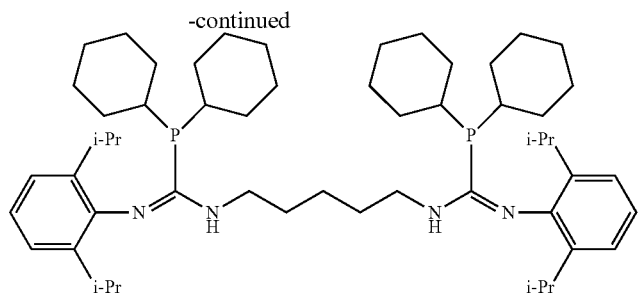

To a solution of the dicyclohexylphosphine borane complex (181.2 mg, 0.8504 mmol, 2.00 eq) in THF (1.5 mL) in a nitrogen filled glovebox at 27° C. was added a solution of KHMDS (0.17 mL, 0.0850 mmol, 0.20 eq, non-titrated 0.5 M in toluene). After stirring (300 rpm) for 2 minutes, a solution of the biscarbodiimide (201.0 mg, 0.4252 mmol, $^{31}$P NMR (162 MHz, Benzene-d$_6$) δ −5.87.
$^{13}$C NMR (101 MHz, Benzene-d$_6$) δ 160.08, 145.18, 138.66, 123.33, 123.14, 48.19, 43.79 (d, J=20.5 Hz), 33.80 (d, J=12.2 Hz), (31.33*), (31.17*), 30.65 (d, J=13.7 Hz), 29.60 (d, J=11.4 Hz), 27.93, 27.36 (d, J=7.0 Hz), 27.26 (d, J=7.8 Hz), 26.59, (23.89*), 23.53, (23.32*), 13.93, 10.98.

Synthesis of Ligand 12 (L12)

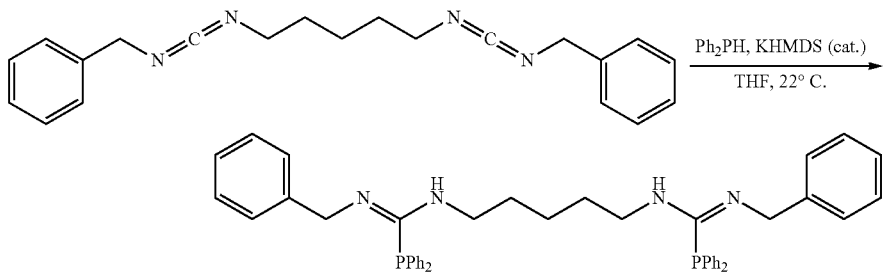

1.00 eq) in THF (1.5 mL) was added in a quick dropwise manner. After stirring for 36 hrs, the pale yellow solution was concentrated, suspended inhexanes (3 mL), concentrated, this was repeated three times to remove residual THF; the pale yellow mixture was suspended in hexanes (10 mL), stirred vigorously (1000 rpm) for 2 minutes, and filtered through a 0.45 m submicron filter, rinsed with hexanes (3×3 mL), and concentrated to afford the phosphaguanidine borane complex as a white solid. The crude solid was dissolved in anhydrous de-oxygenated Et$_2$NH (8 mL), placed in a mantle heated to 65° C., stirred for 48 hours, removed from the heating mantle, allowed to cool gradually to 27° C., concentrated, suspended inhexanes (3 mL), concentrated again, this process was repeated three times to remove residual Et$_2$NH and Et$_2$NH—BH$_3$. The product was suspended in hexanes (10 mL), stirred vigorously (1000 rpm) for 2 minutes, filtered through a 0.45 μm submicron filter, rinsed with hexanes (3×3 mL), and concentrated to afford the bisphosphaguanidine as a white solid (369.3 mg, 0.4248 mmol, 99%) NMR spectra indicated a pure product as a mixture of three different possible isomers, denoted by an asterisk (*).

$^1$H NMR (400 MHz, Benzene-d$_6$) δ 7.19 (d, J=7.6 Hz, 4H), 7.11-7.05 (m, 2H), 4.26 (dt, J=11.7, 6.4 Hz, 2H), 3.20 (hept, J=6.8 Hz, 4H), 3.00 (d, J=7.9 Hz, 4H), 2.30 (m, 4H), 2.05 (m, 8H), 1.75-1.61 (m, 24H), 1.47-1.29 (m, 4H), 1.26 (d, J=6.8 Hz, 12H), 1.24 (d, J=6.8 Hz, 12H), 1.27-1.22 (m, 2H), 1.01-0.71 (m, 8H).

To a clear colorless solution of diphenylphosphine (0.112 g, 0.10 mL, 0.6016 mmol, 2.00 eq) in anhydrous de-oxygenated THF (5 mL) in a nitrogen filled glovebox at 22° C. was added KHMDS (0.30 mL, 0.1504 mmol, 0.50 eq, non-titrated 0.5 M in PhMe) causing the solution to change to a deep red-orange solution. After stirring (500 rpm) for 2 mins a solution of the biscarbodiimide (0.100 g, 0.3008 mmol, 1.00 eq) in PhH (1.0 mL) was added in a quick dropwise manner. After stirring for 48 hrs, the solution was diluted with hexanes (5 mL), concentrated, suspended in hexanes (5 mL), concentrated, this suspension/concentration process was conducted 3× more to remove residual THF and triturate insoluble impurities, the resultant pale orange solid mixture was suspended in hexanes (5 mL), stirred vigorously (1000 rpm) for 2 mins, filtered through a 0.45 μm PTFE filter, rinsed with hexanes (3×3 mL), concentrated to afford an opaque pale yellow oil which was suspended in hexanes (3 mL), filtered through a 0.45 μm PTFE filter, rinsed with hexanes (3×3 mL), and concentrated to afford a clear pale yellow oil (0.157 g, 0.4455 mmol, 74%). NMR indicated product which exists as a complex mixture of isomers and contained residual diphenylphosphine; possible isomers are denoted by an asterisk (*).

$^1$H NMR (500 MHz, Benzene-d$_6$) δ 7.53-7.30 (m, 20H), 7.18 (td, J=7.7, 2.4 Hz, 2H), 7.08-6.88 (m, 24H), (5.03 (d, J=4.5 Hz, 2H)*) 5.01 (d, J=4.6 Hz, 4H), (4.47 (d, J=5.4 Hz, 2H)*) (4.44 (d, J=5.3 Hz, 4H)*), 4.24-4.20 (m, 2H) (4.19-4.17 (m, 1H)*) (3.97 (t, J=5.1 Hz, 1H)*) (3.92 (t, J=5.2 Hz, 2H)*), (3.76 (td, J=6.8, 4.1 Hz, 2H)*) (3.65 (td, J=6.8, 4.0 Hz, 4H)*) 3.35 (td, J=6.9, 5.1 Hz, 4H)*) 3.24 (td, J=7.1, 5.3 Hz, 4H), (1.76 (p, J=7.1 Hz, 2H)*) (1.56 (p, J=6.9 Hz, 4H)*)

(1.29 (h, J=8.4, 7.6 Hz, 2H)*) 1.14 (dq, J=14.8, 7.3 Hz, 4H), (1.14 (dq, J=14.8, 7.3 Hz, 2H)*) 0.83 (tt, J=9.2, 6.2 Hz, 2H).
$^{31}$P NMR (202 MHz, Benzene-d$_6$) δ (−14.96*), −16.53, (−17.36*), (−17.48*).
Only Major Chemical Shifts Listed for $^{13}$C:
$^{13}$C NMR (126 MHz, Benzene-d$_6$) δ 156.16 (d, J=7.0 Hz), 142.75 (d, J=16.0 Hz), 134.05 (d, J=19.1 Hz), 129.14 (d, J=11.7 Hz), 128.81, 128.16 (d, J=5.8 Hz), 127.94, 127.58, 125.95, 55.17 (d, J=34.2 Hz), 41.85, 28.77, 24.77.

Synthesis of Ligand Precursors

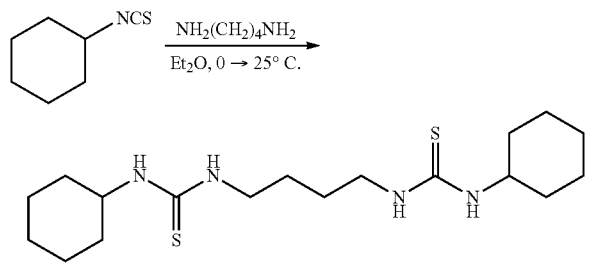

A vigorously stirring (700 rpm) solution of cyclohexylisothiocyanate (2.000 g, 2.0 mL, 14.161 mmol, 2.00 eq) in ether (50 mL) was placed in an ice water bath for 20 mins upon which 1,4-diaminobutane (0.624 g, 0.71 mL, 7.081 mmol, 1.00 eq) was added neat via syringe. The now white heterogeneous mixture was allowed to stir vigorously for 12 hrs warming gradually to 23° C. The white heterogeneous mixture was then placed in an ice water bath for 1 hr, suction filtered cold, washed with cold diethyl ether (3×20 mL), the white powder was collected, and dried in vacuo to afford the bisthiourea (2.064 g, 4.598 mmol, 76%). NMR indicated pure product.

$^1$H NMR (500 MHz, DMSO-d$_6$) δ 7.23 (s, 2H), 7.17 (s, 2H), 3.91 (s, 2H), 3.46-3.23 (m, 4H), 1.88-1.71 (m, 4H), 1.63 (dt, J=13.0, 3.9 Hz, 4H), 1.52 (dt, J=12.8, 3.9 Hz, 2H), 1.49-1.29 (m, 4H), 1.24 (qt, J=12.4, 3.3 Hz, 4H), 1.18-1.00 (m, 6H).

$^{13}$C NMR (126 MHz, DMSO-d$_6$) δ 181.50, 43.59, 40.48, 32.76, 26.87, 25.64, 25.00.

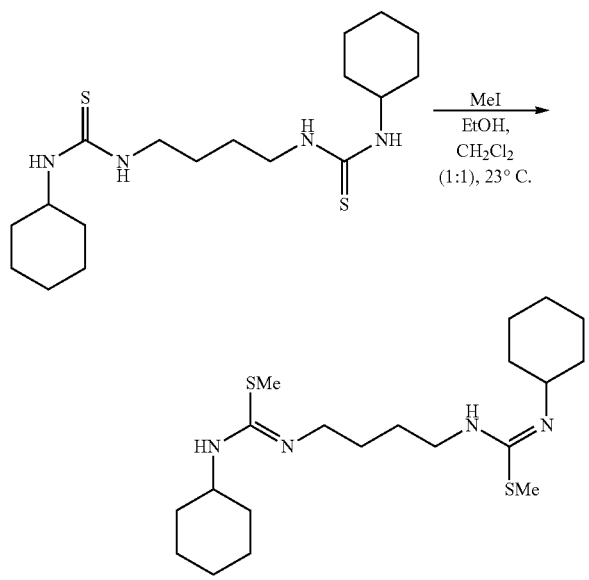

To a white heterogeneous mixture of the bisthiourea (1.0373 g, 2.799 mmol, 1.00 eq) in EtOH and CH$_2$Cl$_2$ (40 mL, 1:1) was added MeI (1.589 g, 0.70 mL, 11.20 mmol, 4.00 eq). The mixture was allowed to stir (500 rpm) at 23° C. for 12 hrs upon which the clear pale yellow solution was diluted with a saturated aqueous mixture of NaHCO$_3$ (50 mL), then aqueous NaOH (10 mL, 1 N), the biphasic mixture was stirred vigorously (1000 rpm) for 5 mins, poured into a separatory funnel, paritioned, the organic layer was washed with an aqueous mixture of NaHCO$_3$ (3×25 mL), residual organics were back extracted from the aqueous layer using CH$_2$Cl$_2$ (2×25 mL), combined, washed with brine (2×20 mL), dried over solid Na$_2$SO$_4$, decanted, and concentrated. NMR had shown product along minor impurities, however signals are broad due to the presence of multiple tautomers. The material is used in the next reaction crude without further purification.

$^1$H NMR (500 MHz, Chloroform-d) δ: 4.18 (d, J=82.0 Hz, 2H), 3.45 (d, J=38.8 Hz, 2H), 3.26 (s, 4H), 2.35 (s, 6H), 1.85 (s, 4H), 1.70 (dq, J=13.1, 3.9 Hz, 4H), 1.66-1.51 (m, 6H), 1.41-1.24 (m, 6H), 1.18 (dq, J=15.7, 11.8 Hz, 6H).

$^{13}$C NMR (126 MHz, Chloroform-d) δ: 157.88, 33.98, 28.42, 25.75, 24.96, 22.51, 14.40, 14.32.

A solution of the crude isothiourea (1.0785 g, 2.705 mmol, 1.00 eq) and Et$_3$N (0.575 g, 0.79 mL, 5.681 mmol, 2.10 eq) in acetonitrile-CH$_2$Cl$_2$ (27.0 mL, 1:1) in an oven-dried brown jar protected from light was placed in an ice water cooling bath and stirred (300 rpm) for 30 mins upon which solid AgNO$_3$ (0.942 g, 5.545 mmol, 2.05 eq) was added all at once. After 2 hrs the yellow heterogeneous mixture was diluted with hexanes (20 mL), stirred vigorously (1000 rpm) for 5 mins, suction filtered cold over a pad of celite with hexanes, and concentrated to ~5 mL. The mixture was diluted with hexanes (20 mL), and concentrated to ~5 mL. This process was repeated twice more, and then the hexanes mixture was suction filtered over a pad of celite using hexanes and concentrated in vacuo to afford the biscarbodiimide (0.544 g, 1.799 mmol, 66%) as a clear colorless oil. Any residual water is removed azeotropically using PhMe (4×3 mL) in vacuo. NMR indicated pure product.

$^1$H NMR (500 MHz, Chloroform-d) δ 3.26-3.13 (m, 6H), 1.92-1.82 (m, 4H), 1.76-1.67 (m, 4H), 1.67-1.57 (m, 4H), 1.57-1.49 (m, 2H), 1.36-1.12 (m, 10H).

$^{13}$C NMR (126 MHz, Chloroform-d) δ 139.87, 55.61, 46.39, 34.83, 28.64, 25.40, 24.54.

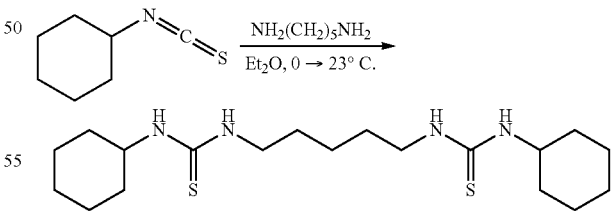

A vigorously stirring (700 rpm) clear colorless solution of cyclohexylisothiocyanate (2.000 g, 2.01 mL, 14.16 mol, 2.00 eq) in diethyl ether (25.0 mL) under nitrogen was placed in an ice bath for 20 mins upon which cadaverine (0.724 g, 0.83 mL, 7.08 mmol, 1.00 eq) was added neat via syringe. The now white heterogeneous mixture was allowed to stir vigorously for 12 hrs while gradually warming to 23° C. The white mixture was then placed in an ice water bath for 1 hr, suction filtered cold, the white filter cake was washed with cold ethyl ether (3×20 mL), and the resultant white paste was dried in vacuo to afford the bisthiourea product as free flowing white powder (2.277 g, 5.920 mmol, 84%). $^1$H-NMR inducated a product with trace an ethyl ether impurity, and cis/trans isomers as well as tautomers were present. The isomers and tautomers are indicated by asterisk (*).

$^1$H NMR (500 MHz, DMSO-$d_6$) δ 7.20 (br s, 2H), 7.14 (br d, J=8.0 Hz, 2H), 3.91 (m, 2H), 3.32 (m, 4H), 1.80 (dt, J=12.2, 4.0 Hz, 4H), 1.63 (dq, J=13.0, 3.9 Hz, 4H), 1.52 (dt, J=12.7, 3.9 Hz, 2H), 1.44 (p, J=7.4 Hz, 4H), 1.30-1.18 (m, 6H), 1.18-1.05 (m, 6H).

$^{13}$C NMR (126 MHz, DMSO-$d_6$) δ 181.39, 52.04, 43.78, 32.77, 29.06, 25.65, 24.99, 24.33.

Chemical Shifts for the Biscarbodiimide:

$^1$H NMR (500 MHz, Chloroform-d) δ: 3.21 (t, J=6.8 Hz, 6H), 1.94-1.84 (m, 5H), 1.80-1.69 (m, 5H), 1.64-1.52 (m, 7H), 1.48-1.40 (m, 2H), 1.37-1.15 (m, 10H).

$^{13}$C NMR (126 MHz, Chloroform-d) δ: 140.01, 55.64, 46.68, 34.85, 30.92, 25.42, 24.56, 24.14.

Chemical Shifts for the Bisisothiourea:

$^1$H NMR (500 MHz, Chloroform-d) δ 3.25 (s, 4H), 2.35 (s, 6H), 1.88 (s, 2H), 1.71 (d, J=13.3 Hz, 4H), 1.66-1.54 (m, 8H), 1.47-1.29 (m, 6H), 1.29-1.12 (m, 6H).

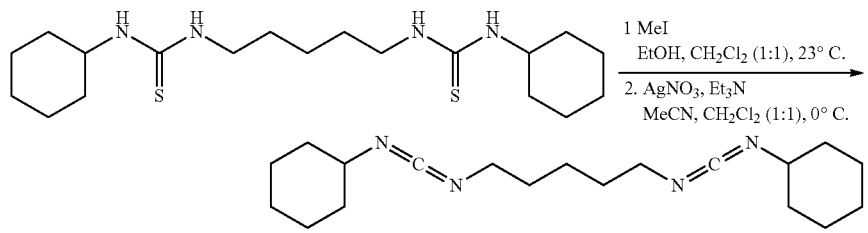

To a white heterogeneous mixture of the bisthiourea (1.862 g, 4.841 mmol, 1.00 eq) in ethanol and $CH_2Cl_2$ (40 mL, 1:1) was added iodomethane (2.95 g, 1.29 mL, 20.80 mmol, 4.30 eq). The mixture changed to a clear pale yellow solution after 10 mins which was then allowed to stir (300 rpm) for 12 hrs at 23° C. The clear colorless solution was then neutralized with an aqueous saturated mixture of $NaHCO_3$ (60 mL), diluted with $CH_2Cl_2$ (20 mL), stirred vigorously (1000 rpm) for 2 mins, an aqueous solution of NaOH (10 mL, 1 N) was added, the biphasic mixture was poured into a separatory funnel, partitioned, and the organic layer was washed with an aqueous saturated mixture of $NaHCO_3$ (3×20 mL). Residual organics were back extracted from the aqueous layer using $CH_2Cl_2$ (3×10 mL), combined, washed with brine (1×20 mL), dried over solid $Na_2SO_4$, suction filtered over a pad of solid $Na_2SO_4$, and concentrated. NMR had shown product along with minor impurities and residual solvent so the crude material was further dried in vacuo to afford the bisisothiourea as a golden yellow viscous oil (1.945 g, 4.713 mmol, 97%). The product was carried onto the subsequent reaction without further purification.

A solution of the bismethyl isothiourea (1.000 g, 2.423 mmol, 1.00 eq) and $Et_3N$ (0.515 g, 0.71 mL, 5.088 mmol, 2.10 eq) in acetonitrile-$CH_2Cl_2$ (25.0 mL, 1:1) in an oven-dried brown vial protected from light was placed in an ice water cooling bath and stirred (300 rpm) for 30 mins upon which solid $AgNO_3$ (0.844 g, 4.967 mmol, 2.05 eq) was added all at once. After 1 hr the yellow heterogeneous mixture was diluted with hexanes (20 mL), stirred vigorously (1000 rpm) for 5 mins, suction filtered cold over a pad of celite with hexanes, and concentrated to ~5 mL. The mixture was diluted with hexanes (20 mL), and concentrated to ~5 mL. This process was repeated twice more, and then the hexanes mixture was suction filtered over a pad of celite using hexanes and concentrated in vacuo to afford the biscarbodiimide (0.520 g, 1.643 mmol, 68%) as a clear colorless oil. Any residual water is removed azeotropically using PhMe (4×3 mL) in vacuo. NMR had shown pure product.

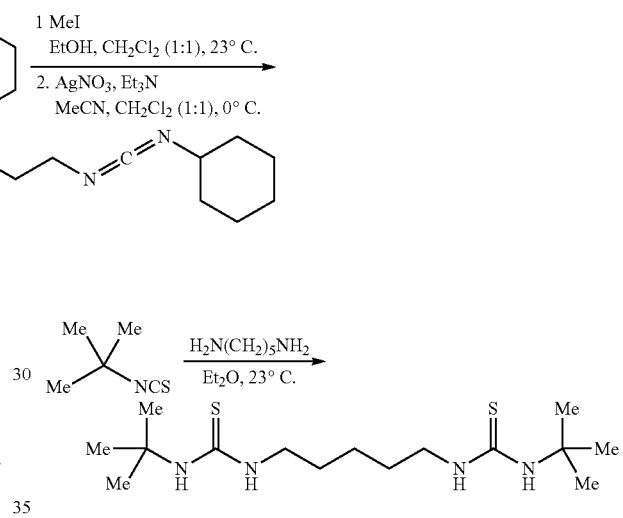

To a vigorously stirring (1000 rpm) solution of the thioisocyanate (2.000 g, 2.20 mL, 17.36 mmol, 2.00 eq) in anhydrous ethyl ether (20 mL) at 23° C. under nitrogen was added a solution of cadaverine (0.887 g, 1.02 mL, 8.68 mmol, 1.00 eq) in anhydrous ethyl ether (10 mL). The clear colorless solution is rapidly stirred for 12 hrs at 23° C. becoming a white heterogeneous mixture in the process. NMR of an aliquot of the reaction indicated the completion of the reaction and the ether was removed in vacuo to afford the bisthiourea as a white solid (2.880 g, 17.31 mmol, 100%).

$^1$H NMR (500 MHz, Chloroform-d) δ 6.23-6.05 (m, 2H), 5.93 (s, 2H), 3.54 (q, J=7.1 Hz, 4H), 1.64 (p, J=7.3 Hz, 5H), 1.42 (s, 18H), 1.41-1.36 (m, 2H).

$^{13}$C NMR (126 MHz, Chloroform-d) δ 181.02, 52.95, 44.91, 29.54, 28.61, 23.92.

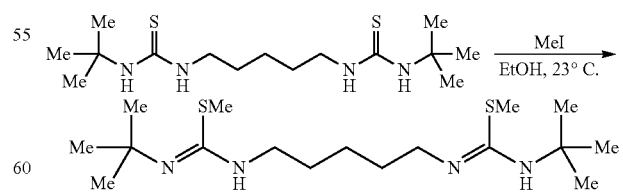

To a solution of the bisthiourea (800.0 mg, 2.40 mmol, 1.00 eq) in ethanol (6.0 mL) at 23° C. was added iodomethane (1.36 g, 0.60 mL, 9.60 mmol, 4.00 eq). The clear colorless solution was stirred vigorously (500 rpm) for 12 hrs. The now white mixture was diluted with a saturated aqueous mixture of NaHCO₃ (50 mL) and diluted with ethyl ether (30 mL). The slightly opaque mixture was stirred vigorously (1000 rpm) for 2 mins upon which an aqueous solution of NaOH (5 mL, 1 N) was added. The now clear colorless biphasic mixture was poured into a separatory funnel, partitioned, and the organics were washed with a saturated aqueous mixture of NaHCO₃ (3×20 mL). Residual organics were back extracted from the aqueous with ethyl ether (3×10 mL), dried over solid Na₂SO₄, decanted, and concentrated to reveal a pale golden brown oil (822.0 mg, 2.28 mol, 95%). NMR of the oil had shown product.

¹H NMR (500 MHz, Chloroform-d) δ 3.77 (s, 2H), 3.32 (t, J=6.8 Hz, 4H), 2.31 (s, 6H), 1.57 (p, J=7.1 Hz, 4H), 1.44 (td, J=7.7, 4.7 Hz, 2H), 1.34 (s, 18H).

¹³C NMR (126 MHz, Chloroform-d) δ 146.44, 52.28, 51.52, 31.91, 28.88, 25.59, 15.36.

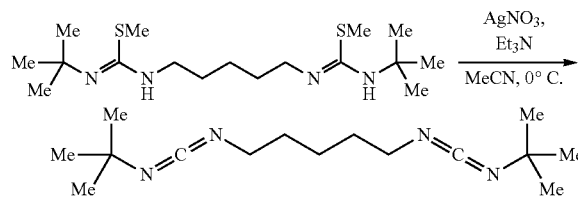

A solution of the crude bismethylisothiourea (2.701 g, 7.499 mmol, 1.00 eq) and Et₃N (1.594 g, 2.20 mL, 15.748 mmol, 2.10 eq) in MeCN (75 mL) was placed in an ice water bath for 30 mins upon which solid AgNO₃ (2.611 g, 15.373 mmol, 2.05 eq) was added all once. After stirring vigorously (500 rpm) for 2 hrs hexanes (100 mL) was added, the yellow biphasic heterogeneous mixture was suction filtered over celite, concentrated to ~10 mL, hexanes (50 mL) was added, the mixture was concentrated to ~10 mL, this was repeated three more times, the resultant yellow heterogeneous mixture was then diluted with hexanes (50 mL), suction filtered over a pad of celite, and concentrated to afford the biscarbodiimide as a clear colorless oil (1.698 g, 6.422 mmol, 86%).

¹H NMR (500 MHz, Chloroform-d) δ 3.21 (t, J=6.9 Hz, 4H), 1.63-1.54 (m, 4H), 1.50-1.41 (m, 2H), 1.27 (s, 18H).

¹³C NMR (101 MHz, Chloroform-d) δ 139.90, 55.03, 46.76, 31.32, 31.00, 24.18.

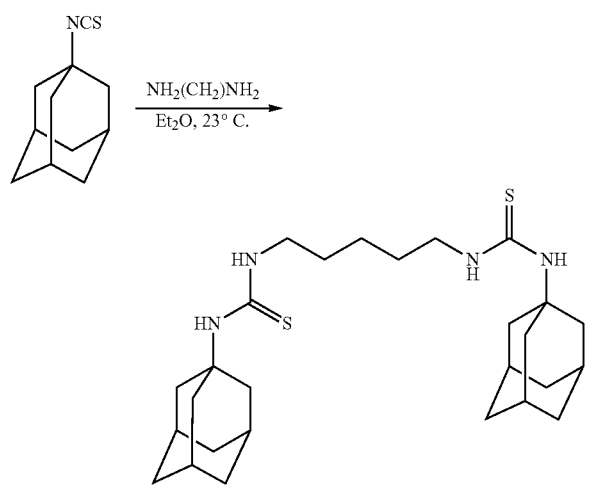

A solution of adamantyl isothiocyanate (2.00 g, 10.35 mmol, 2.00 eq) in ether (55 mL) was placed in a 23° C. water bath and stirred vigorously (700 rpm) upon which cadaverine (0.529 g, 0.61 mL, 5.18 mmol, 1.00 eq) was slowly added neat via syringe. After 12 hrs an NMR of a crude aliquot had shown product along with other impurities. The now white mixture was placed in an ice water cooling bath for 30 mins and suction filtered cold using cold ether. The resulting white solid was washed with cold ether (3×20 mL) and then dried in vacuo to afford the bisthiourea as a white powder (1.901 g, 3.89 mmol, 76%). NMR of the white powder indicated a pure product with trace diethyl ether remaining and a mixture of cis/trans isomers, which are denoted by asterisk (*).

¹H NMR (400 MHz, DMSO-d6) δ 7.15 (t, J=5.2 Hz, 2H), 6.82 (s, 2H), 3.27 (q, J=6.1 Hz, 4H), 2.09 (d, J=2.9 Hz, 12H), 2.06-1.91 (m, 6H), 1.58 (d, J=3.1 Hz, 12H), 1.39 (h, J=7.5 Hz, 4H), 1.34-1.16 (m, 2H).

¹³C NMR (126 MHz, DMSO-d₆) δ 181.02, 52.98, (43.41*) 43.30, (42.05*) 41.69, 36.44 (33.52*), 29.48, (29.09*) 28.97, 24.45 (24.38*).

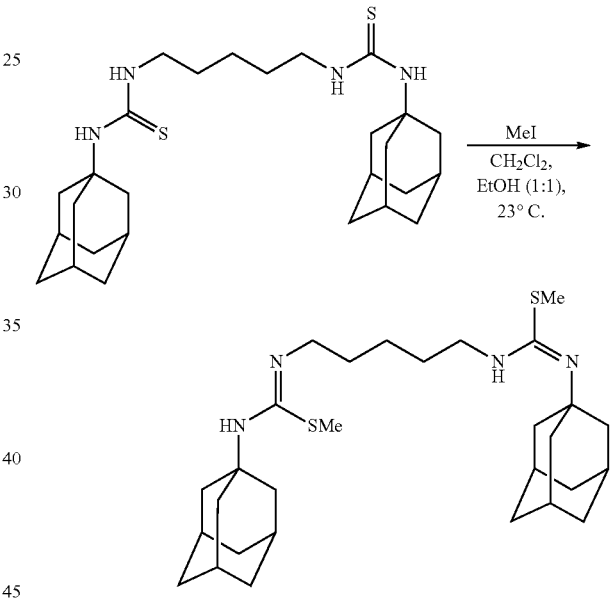

To a solution of the bisthiourea (633.0 mg, 1.30 mmol, 1.00 eq) in ethanol and CH₂Cl₂ (30.0 mL, 1:1) at 23° C. was added iodomethane (738.0 mg, 0.33 mL, 5.20 mmol, 4.00 eq). The clear colorless solution was stirred (300 rpm) for 12 hrs upon which it was neutralized with an aqueous saturated mixture of NaHCO₃ (60 mL) and further diluted with CH₂Cl₂ (20 mL). The white mixture was stirred vigorously (1000 rpm) for 2 mins and then an aqueous solution of NaOH (15 mL, 1 N) was added. After stirring for 2 mins, the now clear colorless biphasic mixture was poured into a separatory funnel, partitioned, and the organics were washed with an aqueous saturated mixture of NaHCO₃ (3×20 mL). Residual organics were back extracted from the aqueous with CH₂Cl₂ (3×10 mL), combined, washed with brine (20 mL), dried over solid Na₂SO₄, decanted, and concentrated to afford the bisisothiourea as an off-white solid (660.9 mg, 1.28 mmol, 99%). NMR of the solid had shown product.

¹H NMR (400 MHz, Chloroform-d) δ 3.70 (s, 2H), 3.29 (t, J=7.0 Hz, 4H), 2.30 (s, 6H), 2.03 (s, 6H), 1.99 (d, J=2.5 Hz, 12H), 1.64 (d, J=3.1 Hz, 12H), 1.55 (t, J=7.3 Hz, 4H), 1.48-1.37 (m, 2H).

¹³C NMR (126 MHz, Chloroform-d) δ 146.13, 52.90, 51.54, 41.97, 36.63, 31.78, 29.70, 25.51, 24.73, 15.48.

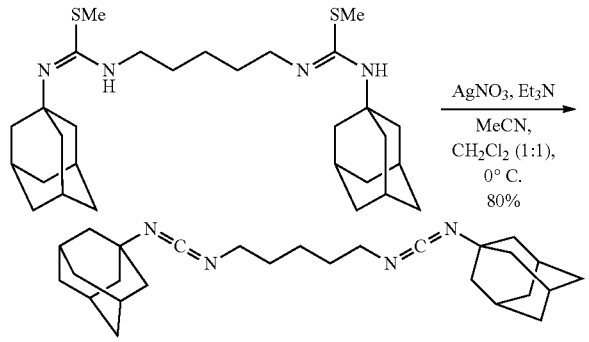

A solution of the bismethyl isothiourea (392.0 mg, 0.7585 mmol, 1.00 eq) and Et₃N (160.7 mg, 222.0 μl, 1.594 mmol, 2.10 eq) in acetonitrile-CH₂Cl₂ (32.0 mL, 1:1) in an oven-dried brown jar protected from light was placed in an ice water cooling bath and stirred (300 rpm) for 30 mins upon which solid AgNO₃ (265.0 mg, 1.554 mmol, 2.05 eq) was added all at once. After 1 hr the yellow heterogeneous mixture was diluted with hexanes (20 mL), stirred vigorously (1000 rpm) for 5 mins, suction filtered cold over a pad of celite with hexanes, and concentrated to ~5 mL. The mixture was diluted with hexanes (20 mL), and concentrated to ~5 mL. This process was repeated twice more, and then the hexanes mixture was diluted with hexanes (20 mL), suction filtered over a pad of celite, and concentrated in vacuo to afford the biscarbodiimide (255.9 mg, 0.6084 mmol, 80%) as a clear colorless viscous oil. The product is azeotropically dried using PhMe (4×3 mL) in vacuo prior to use.

¹H NMR (500 MHz, Chloroform-d) δ 3.21 (t, J=6.8 Hz, 4H), 2.09 (s, 6H), 1.78 (d, J=2.8 Hz, 12H), 1.70-1.55 (m, 16H), 1.46 (tt, J=9.5, 5.8 Hz, 2H).

¹³C NMR (101 MHz, Chloroform-d) δ 140.06, 55.13, 46.83, 44.78, 35.98, 30.95, 29.81.

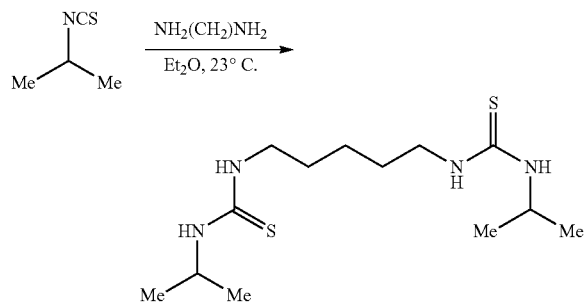

To a vigorously stirring (1000 rpm) solution of the thioisocyanate (2.000 g, 2.11 mL, 19.77 mmol, 2.00 eq) in anhydrous ethyl ether (50 mL) at 23° C. under nitrogen was added a solution of cadaverine (1.010 g, 1.16 mL, 9.88 mmol, 1.00 eq) neat dropwise via syringe over 2 mins. The clear colorless solution instantly changed to a white heterogeneous mixture which was vigorously stirred for 12 hrs. NMR aliquot had shown pure product. The white mixture was fully concentrated to reveal the bisthiourea (3.01 g, 9.88 mmol, 100%).

¹H NMR (400 MHz, DMSO-d6) δ 7.16 (s, 2H), 7.09 (d, J=7.9 Hz, 2H), 4.18 (s, 2H), 3.33-3.24 (m, 4H), 1.43 (p, J=7.3 Hz, 4H), 1.21 (tt, J=8.2, 6.0 Hz, 2H), 1.05 (dd, J=6.5, 0.9 Hz, 12H).

¹³C NMR (101 MHz, DMSO-d6) δ 181.25, 45.21, 43.72, 29.03, 24.29, 22.79. HRMS (ESI): calc'd C13H28N4S2 [M+H]⁺ as 305.2255; found 305.2285.

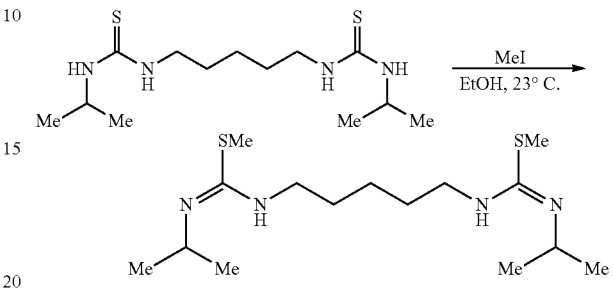

To a mixture of the bisthiourea (850.0 mg, 2.79 mmol, 1.00 eq) in CH₂Cl₂ and ethanol (40.0 mL, 1:1) at 23° C. was added iodomethane (1.58 g, 0.70 mL, 11.16 mmol, 4.00 eq). The white mixture was stirred (300 rpm) for 12 hrs. The now clear colorless homogeneous solution was neutralized with an aqueous saturated mixture of NaHCO₃ (60 mL) and CH₂Cl₂ (20 mL). The white mixture was stirred vigorously (1000 rpm) for 5 mins and then an aqueous solution of NaOH (10 mL, 1 N) was added. The now clear colorless biphasic mixture was poured into a separatory funnel, partitioned, and the organics were washed with an aqueous saturated mixture of NaHCO₃ (3×20 mL). Residual organics were back extracted from the aqueous with CH₂Cl₂ (3×10 mL), combined, washed with brine (20 mL), dried over solid Na₂SO₄, decanted, and concentrated to afford the isothiourea as an off-white solid (866.7 mg, 2.61 mmol, 94%). NMR spectra of the solid indicated pure product.

¹H NMR (400 MHz, Chloroform-d) δ 3.82 (bs, 3H), 3.23 (bs, 5H), 2.32 (s, 6H), 1.57 (p, J=7.3 Hz, 4H), 1.47-1.34 (m, 2H), 1.11 (d, J=6.3 Hz, 12H).

¹³C NMR (126 MHz, Chloroform-d) δ 149.84, 46.11, 30.63, 24.95, 23.78, 23.59, 14.35. HRMS (ESI): calc'd C₁₅H₃₂N₄S₂ [M+H]⁺ as 333.2630; found 333.2634.

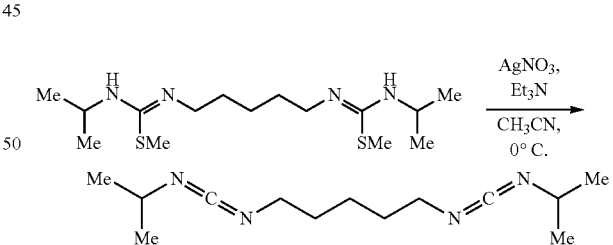

A solution of the bismethylisothiourea (2.363 g, 7.105 mmol, 1.00 eq) and Et₃N (1.510 g, 2.10 mL, 14.921 mmol, 2.10 eq) in non-anhydrous acetonitrile (140 mL) in a brown jar protected from light was placed in an ice water bath for 20 mins upon which solid AgNO₃ (2.474 g, 14.565 mmol, 2.05 eq) was added all at once. After 2 hrs the yellow heterogeneous mixture was diluted with hexanes (100 mL), stirred vigorously (1000 rpm) for 2 mins, suction filtered cold through a pad of celite, concentrated to ~10 mL, hexanes (50 mL) was added, concentrated to ~10 mL, this process was repeated 3× more, hexanes (50 mL) was added, the mixture was suction filtered through a pad of celite, and concentrated to afford the biscarbodiimide as a clear colorless oil (1.558 g, 6.590 mmol, 93%). NMR spectra indicated pure product.

$^1$H NMR (500 MHz, Chloroform-d) δ 3.56 (hept, J=6.4 Hz, 2H), 3.22 (t, J=6.8 Hz, 4H), 1.68-1.51 (m, 4H), 1.51-1.37 (m, 2H), 1.22 (d, J=6.4 Hz, 12H).

$^{13}$C NMR (126 MHz, Chloroform-d) δ 140.12, 48.91, 46.65, 30.90, 24.59, 24.11. HRMS (ESI): calc'd $C_{13}H_{24}N_4$ [M+H]$^+$ as 237.2035; found 237.2027.

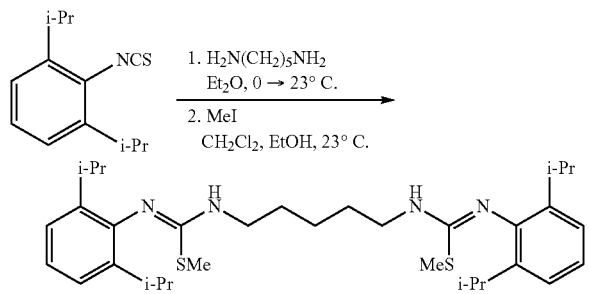

A solution of 2,6-diisopropylisothiocyanate (2.000 g, 1.98 mL, 9.118 mmol, 2.00 eq) in ethyl ether (50 mL) under nitrogen in an oven dried flask was placed in an ice water bath and stirred vigorously (700 rpm) for 30 mins upon which cadaverine (0.466 g, 0.54 mL, 4.559 mmol, 1.00 eq) was added neat. The clear colorless solution instantaneously changed to a white heterogeneous mixture which was allowed to stir for 12 hrs warming gradually to 25° C. in the process. The white mixture was then placed in an ice water bath for 30 mins following which it was suction filtered cold. The white solid was washed with cold ether (3×20 mL) and then dried in vacuo to afford the bisthiourea (1.880 g, 3.476 mmol, 76%). NMR spectra indicated a pure product.

To a solution of the bisthiourea (1.000 g, 1.849 mmol, 1.00 eq) in EtOH (20 mL) was added iodomethane (1.050 g, 0.46 mL, 7.395 mmol, 4.00 eq). The pale yellow solution was allowed to stir (300 rpm) for 12 hrs upon which the clear colorless solution was diluted with an aqueous saturated mixture of NaHCO$_3$ (60 mL), then CH$_2$Cl$_2$ (20 mL), and then aqueous NaOH (20 mL, 1 N). The biphasic mixture was stirred vigorously (1000 rpm) for 2 mins, poured into a separatory funnel, partitioned, the organic layer was washed with an aqueous saturated mixture of NaHCO$_3$ (3×20 mL), residual organics were back extracted from the aqueous layer using CH$_2$Cl$_2$ (3×20 mL), combined, washed with brine (1×20 mL), dried over solid Na$_2$SO$_4$, suction filtered over a pad of Na$_2$SO$_4$, and concentrated to afford the bis-isothiourea as a golden yellow oil (1.031 g, 1.812 mmol, 98%).

Characterization of the Bisthiourea:

$^1$H NMR (400 MHz, DMSO-d$_6$) δ 7.16 (m, 5H), 7.09 (d, J=7.9 Hz, 3H), 4.18 (m, 4H), 3.38-3.16 (m, 4H), 1.43 (p, J=7.3 Hz, 4H), 1.21 (tt, J=8.3, 6.0 Hz, 2H), 1.05 (dd, J=6.5, 0.9 Hz, 24H).

Characterization of the Bismethylisothiourea:

$^1$H NMR (500 MHz, Chloroform-d) δ 7.13 (d, J=8.0 Hz, 4H), 7.05 (dd, J=8.4, 6.8 Hz, 2H), 4.20 (m, 2H), 3.27 (m, 4H), 2.97 (hept, J=6.9 Hz, 4H), 2.44 (br s, 6H), 1.55 (s, 4H), 1.40-1.27 (m, 2H), 1.22 (d, J=6.9 Hz, 12H), 1.18 (d, J=6.9 Hz, 12H).

$^{13}$C NMR (126 MHz, Chloroform-d) δ 153.06, 144.37, 139.53, 123.10, 123.06, 43.03, 30.11, 28.14, 24.04, 23.53, 23.38, 13.59. ESI-MS: calc'd for $C_{33}H_{53}N_4S_2$ [M+H]$^+$= 569.3721; found 569.3721.

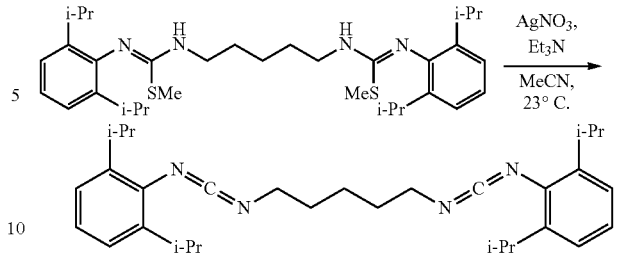

To a solution of the bismethylisothiourea (1.5956 g, 2.805 mmol, 1.00 eq) and Et$_3$N (1.192 g, 1.64 mL, 11.781 mmol, 4.20 eq) in acetonitrile (30.0 mL) at 23° C. was added solid AgNO$_3$ (1.906 g, 11.220 mmol, 4.00 eq) all at once. After stirring for 3 hrs the yellow heterogeneous mixture was diluted with hexanes (100 mL), stirred vigorously (1000 rpm) for 5 mins, suction filtered cold over a pad of celite with hexanes, and concentrated to ~5 mL. The mixture was diluted with hexanes (20 mL), and concentrated to ~5 mL. This process was repeated twice more, and then the hexanes mixture was suction filtered over a pad of celite using hexanes and concentrated in vacuo to afford the biscarbodiimide (1.212 g, 2.564 mmol, 91%) as a clear golden yellow oil. The biscarbodiimide is azeotropically dried using PhMe (4×3 mL) in vacuo prior to use.

$^1$H NMR (500 MHz, Chloroform-d) δ 7.09 (s, 6H), 3.40 (d, J=6.8 Hz, 4H), 3.38-3.30 (m, 4H), 1.75-1.63 (m, 4H), 1.61-1.47 (m, 2H), 1.24 (d, J=6.9 Hz, 21H).

$^{13}$C NMR (126 MHz, Chloroform-d) δ 142.03, 134.34, 132.65, 124.64, 123.10, 46.54, 30.98, 28.89, 24.28, 23.22.

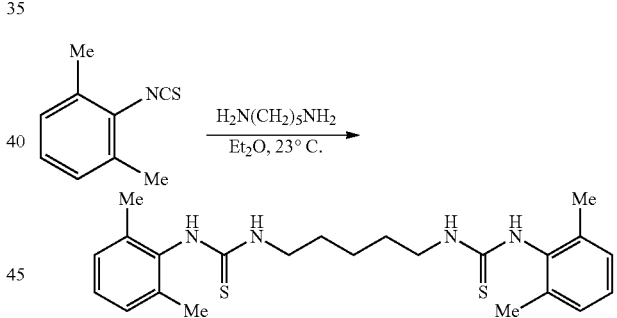

To a vigorously stirring (1000 rpm) solution of 2,6-dimethylphenylisothiocyanate (2.000 g, 1.85 mL, 12.252 mmol, 2.00 eq) in Et$_2$O (65 mL) was added cadaverine (0.626 g, 0.72 mL, 6.126 mmol, 1.00 eq) in slow dropwise fashion over 1 min. The clear colorless solution was allowed to stir vigorously for 12 hrs upon which the white heterogeneous mixture was placed in an ice water bath for 1 hr, suction filtered cold, the white filtered solid was washed with cold Et$_2$O (3×20 mL), and dried in vacuo to afford the bisthiourea as a white powder (2.331 g, 5.438 mmol, 89%).

$^1$H NMR (400 MHz, DMSO-d$_6$) δ 7.05 (s, 6H), 3.49-3.20 (m, 4H), 2.09 (s, 12H), 1.45 (s, 4H), 1.20 (s, 2H).

$^1$H NMR (500 MHz, Acetone-d$_6$) δ 8.33 (s, 1H), 7.11 (d, J=7.4 Hz, 5H), 6.47 (s, 1H), 3.55 (q, J=7.4, 6.7 Hz, 4H), 2.22 (s, 12H), 1.57 (s, 4H), 1.27 (s, 2H).

$^{13}$C NMR (126 MHz, Acetone-d$_6$) δ 181.31, 137.25, 137.22, 128.31, 44.28, 23.82, 17.40. LCMS (ESI): calc'd $C_{23}H_{32}N4S_2$ [M+H]$^+$ as 429.3; found 429.3.

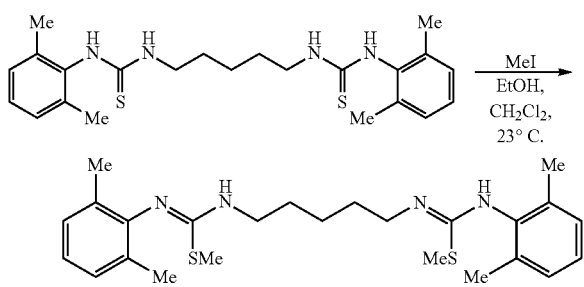

To a solution of the bisthiourea (2.331 g, 5.438 mmol, 1.00 eq) in EtOH—CH$_2$Cl$_2$ (100 mL, 1:1) at 23° C. was added iodomethane (3.087 g, 1.40 mL, 21.752 mmol, 4.00 eq). After stirring (500 rpm) for 12 hrs the clear pale yellow solution was neutralized with a saturated aqueous mixture of NaHCO$_3$ (100 mL), then aqueous NaOH (15 mL, 1 N) was added slowly, the biphasic white heterogeneous mixture was stirred vigorously (1000 rpm) for 2 mins, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, washed with brine (1×50 mL), dried over solid Na$_2$SO$_4$, decanted, and concentrated to afford the bismethylisothiourea (2.483 g, 5.438 mmol, 100%). NMR had shown product as a mixture of isomers/tautomers along with minor impurities. The crude material was used in the subsequent reaction without further purification.

$^1$H NMR (500 MHz, Chloroform-d) δ 7.00 (d, J=7.5 Hz, 4H), 6.86 (t, J=7.5 Hz, 2H), 4.24 (s, 2H), 3.31 (s, 4H), 2.37 (s, 6H), 2.10 (s, 12H), 1.59 (s, 4H), 1.36 (s, 2H).

$^{13}$C NMR (126 MHz, Chloroform-d) δ 152.52, 146.60, 129.25, 127.89, 122.52, 43.01, 29.90, 24.07, 18.01, 13.66. LCMS (ESI): calc'd C$_{25}$H$_{36}$N$_4$S$_2$ [M+H]$^+$ as 457.3; found 457.3.

$^1$H NMR (500 MHz, Chloroform-d) δ 7.01 (dq, J=7.3, 0.7 Hz, 4H), 6.93 (dd, J=8.2, 6.8 Hz, 2H), 3.40 (t, J=6.8 Hz, 4H), 2.34 (br s, 12H), 1.74-1.66 (m, 4H), 1.59-1.51 (m, 2H).

$^{13}$C NMR (126 MHz, Chloroform-d) δ 136.80, 133.75, 132.19, 128.12, 124.11, 46.67, 30.72, 24.27, 18.93. HRMS (ESI): calc'd C$_{23}$H$_{28}$N$_4$ [M+H]$^+$ as 361.2314; found 361.2299.

To a solution of benzylisothiocyanate (2.000 g, 1.78 mL, 13.404 mmol, 2.00 eq) in Et$_2$O (100 mL) was added cadaverine (0.685 g, 0.79 mL, 6.702 mmol, 1.00 eq) via syringe in a slow dropwise manner. After stirring vigorously (1000 rpm) for 20 hrs the white heterogeneous mixture was concentrated to ~20 mL, placed in an ice water bath for 2 hrs, suction filtered cold, the white filtered solid was washed with cold Et$_2$O (3×20 mL), collected, and dried in vacuo to afford the bisthiourea as a white solid (2.465 g, 6.153 mmol, 92%). NMR indicated pure product.

$^1$H NMR (500 MHz, Acetone-d$_6$) δ 7.38-7.20 (m, 12H), 7.03 (d, J=5.7 Hz, 2H), 4.77 (d, J=5.7 Hz, 4H), 3.51 (s, 4H), 1.59 (p, J=7.3 Hz, 4H), 1.34 (p, J=7.6 Hz, 2H).

$^{13}$C NMR (126 MHz, Acetone-d$_6$) δ 183.39, 139.34, 128.28, 127.43, 126.91, 47.46, 43.94, 28.75, 23.91. HRMS (ESI): calc'd [M+H]$^+$ as 401.1789; found 401.1840.

To a solution of the bisthioguanidine (2.421 g, 6.043 mmol, 1.00 eq) in EtOH—CH$_2$Cl$_2$ (100 mL) at 23° C. was added iodomethane (3.431 g, 1.50 mL, 24.174 mmol, 4.00 eq). The clear colorless solution was stirred (500 rpm) for 12 hrs upon which the now clear pale yellow solution was neutralized with a saturated aqueous mixture of saturated NaHCO$_3$ (50 mL), stirred vigorously (1000 rpm) for 2 mins, the biphasic mixture was poured into a separatory funnel, partitioned, organics were washed with a saturated aqueous mixture of NaHCO$_3$ (3×50 mL), residual organics were extracted from the aqueous layer using CH$_2$Cl$_2$ (2×20 mL), combined, dried over solid Na$_2$SO$_4$, decanted, and concentrated to afford the bisisothiourea as a clear pale golden yellow viscous oil (2.590 g, 6.042 mmol, 100%). NMR indicated product which exists as a complex mixture of isomers.

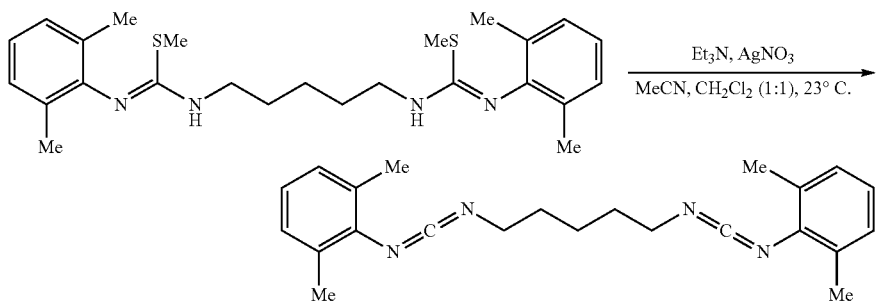

To a stirring (500 rpm) solution of the bismethylisothiourea (2.493 g, 5.459 mmol, 1.00 eq) and Et$_3$N (2.320 g, 3.20 mL, 22.928 mmol, 4.20 eq) in non-anhydrous CH$_2$Cl$_2$—acetonitrile (110 mL, 1:1) in a brown jar protected from light was added solid AgNO$_3$ (3.709 g, 21.836 mmol, 4.00 eq) all at once. After 3.5 hrs the golden brown heterogeneous mixture was diluted with hexanes (100 mL), stirred vigorously (1000 rpm) for 2 mins, suction filtered through a pad of celite, concentrated to ~10 mL, hexanes (50 mL) was added, concentrated to ~10 mL, this process was repeated 3× more, hexanes (50 mL) was added, the mixture was suction filtered through a pad of celite, and concentrated to afford the biscarbodiimide as a pale golden yellow oil (1.575 g, 4.370 mmol, 80%). NMR indicated pure product.

$^1$H NMR (500 MHz, Chloroform-d) δ 7.37-7.28 (m, 8H), 7.28-7.20 (m, 2H), 4.52 (s, 4H), 4.44-4.31 (m, 3H), 3.34 (t, J=7.1 Hz, 4H), 2.40 (s, 6H), 1.62 (p, J=7.3 Hz, 4H), 1.41 (qd, J=8.8, 6.6 Hz, 2H).

$^{13}$C NMR (126 MHz, Chloroform-d) δ 153.56, 140.19, 128.37, 127.51, 126.78, 50.75, 45.69, 29.91, 24.53, 14.48. HRMS (ESI): calc'd [M+H]$^+$ as 429.2002; found 429.1992.

A solution of the bisthioguanidine (2.739 g, 3.600 mmol, 1.00 eq) and Et$_3$N (0.801 g, 1.10 mL, 7.917 mmol, 2.20 eq) in MeCN—CH$_2$Cl$_2$ (100 mL) was placed in an ice water bath for 30 mins upon which solid AgNO$_3$ (1.284 g, 7.560 mmol, 2.10 eq) was added all at once. The now canary yellow heterogeneous mixture was stirred (500 rpm) for 2 hrs at 0° C. upon which the now yellow mixture was diluted with PhMe (100 mL), stirred vigorously (1000 rpm) for 1 min, suction filtered over a pad of celite, rinsed with PhMe (3×20 mL), concentrated to ~10 mL, diluted with PhMe (50 mL), concentrated to ~10 mL, this dilution/concentration process was conducted 3× more to remove residual MeCN and CH$_2$Cl$_2$ and triturate remaining insoluble silver and ammonium salts, the resultant golden yellow heterogeneous mixture was suction filtered over a pad of celite, rinsed with PhMe (3×20 mL), and concentrated to afford the biscarbodiimide as a clear pale golden yellow viscous oil (0.403 g, 1.212 mmol, 34%). NMR indicated pure product.

$^1$H NMR (400 MHz, Chloroform-d) δ 7.44-7.11 (m, 11H), 4.33 (s, 4H), 3.09 (t, J=6.8 Hz, 4H), 1.44-1.33 (m, 4H), 1.29-1.13 (m, 2H).

$^{13}$C NMR (101 MHz, Chloroform-d) δ 140.66, 138.62, 128.58, 127.50, 127.46, 50.50, 46.32, 30.71, 23.83. HRMS (ESI): calc'd [M+H]$^+$ as 333.2035; found 333.2052.

Synthesis of MCI-1

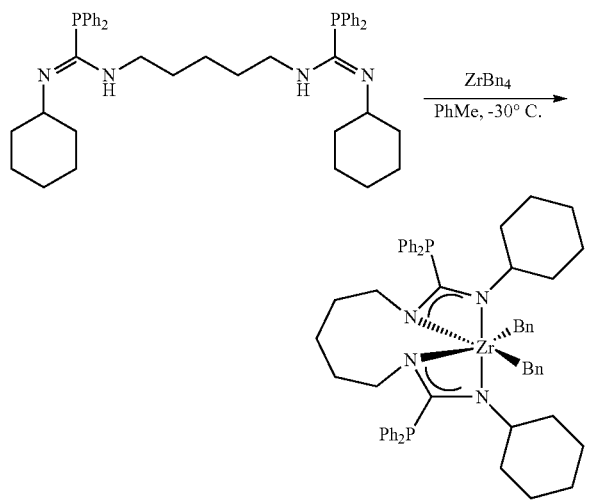

MCI-1: To a solution of the bisphosphaguanidine (28.0 mg, 0.0407 mmol, 1.00 eq) in anhydrous deoxygenated toluene (1.0 mL) in a nitrogen filled glovebox was placed in a freezer cooled to −30° C. for 1 hour. Then, a pre-cooled solution of 18.5 mg of ZrBn$_4$ (18.5 mg, 0.0407 mmol, 1.00 eq) in toluene (1.0 mL) was added in quick dropwise manner. After 2 hrs the golden yellow solution was fully concentrated, suspended methycyclohexane (1.5 mL) and concentrated. This process was repeated twice more to remove any residual toluene, the mixture was suspended in methylcyclohexane (1.0 mL), hexanes (5 mL) was slowly added, the mixture was placed in the freezer (−30° C.) for 14 hrs the mixture was filtered cold through a 0.45 μm submicron filter, the golden yellow liquid was concentrated, and this process was repeated twice more to afford MCI-1 (18.4 mg, 0.0191 mmol, 47%) as a golden brown viscous oil.

$^1$H NMR (500 MHz, Benzene-d$_6$) δ 7.58-7.52 (m, 8H), 7.41-7.36 (m, 4H), 7.36-7.31 (m, 4H), 7.11-7.06 (m, 8H), 7.02-6.96 (m, 6H), 3.83-3.71 (m, 2H), 3.45-3.32 (m, 4H), 2.79 (s, 4H), 1.71 (dt, J=10.3, 5.1 Hz, 9H), 1.54 (d, J=13.1 Hz, 4H), 1.38 (dt, J=12.9, 3.4 Hz, 2H), 1.30-1.22 (m, 5H), 0.99 (tt, J=11.6, 2.9 Hz, 1H), 0.95-0.78 (m, 5H).

$^{31}$P NMR (202 MHz, Benzene-d$_6$) δ −18.34.

$^{13}$C NMR (126 MHz, Benzene-d$_6$) δ 180.66 (d, J=59.3 Hz), 148.05, 133.76 (d, J=14.2 Hz), 133.34 (d, J=20.0 Hz), 128.78, 128.72, 128.43, 127.22, 121.04, 74.57, 58.35 (d, J=13.0 Hz), 47.87 (d, J=16.7 Hz), 35.42, 29.65, 25.68, 25.46, 21.12.

Synthesis of MCI-2

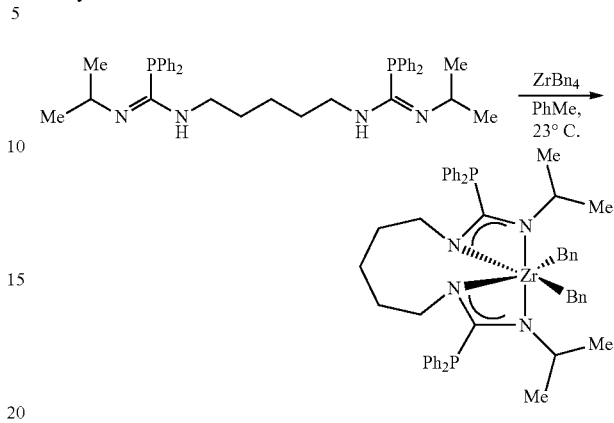

MCI-2: In a nitrogen filled glovebox at 23° C., solid ZrBn$_4$ (33.0 mg, 0.0724 mmol, 1.00 eq) was added to a solution of the bisphosphaguanidine ligand (44.0 mg, 0.0724 mmol, 1.00 eq) in toluene. The resulting bright yellow solution was stirred (300 rpm) for 20 hours, the solvent was evaporated, the resultant orange residue was suspended in methylcyclohexane (2 mL), layered with pentane (5 mL), and the solution was placed in a freezer cooled to −30° C. After 24 hours, a suspension formed, which was filtered through a 0.45 μm PTFE submicron syringe filter, the filtrate was concentrated, suspended in methylcyclohexane (1 mL), layered with pentane (5 mL), the process above was repeated, and the filtrate was concentrated to afford MCI-2 (31.0 mg, 0.0348 mmol, 48%).

$^1$H NMR (400 MHz, d$_6$-benzene) 7.51-7.36 (m), 7.15-6.83 (m), 4.31 (septet, J=6.4 Hz), 4.07 (septet, J=6.4 Hz), 3.23 (m), 2.69 (s), 2.45 (s), 1.12 (d, J=6.42), 0.84-0.76 (m)

$^{31}$P NMR (202 MHz, d$_6$-benzene) −19.73 (major).

Synthesis of MCI-3

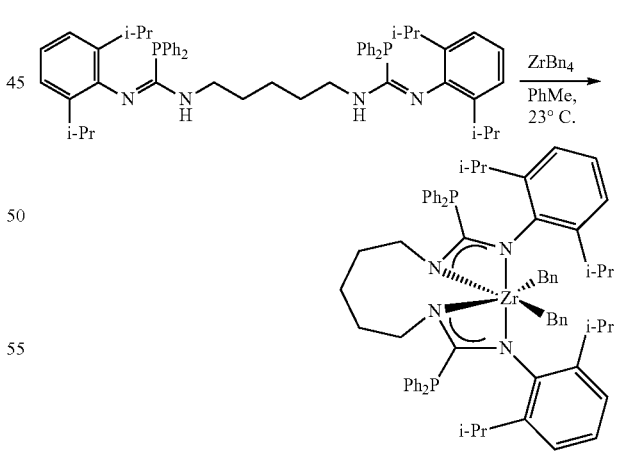

In a nitrogen filled glovebox at 23° C., ZrBn$_4$ (27.0 mg, 0.0592 mmol, 1.00 eq) was added to a solution of the bisphosphaguanidine (50.0 mg, 0.0592 mmol, 1.00 eq) in anhydrous deoxygenated toluene (15.0 mL). The resulting bright yellow solution was stirred at 23° C. for 20 hours, the solution was concentrated, the resultant residue was suspended in benzene/methylcyclohexane (2 mL, 1:1), layered with pentane (5 mL), and the solution placed in a freezer cooled to −30° C. After 24 hours, the resultant suspension was filtered cold through a 0.45 μm PTFE submicron syringe filter, and the filtrate was concentrated. This process was repeated once more to afford MCI-3 as a dark yellow oil (31.0 mg, 0.0272 mmol, 46%).

$^1$H NMR (400 MHz, d$_6$-benzene) 7.40-6.75 (m, 36H), 3.20-3.10 (m, 4H), 1.65 (br s, 4H), 1.22 (d, 6H), 1.08 (d, 6H), 1.20-1.10 (m, 6H), 1.00-0.95 (m, 2H).

$^{31}$P NMR (202 MHz, d$_6$-benzene) −17.67

Synthesis of MCI-4

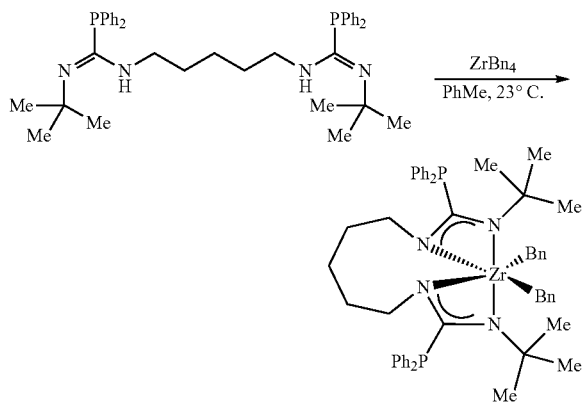

In a nitrogen filled glovebox at 23° C., solid ZrBn$_4$ (27.0 mg, 0.0592 mmol, 1.00 eq) was added to a solution of the bisphosphoryl guanidine (0.0592 mmol, 1.00 eq) in anhydrous deoxygenated toluene (15.0 mL). The resulting bright yellow solution was stirred (300 rpm) for 20 hours, the solvent was evaporated, the residue was suspended in benzene (1 mL), layered with pentane (10 mL), and the biphasic solution was placed in a freezer cooled to −30° C. After 20 hours, the orange solid precipitate was filtered cold through a 0.45 μm PTFE submicron filter, and the filtrate was concentrated in vacuo to afford MCI-4 (22.0 mg, 0.0243 mmol, 41%) as a dark orange oil.

$^1$H NMR (400 MHz, d$_6$-benzene) 7.41 (m, 8H), 7.29 (m, 8H), 7.10 (m, 8H), 7.00 (m, 6H), 3.24 (m, 4H), 2.78 (br s, 4H), 1.82 (s, 18H), 0.67 (m, 2H).

$^{31}$P NMR (202 MHz, d$_6$-benzene) −12.96.

All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Solvents used for experiments performed in a nitrogen-filled glovebox were further dried by storage over activated 3Å molecular sieves. Glassware for moisture-sensitive reactions was dried in an oven overnight prior to use. NMR spectra were recorded on Varian 400-MR and VNMRS-500 spectrometers. LC-MS analyses were performed using a Waters e2695 Separations Module coupled with a Waters 2424 ELS detector, a Waters 2998 PDA detector, and a Waters 3100 ESI mass detector. LC-MS separations were performed on an XBridge C18 3.5 μm 2.1×50 mm column using a 5:95 to 100:0 acetonitrile to water gradient with 0.1% formic acid as the ionizing agent. HRMS analyses were performed using an Agilent 1290 Infinity LC with a Zorbax Eclipse Plus C18 1.8 μm 2.1×50 mm column coupled with an Agilent 6230 TOF Mass Spectrometer with electrospray ionization. 1H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for 1H NMR data are reported in ppm downfield from internal tetramethylsilane (TMS, δ scale) using residual protons in the deuterated solvent as references. 13C NMR data were determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening was performed in a high throughput parallel polymerization reactor (PPR) system. The PPR system was comprised of an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst solutions, unless otherwise noted, were prepared in toluene. All liquids (i.e. solvent, 1-octene, and catalyst solutions) were added via robotic syringes. Gaseous reagents (i.e. ethylene, H$_2$) were added via a gas injection port. Prior to each run, the reactors were heated to 80° C., purged with ethylene, and vented.

A portion of Isopar-E was added, the reactors were heated to the run temperature, and then pressured to the appropriate psig with ethylene. Toluene solutions of reagents were then added in the following order: (1) 1-octene with 500 nmol of scavenger MMAO-3A; (2) activator (cocatalyst-1, cocatalyst-2, etc); and (3) catalyst. Cocatalyst-1 is a solution activator which is N-methyl N,N-dioctadecylammonium tetrafluoroborate.

Each liquid addition was chased with a small amount of Isopar-E so that after the final addition, a total reaction volume of 5 mL reached. Upon addition of the catalyst, the PPR software began monitoring the pressure of each cell. The pressure (within approximately 2 to 6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% carbon monoxide in argon for 4 minutes at 40-50 psi higher than the reactor pressure. The shorter the "Quench Time", the more active the catalyst. In order to prevent the formation of too much polymer in any given cell, the reaction was quenched upon reaching a predetermined uptake level (50 psig for 120° C. runs, 75 psig for 150° C. runs). After all the reactors were quenched they were allowed to cool to 70° C. They were then vented, purged for 5 minutes with nitrogen to remove carbon monoxide, and the tubes removed. The polymer samples were then dried in a centrifugal evaporator at 70° C. for 12 hours, weighed to determine polymer yield and submitted for IR (1-octene incorporation) and GPC (molecular weight) analysis.

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was then diluted to 1 mg/mL immediately before the injection of a 250 μL aliquot of the sample. The GPC was equipped with two Polymer Labs PLgel 10 μm MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

1-Octene Incorporation IR Analysis

The running of samples for the HT-GPC analysis preceded the IR analysis. A 48-well HT silicon wafer was utilized for deposition and analysis of 1-octene incorporation of samples. For the process, all additional heat that the samples were subject to was 160° C. with duration less than or equal to 210 minutes; samples had to be re-heated to remove magnetic GPC stir bars as well as shaken with glass-rod stir bars on a J-KEM Scientific heated robotic shaker. Samples then were deposited while being heated using a Tecan MiniPrep 75 deposition station, and the 1,2,4-trichlorobenzene was evaporated off the deposited wells of the wafer at 160° C. under nitrogen purge. The analysis of 1-Octene was performed on the HT silicon wafer using a NEXUS 670 E.S.P. FT-IR.

Batch Reactor Polymerization Procedure

The batch reactor polymerizations were conducted in a 2 L Parr™ batch reactor. The reactor is heated by an electrical heating mantle, and is cooled by an internal serpentine cooling coil containing cooling water. Both the reactor and the heating/cooling system were controlled and monitored by a Camile™ TG process computer. The bottom of the reactor is fitted with a dump valve, which empties the reactor contents into a stainless steel dump pot, which is prefilled with a catalyst kill solution (typically 5 mL of a Irgafos/Irganox/toluene mixture). The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene and IsoparE were passed through 2 columns, the first containing A2 alumina, the second containing Q5. The ethylene was passed through 2 columns, the first containing A204 alumina and 4 Å mol sieves, the second containing Q5 reactant. The $N_2$, used for transfers, was passed through a single column containing A204 alumna, 3 Å mol sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the Camile to maintain reaction pressure set point in the reactor. These polymerizations were run for 10 min., then the agitator was stopped and the bottom dump valve opened to empty reactor contents to the dump pot. The dump pot contents were poured into trays placed in a lab hood where the solvent was evaporated off overnight. The trays containing the remaining polymer are then transferred to a vacuum oven, where they are heated up to 140° C. under vacuum to remove any remaining solvent. After the trays cool to ambient temperature, the polymers were weighed for yield/efficiencies, and submitted for polymer testing.

TABLE 1

PPR Polymerization Data

| Catalyst Name | Catalyst μmoles | Co catalyst | Cocatalyst μmoles | Temp. (° C.) | Corrected Yield (mg) | Mn | Mw | Mw/Mn (PDI) | Octene mol % | Quench Time (s) |
|---|---|---|---|---|---|---|---|---|---|---|
| MCI-1  | 0.1  | 1 | 0.15  | 120 | 60  | 105,876 | 711,297 | 6.7  | 0.6  | 510 |
| MCI-1  | 0.3  | 1 | 0.45  | 150 | 71  | 55,443  | 522,439 | 9.4  | 1.5  | 1,801 |
| MCI-2  | 0.1  | 1 | 0.15  | 120 | 69  | 69,969  | 646,079 | 9.2  | 1.4  | 299 |
| MCI-2  | 0.2  | 1 | 0.3   | 120 | 81  | 64,694  | 545,303 | 8.4  | 1.3  | 144 |
| MCI-2  | 0.15 | 1 | 0.225 | 150 | 85  | 55,222  | 521,939 | 9.5  | 1.2  | 179 |
| MCI-3  | 0.1  | 1 | 0.15  | 120 | 22  | 23,714  | 345,696 | 15.0 | 2.2  | 1,801 |
| MCI-4  | 0.1  | 1 | 0.15  | 120 | 77  | 91,666  | 407,877 | 4.5  | 2.0  | 669 |
| MCI-5  | 0.1  | 1 | 0.15  | 120 | 58  | 27,805  | 553,622 | 19.9 | 3.1  | 1,080 |
| MCI-6  | 0.1  | 1 | 0.15  | 120 | 69  | 7,760   | 166,833 | 21.5 | 5.1  | 507 |
| MCI-7  | 0.2  | 1 | 0.15  | 120 | 26  | 5,606   | 58,657  | 10.5 | 5.1  | 1,800 |
| MCI-8  | 0.1  | 1 | 0.15  | 120 | 78  | 45,609  | 552,291 | 12.1 | 4.4  | 407 |
| MCI-9  | 0.1  | 1 | 0.15  | 120 | 26  | 39,132  | 248,903 | 6.4  | 4.4  | 1,801 |
| MCI-10 | 0.1  | 1 | 0.15  | 120 | 61  | 30,049  | 246,511 | 8.2  | 1.8  | 1,728 |
| MCI-10 | 0.15 | 1 | 0.225 | 150 | 89  | 8,842   | 59,183  | 6.7  | 2.3  | 1,801 |
| MCI-11 | 0.1  | 1 | 0.15  | 120 | 80  | 35,942  | 415,253 | 11.6 | 2.7  | 277 |
| MCI-12 | 0.1  | 1 | 0.15  | 120 | 69  | 23,607  | 207,966 | 8.8  | 3.1  | 1,542 |
| MCI-13 | 0.1  | 1 | 0.15  | 120 | 59  | 52,213  | 538,710 | 10.3 | 2.1  | 366 |
| MCI-13 | 0.15 | 1 | 0.225 | 150 | 66  | 11,607  | 235,546 | 20.3 | 2.1  | 1,800 |
| MCI-14 | 0.1  | 1 | 0.15  | 120 | 20  | 21,203  | 268,780 | 12.7 | 1.9  | 1,801 |
| MCI-15 | 0.1  | 1 | 0.15  | 120 | 58  | 16,138  | 268,931 | 16.7 | 2.7  | 1,399 |
| MCI-15 | 0.15 | 1 | 0.225 | 150 | 48  | 7,465   | 154,112 | 20.6 | 2.1  | 1,801 |
| MCI-16 | 0.15 | 1 | 0.225 | 150 | 34  | 13,803  | 195,700 | 14.2 | 3.1  | 1,801 |
| MCI-17 | 0.1  | 1 | 0.15  | 120 | 111 | 51,675  | 383,743 | 7.4  | 11.1 | 200 |
| MCI-18 | 0.1  | 1 | 0.15  | 120 | 35  | 19,257  | 173,401 | 9.0  | 8.1  | 1,802 |

The previously disclosed phosphaguanidine polymerization catalysts according to formula III, in general, produce polyolefins with high native molecular weight (greater than 300,000 g/mol) at temperatures greater than or equal to 120° C. as observed with MCI-1-5, MCI-8, MCI-11, MCI-13, and MCI-17. The catalysts with an iso-propyl or 2,6-dimethylphenyl substituent on the non-tethered/connected nitrogens had the highest activity at 120° C. and 150° C. (MCI-2 and MCI-11). Overall, the zirconium catalysts are more active and produce polymers with higher native molecular than the hafnium catalysts, but in general, the polydispersities are broad (greater than or equal to 5).

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A phosphaguanidine compound comprising the structure of formula I:

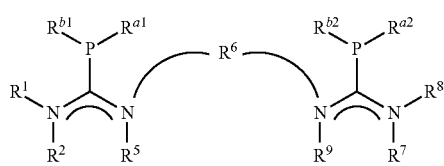

I wherein
  $R^2$, $R^5$, $R^7$, and $R^9$ are independently selected from hydrides, aliphatic moieties, heteroaliphatic moieties, aromatic moieties, heteroaromatic moieties, and a lone pair of electrons;
  $R^6$ is an aliphatic, heteroaliphatic, aromatic, or heteroaromatic moiety;
  $R^1$ and $R^8$ are independently selected from the same or different moieties selected from aliphatic moieties, heteroaliphatic moieties, aromatic moieties, heteroaromatic moieties and a lone pair of electrons;
  $R^{a1}$, $R^{a2}$, $R^{b1}$, and $R^{b2}$ are independently selected from aliphatic moieties, heteroaliphatic moieties, aromatic moieties, and heteroaromatic moieties.

2. The phosphaguanidine compound according to claim 1, wherein one of $R^2$ and $R^5$ is a lone pair of electrons and the other of $R^2$ and $R^5$ is a hydride, aliphatic moiety, heteroaliphatic moiety, aromatic moiety, or heteroaromatic moiety; and one of $R^9$ and $R^7$ is a lone pair of electrons and the other of $R^9$ and $R^7$ is a hydride, aliphatic moiety, heteroaliphatic moiety, aromatic moiety, or heteroaromatic moiety.

3. The phosphaguanidine compound according to claim 1, wherein $R^6$ is a ($C_3$-$C_6$)hydrocarbyl moiety.

4. The phosphaguanidine compound according to claim 1, wherein $R^6$ is a heteroatom selected from a silicon atom, a germanium atom, a nitrogen atom, an oxygen atom, a sulfur atom, and a phosphorus atom.

5. The phosphaguanidine compound according to claim 1, wherein $R^{a1}$, $R^{a2}$, $R^{b1}$, and $R^{b2}$ comprise substituted and unsubstituted phenyl rings.

6. The phosphaguanidine compound according to claim 1, wherein $R^{a1}$, $R^{a2}$, $R^{b1}$, and $R^{b2}$ comprise ($C_5$-$C_6$)cyclohydrocarbyl groups.

7. The phosphaguanidine compound according to claim 1, wherein $R^1$ or $R^2$ and $R^7$ or $R^8$ comprise adamantyl groups.

8. The phosphaguanidine compound according to claim 1, wherein $R^1$ or $R^2$ and $R^7$ or $R^8$ are independently selected from methyl, ethyl, cyclohexyl, iso-propyl, iso-butyl, and tert-butyl moieties.

9. The phosphaguanidine compound according to claim 1, wherein $R^8$ is a repeating unit, the phosphaguanidine compound of formula II comprising:

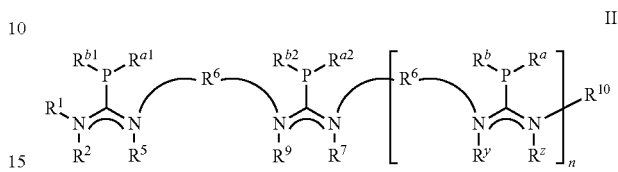

II where
  n is an integer from two to six; $R^{10}$ is selected from a hydrogen atom, an aliphatic moiety, heteroaliphatic moiety, aromatic moiety, or heteroaromatic moiety;
  $R^y$ and $R^z$ include the same or different moieties selected from hydrides, aliphatic moieties, heteroaliphatic moieties, aromatic moieties, heteroaromatic moieties, or a lone pair of electrons;
  $R^a$ and $R^b$ are independently selected from aliphatic moieties, heteroaliphatic moieties, and aromatic moieties, heteroaromatic moieties; and
  wherein each $R^a$, $R^b$, $R^y$, and $R^z$ is the same or different.

10. A metal-ligand complex comprising the phosphaguanidine compound of formula III:

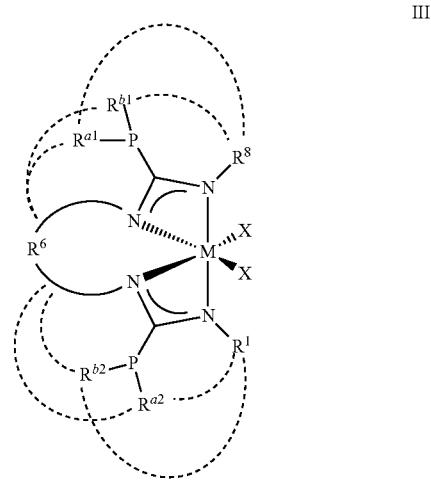

III where
  $R^1$ and $R^8$ are independently selected from hydride, aliphatic, heteroaliphatic, aromatic, and heteroaromatic moieties;
  $R^{a1}$, $R^{a2}$, $R^{b1}$, and $R^{b2}$ are the same or different moieties selected from aliphatic moieties, aromatic moieties, and heteroaromatic moieties;
  M is selected from titanium, zirconium, or hafnium; each X is independently selected from aliphatic moieties, aromatic moieties, $NR^N{}_2$ moieties and halide moieties, wherein $R^N$ is selected from alkyl, aryl, or heteroaryl moieties;
  $R^6$ is selected from an aliphatic moiety, heteroaliphatic moiety, aromatic moiety, and a heteroatom; and
  each dotted line optionally defines a bridging connection.

11. A biphenyl- phosphaguanidine compound comprising the structure of Formula IV:

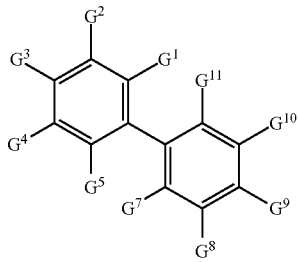

where
G$^1$, G$^2$, G$^3$, G$^4$, G$^5$, G$^7$, G$^8$, G$^9$, G$^{10}$, and G$^{11}$ are independently selected from hydrides, alkyl groups, aryl groups, heteroaryl groups, and guanidine moiety;
each phenyl ring comprises at least one guanidine moiety, the guanidine moiety has a structure according to formula V:

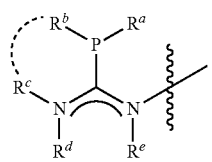

where
R$^d$ and R$^e$ are independently selected from hydrides, aliphatic moieties, heteroaliphatic moieties, aromatic moieties, heteroaromatic moieties, and lone pair of electrons;
R$^c$ is selected from hydrides, aliphatic moieties, heteroaliphatic moieties, aromatic moieties, heteroaromatic moieties and lone pairs of electrons;
R$^a$ and R$^b$ are independently selected from aliphatic moieties, heteroaliphatic moieties, aromatic moieties, and heteroaromatic moieties; and
each curved dotted line optionally defines a bridging connection,
wherein, in cases where there are a plurality of guanidine moieties, R$^a$, R$^b$, R$^c$, R$^d$, and R$^e$ may be the same or different within the plurality of guanidine moieties.

12. The biphenyl- phosphaguanidine compound according to claim 11, wherein G$^1$, G$^5$, G$^7$, and G$^{11}$ include the guanidine moiety of formula V, and G$^2$, G$^3$, G$^4$, G$^8$, G$^9$, and G$^{10}$ are hydrogen atoms.

13. The biphenyl- phosphaguanidine compound according to claim 11, wherein G$^2$, G$^4$, G$^8$, and G$^{10}$ include the guanidine moiety of formula V, and G$^1$, G$^3$, G$^5$, G$^7$, G$^9$, and G$^{11}$ include hydrides, alkyl, aryl, or heteroaryl moieties.

14. The biphenyl- phosphaguanidine compound according to claim 11, wherein one of R$^e$ and R$^d$ is a hydrogen atom, an aliphatic moiety, a heteroaliphatic moiety, an aromatic moiety, a heteroaromatic moiety and the other of R$^d$ and R$^e$ is a lone pair of electrons.

15. The biphenyl- phosphaguanidine compound according to claim 11, wherein R$^d$ is selected from hydride, methyl, ethyl, iso-propyl, cyclohexyl, iso-butyl, benzyl, adamantyl, tert-butyl, phenyl, 2,6-dimethylphenyl, 2,6-diiso-propylphenyl, and a lone pair of electrons.

16. A polymerization catalyst comprising the biphenyl-phosphaguanidine compound according to claim 11 and a transition metal catalyst bonded to the biphenyl-phosphaguanidine compound, wherein the transition metal catalyst is hafnium, zirconium, or titanium.

17. A phosphaguanidine naphthalene compound comprising the structure of formula VI:

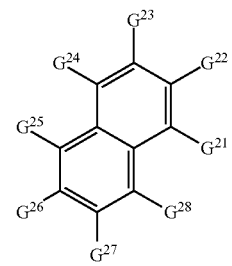

where
G$^{21}$, G$^{22}$, G$^{23}$, G$^{24}$, G$^{25}$, G$^{27}$, and G$^{28}$ are independently selected from hydrides, alkyl groups, aryl or heteroaryl groups, or alkylguanidine moieties; each phenyl ring comprises at least one guanidine moiety;
the guanidine moiety comprising the structure of formula V:

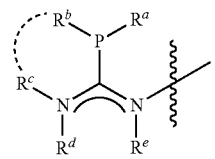

where
R$^d$ and R$^e$ are independently selected from hydrides, aliphatic moieties, heteroaliphatic moieties, aromatic moieties, heteroaromatic moieties, and may include lone pair of electrons;
R$^c$ is selected from hydrides, aliphatic moieties, heteroaliphatic moieties, aromatic moieties, heteroaromatic moieties and or lone pairs of electrons;
R$^a$ and R$^b$ are independently selected from aliphatic moieties, heteroaliphatic moieties, aromatic moieties, and heteroaromatic moieties; and
each curved dotted line optionally defines a bridging connection,
wherein, in cases where there are a plurality of guanidine moieties, R$^a$, R$^b$, R$^c$, R$^d$, and R$^e$ may be the same or different within the plurality of guanidine moieties.

18. The polyphosphaguanidine naphthalene compound according to claim 17, wherein one of R$^b$ and R$^c$ is a hydrogen atom, an aliphatic moiety, a heteroaliphatic moiety, an aromatic moiety, a heteroaromatic moiety and the other of R$^b$ and R$^c$ is a lone pair of electrons.

19. The phosphaguanidine naphthalene compound according to claim 17, wherein R$^a$ is selected from a phenyl, a substituted phenyl, a cyclohexyl, and a cyclopentyl.

20. A polymerization catalyst comprising the phosphaguanidine naphthalene compound of claim 17, and a transition metal catalyst bonded to the phosphaguanidine naphthalene compound, wherein the transition metal catalyst is hafnium, zirconium, or titanium.

* * * * *

UNITED STATES PATENT AND TRADEMARK OFFICE
CERTIFICATE OF CORRECTION

| | |
|---|---|
| PATENT NO. | : 11,028,190 B2 |
| APPLICATION NO. | : 16/337602 |
| DATED | : June 8, 2021 |
| INVENTOR(S) | : Andrew M. Camelio et al. |

It is certified that error appears in the above-identified patent and that said Letters Patent is hereby corrected as shown below:

In the Claims

Column 90, Line 60, Claim 10:
"M is selected from titanium, zirconium, or hafnium; each"
Should read:
--M is titanium, zirconium, or hafnium; each--.

Signed and Sealed this
Twenty-third Day of May, 2023

Katherine Kelly Vidal
*Director of the United States Patent and Trademark Office*